(12) United States Patent
Black et al.

(10) Patent No.: US 9,189,886 B2
(45) Date of Patent: Nov. 17, 2015

(54) METHOD AND APPARATUS FOR ESTIMATING BODY SHAPE

(75) Inventors: Michael J. Black, Providence, RI (US); Alexandru O. Balan, Pawtucket, RI (US); Alexander W. Weiss, Shirley, MA (US); Leonid Sigal, Pittsburgh, PA (US); Matthew M. Loper, Providence, RI (US); Timothy S. St. Clair, Cambridge, MA (US)

(73) Assignee: Brown University, Providence, RI (US)

( * ) Notice: Subject to any disclaimer, the term of this patent is extended or adjusted under 35 U.S.C. 154(b) by 882 days.

(21) Appl. No.: 12/541,898

(22) Filed: Aug. 14, 2009

(65) Prior Publication Data

US 2010/0111370 A1 May 6, 2010

Related U.S. Application Data

(60) Provisional application No. 61/107,119, filed on Oct. 21, 2008, provisional application No. 61/189,118, filed on Aug. 15, 2008, provisional application No. 61/189,070, filed on Aug. 15, 2008.

(51) Int. Cl.
*G06K 9/00* (2006.01)
*G06T 17/00* (2006.01)
*G06K 9/62* (2006.01)
*G06Q 30/06* (2012.01)
*G06T 7/00* (2006.01)

(52) U.S. Cl.
CPC ............ *G06T 17/00* (2013.01); *G06K 9/00369* (2013.01); *G06K 9/6221* (2013.01); *G06Q 30/0601* (2013.01); *G06T 7/0046* (2013.01); *G06T 7/0048* (2013.01); *G06T 2207/10028* (2013.01); *G06T 2207/30196* (2013.01)

(58) Field of Classification Search
CPC combination set(s) only.
See application file for complete search history.

(56) References Cited

U.S. PATENT DOCUMENTS

| | | | |
|---|---|---|---|
| 4,100,569 | A | 7/1978 | Vlahos |
| 5,502,482 | A | 3/1996 | Graham |
| 5,832,139 | A | 11/1998 | Batterman et al. |
| 5,850,222 | A * | 12/1998 | Cone .............................. 345/418 |
| 5,930,769 | A | 7/1999 | Rose |

(Continued)

OTHER PUBLICATIONS

A. Agarwal and B. Triggs. Monocular human motion capture with a mixture of Regressors. IEEE Workshop on Vision for Human-Computer Interaction, 2005.

(Continued)

*Primary Examiner* — Alex Liew
(74) *Attorney, Agent, or Firm* — Novak Druce Connolly Bove + Quigg LLP

(57) ABSTRACT

A system and method of estimating the body shape of an individual from input data such as images or range maps. The body may appear in one or more poses captured at different times and a consistent body shape is computed for all poses. The body may appear in minimal tight-fitting clothing or in normal clothing wherein the described method produces an estimate of the body shape under the clothing. Clothed or bare regions of the body are detected via image classification and the fitting method is adapted to treat each region differently. Body shapes are represented parametrically and are matched to other bodies based on shape similarity and other features. Standard measurements are extracted using parametric or non-parametric functions of body shape. The system components support many applications in body scanning, advertising, social networking, collaborative filtering and Internet clothing shopping.

24 Claims, 13 Drawing Sheets

(56) References Cited

U.S. PATENT DOCUMENTS

| | | | |
|---|---|---|---|
| 6,546,309 B1* | 4/2003 | Gazzuolo | 700/132 |
| 6,711,286 B1 | 3/2004 | Chen et al. | |
| 7,092,782 B2* | 8/2006 | Lee | 700/132 |
| 7,184,047 B1 | 2/2007 | Crampton | |
| 7,242,999 B2 | 7/2007 | Wang | |
| 7,257,237 B1 | 8/2007 | Luck et al. | |
| 8,139,067 B2 | 3/2012 | Anguelov et al. | |
| 8,655,053 B1* | 2/2014 | Hansen | 382/154 |
| 8,908,928 B1* | 12/2014 | Hansen | 382/111 |
| 2004/0201586 A1* | 10/2004 | Marschner et al. | 345/426 |
| 2005/0008194 A1 | 1/2005 | Sakuma et al. | |
| 2005/0031195 A1* | 2/2005 | Liu | 382/154 |
| 2006/0098865 A1* | 5/2006 | Yang et al. | 382/159 |
| 2006/0253491 A1 | 11/2006 | Gokturk et al. | |
| 2006/0287877 A1 | 12/2006 | Wannier et al. | |
| 2008/0030744 A1 | 2/2008 | Beardsley | |
| 2008/0180448 A1 | 7/2008 | Anguelov et al. | |

OTHER PUBLICATIONS

A. Agarwal and B. Triggs. Recovering 3D human pose from monocular images. IEEE Transactions on Pattern Analysis and Machine Intelligence, 28(1):44-58, 2006.

B. Allen, B. Curless, and Z. Popovic. Articulated body deformation from range scan data. ACM Transactions on Graphics, 21(3):612-619, 2002.

B. Allen, B. Curless, and Z. Popovic. The space of all body shapes: reconstruction and parameterization from range scans. ACM Transactions on Graphics, 22(3):587-594, 2003.

B. Allen, B. Curless, and Z. Popovic. Exploring the space of human body shapes: Data-driven synthesis under anthropometric control. In Proceedings Digital Human Modeling for Design and Engineering Conference, Rochester, MI, Jun. 15-17. SAE International, 2004.

A. Andoni and P. Indyk, Near-optimal hashing algorithms for approximate nearest neighbor in high dimensions. Communications of the ACM, 51(1):117-122, 2008.

D. Anguelov, P. Srinivasan, D. Koller, S. Thrun, H. Pang, and J. Davis. The correlated correspondence algorithm for unsupervised registration of nonrigid surfaces. In Advances in Neural Information Processing Systems 17, pp. 33-40, 2004.

D. Anguelov, P. Srinivasan, D. Koller, S. Thrun, J. Rodgers, and J. Davis. SCAPE: Shape completion and animation of people. ACM Transactions on Graphics 24(3):408-416, 2005.

D. Anguelov. Learning Models of Shape from 3D Range Data. Ph.D. thesis, Stanford University, 2005. (2005t).

A. O. Balan, L. Sigal, and M. J. Black. A quantitative evaluation of video-based 3D person tracking. The Second Joint IEEE International Workshop on Visual Surveillance, VS-PETS, Beijing, China, pp. 349-356, Oct. 15-16, 2005.

A. O. Balan, L. Sigal, M. J. Black, J. E. Davis, and H. W. Haussecker. Detailed human shape and pose from images. In IEEE International Conference on Computer Vision and Pattern Recognition, 2007. (2007a).

A. O. Balan, M. J. Black, H. Haussecker and L. Sigal. Shining a light on human pose: On shadows, shading and the estimation of pose and shape. In International Conference on Computer Vision, 2007. (2007b).

A. O. Balan and M. J. Black. The naked truth: Estimating body shape under clothing. In European Conference on Computer Vision, vol. 5303, pp. 15-29, 2008.

S. Belongie, J. Malik and J. Puzicha. Matching shapes. In International Conference on Computer Vision, pp. 454-461, 2001.

M. Black, A. Rangarajan. On the unification of line processes, outlier rejection, and robust statistics with applications in early vision. International Journal of Computer Vision 19(1):57-92, 1996.

L. Bo, C. Sminchisescu, A. Kanaujia, and D. Metaxas. Fast Algorithms for Large Scale Conditional 3D Prediction. In IEEE International Conference on Computer Vision and Pattern Recognition, 2008.

E. Boyer. On using silhouettes for camera calibration. In Asian Conference on Computer Vision, 2006.

G. R. Bradski and A. Kaehler. Learning OpenCV. O'Reilly Publications, 2008.

M. E. Brand. Incremental Singular Value Decomposition of Uncertain Data with Missing Values. In European Conference on Computer Vision, pp. 707-720, 2002.

J. Canny. A computational approach to edge detection. IEEE Transactions on Pattern Analysis and Machine Intelligence., PAMI-8(6):679-698, Nov. 1986.

K. M. Cheung, S. Baker, and T. Kanade. Shape-From-Silhouette of Articulated Objects and its Use for Human Body Kinematics Estimation and Motion Capture. In IEEE International Conference on Computer Vision and Pattern Recognition, pp. 77-84, 2003.

S. Corazza, L. Muendermann, A. Chaudhari, T. Demattio, C. Cobelli, and T. Andriacchi. A markerless motion capture system to study musculosketel biomechanics: Visual hull and simulated annealing approach. Annals of Biomedical Engineering, 34(6):1019-29, 2006.

A. Criminisi, I. D. Reid, and A. Zisserman. Single view metrology. International Journal of Computer Vision, 40(2):123-148, 2000.

N. Cristianini and J. Shawe-Taylor. An Introduction to Support Vector Machines and other kernel-based learning methods. Cambridge University Press, 2000.

N. Dalal and B. Triggs. Histograms of oriented gradients for human detection. IEEE Computer Society Conference on Computer Vision and Pattern, 2005.

J. Deutscher and I. Reid. Articulated body motion capture by stochastic search. International Journal of Computer Vision 61(2):185-205, 2005.

V. Ferrari, M. Marin, and A. Zisserman. Progressive search space reduction for human pose estimation. IEEE International Conference on Computer Vision and Pattern Recognition, 2008.

A. Fitzgibbon, D. Robertson, S. Ramalingam, A. Blake, and A. Criminisi. Learning priors for calibrating families of stereo cameras. In International Conference and Computer Vision, 2007.

Funkhouser, M. Kazhdan, P. Min, and P. Shilane. Shape-based retrieval and analysis of 3D models. Communications of the Acm, 48(6):58-64, Jun. 2005.

S. Geman and D. McClure. Statistical methods for tomographic image reconstruction. Bulletin of the International Statistical Institute LII-4:5-21, 1987.

K. Grauman, G. Shakhnarovich, and T. Darrell. Inferring 3D structure with a statistical image-based shape model. IEEE International Conference on Computer Vision, pp. 641-648, 2003.

D. Grest and R. Koch. Human model fitting from monocular posture images. In Proceedings of the Vision, Modeling, and Visualization Conference, 2005.

N. Hasler, B. Rosenhahn, T. Thormahlen, M. Wand, J. Gall and H.-P. Seidel. Markerless motion capture with unsynchronized moving cameras. In IEEE Conference on Computer Vision and Pattern Recognition, 2009. (2009a).

N. Hasler, C. Stoll, M. Sunkel, B. Rosenhahn and H.-P. Seidel. A statistical model of human pose and body shape. Eurographics, Computer Graphics Forum, 2(28), 337-346, 2009. (2009b).

N. Hasler, C. Stoll, B. Rosenhahn, T. Thormahlen, and H.-P. Seidel. Estimating body shape of dressed humans. In Shape Modeling International, Beijing, China, 2009. (2009c).

C. Hernandez, F. Schmitt, and R. Cipolla. Silhouette coherence for camera calibration under circular motion. IEEE transactions on Pattern Analysis and Machine Intelligence, 29(2):343-349, 2007.

A. Hilton, D. Beresford, T. Gentils, R. Smith, W. Sun, and J. Illingworth. Whole-body modeling of people from multiview images to populate virtual worlds. The Visual Computer, 16(7):411-436, 2000.

D. Hoiem, A. A. Efros, and M. Hebert. Putting objects in perspective. IEEE International Conference on Computer Vision and Pattern Recognition, 2006.

D. Hoiem, A. A. Efros, and M. Hebert. Closing the loop on scene interpretation. IEEE International Conference on Computer Vision and Pattern Recognition, 2008.

Z. Hu, H. Yan, and X. Lin. Clothing segmentation using foreground and background estimation based on the constrained Delaunay triangulation. Pattern Recognition, 41(5):1581-1592, 2008.

(56) References Cited

OTHER PUBLICATIONS

A. Ihler, E. Sudderth, W. Freeman, and A. Willsky. Efficient multiscale sampling from products of Gaussian mixtures. In Neural Information Processing Systems, 2003.
A. Johnson. Spin-Images: A representation for 3-D Surface Matching. PhD thesis, Robotics Institute, Carnegie Mellon University, Pittsburgh, PA, Aug. 1997.
M. Jones and J. Rehg. Statistical color models with application to skin detection. International Journal of Computer Vision, 46(1):81-96, 2002.
I. Kakadiaris and D. Metaxas. Three-dimensional human body model acquisition from multiple views. International Journal of Computer Vision, 30(3):191-218, 1998.
A. Kanaujia and C. Sminchisescu, and D. Metaxas. Semi-supervised hierarchical models for 3D human pose reconstruction. IEEE Conference on Computer Vision and Pattern Recognition, 2007.
J. C. Lagarias, J. A. Reeds, M. H. Wright, and P. E. Wright. Convergence properties of the Nelder-Mead simplex method in low dimensions. Society for Industrial and Applied Mathematics Journal on Optimization, 9(1):112-147, 1998.
A. Laurentini. The visual hull concept for silhouette-based image understanding. IEEE Transactions on Pattern Analysis and Machine Intelligence 16:150-162, 1994.
H. Lee and Z. Chen. Determination of 3D human body postures from a single view. Computer Vision, Graphics, and Image Processing, 30(2):148-168, 1985.
K.-C. Lee, D.Anguelov, B. Sumengen, and S. B. Gokturk. Markov random field models for hair and face segmentation. IEEE Conference on Automatic Face and Gesture Recognition, Sep. 17-19, 2008.
W. Lee, J. Gu, and N. Magnenat-Thalmann. Generating animatable 3D virtual humans from photographs. Eurographics, 19(3):1-10, 2000.
X. Li, S. Maybank, S. Yan, D. Tao, and D. Xu. Gait components and their application to gender recognition. IEEE Transactions on Systems, Man, and Cybernetics, Part C: Applications and Reviews, 38(2):145-155, 2008.
D. G. Lowe. Distinctive image features from scale-invariant keypoints. International Journal of Computer Vision, 60(2):91-110, 2004.
MATLAB version R2008b. Natick, Massachusetts: The MathWorks Inc., 2008.
B. Moghaddam and M. Yang. Learning gender with support faces. IEEE Transactions on Pattern Analysis and Machine Intelligence, 24(5):707-711, 2002.
L. Muendermann, S. Corazza, and T. Andriacchi. Accurately measuring human movement using articulated ICP with soft-joint constraints and a repository of articulated models. In IEEE International Conference on Computer Vision and Pattern Recognition, 2007.
P. Plankers and P. Fua. Articulated soft objects for multiview shape and motion capture. IEEE Transactions on Pattern Analysis and Machine Intelligence, 25(10):63-83, 2003.
R. W. Poppe and M. Poel. Comparison of silhouette shape descriptors for example-based human pose recovery. IEEE Conference on Automatic Face and Gesture Recognition, pp. 541-546, 2006.
M. Riesenhuber and T. Poggio. Hierarchical models of object recognition in cortex. Nature Neuroscience 2:1019-1025, 1999.
R. Rosales and S. Schlaroff. Learning body pose via specialized maps. In Advances in Neural Information Processing Systems, 2002.
C. Rother, V. Kolmogorov, and A. Blake. "GrabCut": Interactive foreground extraction using iterated graph cuts. ACM Transactions on Graphics, 23(3):309-314, 2004.

M. Rufli, D. Scaramuzza, R. Siegwart. Automatic detection of checkerboards on blurred and distorted images. IEEE/RSJ International Conference on Intelligent Robots and Systems, pp. 3121-3126, 2008.
H. Seo and N. Magnenat-Thalmann. An automatic modeling of human bodies from sizing parameters. In Proceedings of the 2003 Symposium on interactive 3D Graphics (Monterey, California, Apr. 27-30, 2003). ACM, New York, NY, pp. 19-26, 2003.
H. Seo, Y. I. Yeo, and K. Wohn. 3D Body reconstruction from photos based on range scan. Tech. for E-Learning and Digital Entertainment, vol. 3942, pp. 849-860, 2006.
L. Sigal, S. Bhatia, S. Roth, M. J. Black, and M. Isard. Tracking Loose-limbed People. IEEE Conference on Computer Vision and Pattern Recognition, pp. 421-428, 2004.
L. Sigal, A. Balan, M. J. Black. Combined discriminative and general articulated pose and non-rigid shape estimation. NIPS Conference Presentation, Dec. 3, 2007.
L. Sigal, A. Balan, and M. J. Black. Combined discriminative and generative articulated pose and non-rigid shape estimation. Advances in Neural Information Processing Systems 20, MIT Press, pp. 1337-1344, 2008.
C. Sminchisescu, A. Kanaujia, Z. Li, and D. Metaxas. Discriminative density propagation for 3D human motion estimation. IEEE International Conference on Computer Vision and Pattern Recognition, pp. 390-397, 2005.
C. Sminchisescu and A. Telea. Human pose estimation from silhouettes, a consistent approach using distance level sets. WSCG International Conference on Computer Graphics, Visualization and Computer Vision, pp. 413-420, 2002.
C. Sminchisescu and B. Triggs. Estimating articulated human motion with covariance scaled sampling. International Journal of Robotics Research, 22(6):371-393, 2003.
C. Sminchesescu, A. Kanajujia, and D. Metaxas. Learning joint top-down and bottom-up processes for 3D visual inference. IEEE International Conference on Computer Vision and Pattern Recognition, vol. 2, pp. 1743-1752, 2006.
A. R. Smith and J. F. Blinn. Blue screen matting. SIGGRAPH Proceedings, pp. 259-268, 1996.
N. Snavely, S. M. Seitz, and R. Szeliski. Modeling the world from Internet photo collections. International Journal of Computer Vision, 80(2):189-210, 2008.
J. Starck and A. Hilton. Surface capture for performance-based animation. IEEE Computer Graphics and Applications, 27(3):21-31, 2007.
C. Stauffer and E. Grimson. Adaptive background mixture models for real-time tracking. IEEE Conference on Computer Vision and Pattern Recognition, pp. 246-252, 1999.
C. J. Taylor. Reconstruction of articulated objects from point correspondences in a single uncalibrated image. Computer Vision and Image Understanding, 80(10):349-363, 2000.
Y. Yacoob and L. Davis. Detection and analysis of hair. IEEE Transactions on Pattern Analysis and Machine Intelligence, 28(7):1164-1169, 2007.
S. Yamazaki, S. Narasimhan, S. Baker, and T. Kanade. Coplanar shadowgrams for acquiring visual hulls of intricate objects. In International Conference on Computer Vision, 2007.
Z. Zhang. A flexible new technique for camera calibration. IEEE Transactions on Pattern Analysis and Machine Intelligence, 22:1330-1334, 2000.
R. Hartley & A. Zisserman; Multiple View Geometry in Computer Vision; Cambridge University Press 2000.

\* cited by examiner front  side  ¾

METHOD AND APPARATUS FOR ESTIMATING BODY SHAPE

CROSS REFERENCE TO RELATED APPLICATIONS

This application claims priority benefit of U.S. Provisional Application No. 61/189,118 filed Aug. 15, 2008 and titled Method and Apparatus for Parametric Body Shape Recovery Using Images and Multi-Planar Cast Shadows, U.S. Provisional Application No. 61/107,119 filed Oct. 21, 2008 and titled Method and Apparatus for Parametric Body Shape Recovery Using Images and Multi-Planar Cast Shadows, and U.S. Provisional Application No. 61/189,070 filed Aug. 15, 2008 and titled Analysis of Images with Shadows to Determine Human Pose and Body Shape.

STATEMENT REGARDING FEDERALLY SPONSORED RESEARCH OR DEVELOPMENT

This invention was made with support from Grants NSF IIS-0812364 from the National Science Foundation, Grant NSF IIS-0535075 from the National Science Foundation, and Grant N00014-07-1-0803 from the Office of Naval Research. The United States Government has certain rights in the invention.

BACKGROUND OF THE INVENTION

The present invention relates to the estimation of human body shape using a low-dimensional 3D model using sensor data and other forms of input data that may be imprecise, ambiguous or partially obscured.

The citation of published references in this section is not an admission that the publications constitute prior art to the presently claimed subject matter.

Body scanning technology has a long history and many potential applications ranging from health (fitness and weight loss), to entertainment (avatars and video games) and the garment industry (custom clothing and virtual "try-on"). Current methods however are limited in that they require complex, expensive or specialized equipment to capture three-dimensional (3D) body measurements.

Most previous methods for "scanning" the body have focused on highly controlled environments and used lasers, millimeter waves, structured light or other active sensing methods to measure the depth of many points on the body with high precision. These many points are then combined into a 3D body model or are used directly to estimate properties of human shape. All these previous methods focus on making thousands of measurements directly on the body surface and each of these must be very accurate. Consequently such systems are expensive to produce.

Because these previous methods focus on acquiring surface measurements, they fail to accurately acquire body shape when a person is wearing clothing that obscures their underlying body shape. Most types of sensors do not actually see the underlying body shape making the problem of estimating that shape under clothing challenging even when high-accuracy range scanners are used. A key issue limiting the acceptance of body scanning technology in many applications has been modesty—most systems require the user to wear minimal or skin-tight clothing.

There are several methods for representing body shape with varying levels of specificity: 1) non-parametric models such as visual hulls (Starck and Hilton 2007, Boyer 2006), point clouds and voxel representations (Cheung et al. 2003); 2) part-based models using generic shape primitives such as cylinders or cones (Deutscher and Reid 2005), superquadrics (Kakadiaris and Metaxas 1998; Sminchisescu and Telea 2002) or "metaballs" (Plankers and Fua 2003); 3) humanoid models controlled by a set of pre-specified parameters such as limb lengths that are used to vary shape (Grest et al. 2005; Hilton et al. 2000; Lee et al. 2000); 4) data driven models where human body shape variation is learned from a training set of 3D body shapes (Anguelov et al. 2005; Balan et al. 2007a; Seo et al. 2006; Sigal et al. 2007, 2008).

Machine vision algorithms for estimating body shape have typically relied on structured light, photometric stereo, or multiple calibrated camera views in carefully controlled settings where the use of low specificity models such as visual hulls is possible. As the image evidence decreases, more human-specific models are needed to recover shape. In both previous scanning methods and machine vision algorithms, the sensor measurements are limited, ambiguous, noisy or do not correspond directly to the body surface. Several methods fit a humanoid model to multiple video frames, depth images or multiple snapshots from a single camera (Sminchisescu and Telea 2002, Grest et al. 2005, Lee et al. 2000). These methods estimate only limited aspects of body shape such as scaling parameters or joint locations in a pre-processing step yet fail to capture the range of natural body shapes.

More realism is possible with data-driven methods that encode the statistics of human body shape. Seo et al. (2006) use a learned deformable body model for estimating body shape from one or more photos in a controlled environment with uniform background and with the subject seen in a single predefined posture with minimal clothing. They require at least two views (a front view and a side view) to obtain reasonable shape estimates. They choose viewing directions in which changes in pose are not noticeable and fit a single model of pose and shape to the front and side views. They do not combine body shape information across varying poses or deal with shape under clothing. The camera is stationary and calibrated in advance based on the camera height and distance to the subject. They optimize an objective function that combines a silhouette overlap term with one that aligns manually marked feature points on the model and in the image.

There are several related methods that use a 3D body model called SCAPE (Anguelov et al. 2005). While there are many 3D graphics models of the human body, SCAPE is low dimensional and it factors changes in shape due to pose and identity. Anguelov et al. (2005) define the SCAPE model and show how it can be used in several graphics applications. They dealt with detailed laser scan data of naked bodies and did not fit the model to image data of any kind.

In Balan et al. (2007a) the SCAPE model was fit to image data for the first time. They projected the 3D model into multiple calibrated images and compared the projected body silhouette with foreground regions extracted using a known static background. An iterative importance sampling method was used to estimate the pose and shape that best explained the observed silhouettes. That method worked with as few as 3-4 cameras if they were placed appropriately and calibrated accurately. The method did not deal with clothing, estimating shape across multiple poses, or un-calibrated imagery.

If more cameras are available, a visual hull or voxel representation can be extracted from image silhouettes (Laurentini 1994) and the body model can be fit to this 3D representation. Mundermann et al. (2007) fit a body model to this visual hull data by first generating a large number of example body shapes using SCAPE. They then searched this virtual database of body shapes for the best example body that fit the visual hull data. This shape model was then kept fixed and segmented into rigid parts. The body was tracked using an Iterative Closest Point (ICP) method to register the partitioned model with the volumetric data. The method required 8 or more cameras to work accurately.

There exist a class of discriminative methods that attempt to establish a direct mapping between sensor features and 3D body shape and pose. Many methods exist that predict pose parameters, but only Sigal et al. (2007, 2008) predict shape parameters as well. Discriminative approaches do not use an explicit model of the human body for fitting, but may use a humanoid model for generating training examples. Such approaches are computationally efficient but require a training database that spans all possible poses, body shapes, and/or scene conditions (camera view direction, clothing, lighting, background, etc.) to be effective. None of these methods deal with clothing variations. Moreover the performance degrades significantly when the image features are corrupted by noise or clutter. In such cases, a generative approach is more appropriate as it models the image formation process explicitly, where a discriminative approach is typically used for initializing a generative approach.

Grauman et al. (2003) used a 3D graphics model of the human body to generate many training examples of synthetic people in different poses. The model was not learned from data of real people and lacked realism. Their approach projected each training body into one or more synthetic camera views to generate a training set of 2D contours. Because the camera views must be known during training, this implies that the locations of the multiple cameras are roughly calibrated in advance (at training time). They learned a statistical model of the multi-view 2D contour rather than the 3D body shape and then associated the different contour parameters with the structural information about the 3D body that generated them. Their estimation process involved matching 2D contours from the learned model to the image and then inferring the related structural information (they recovered pose and did not show the recovery of body shape). Our approach of modeling shape in 3D is more powerful because it allows the model to be learned independent of the number of cameras and camera location. Our 3D model can be projected into any view or any number of cameras and the shape of the 3D model can be constrained during estimation to match known properties. Grauman et al. (2003) did not deal with estimating shape under clothing or the combination of information about 3D body shape across multiple articulated poses. Working with a 3D shape model that factors pose and shape allows us to recover a consistent 3D body shape from multiple images where each image may contain a different pose.

None of the methods above are able to accurately estimate detailed body shape from un-calibrated perspective cameras, monocular images, or people wearing clothing.

Hasler et al. (2009c) are the first to fit a learned parametric body model to 3D laser scans of dressed people. Their method uses a single pose of the subject and requires the specification of sparse point correspondences between feature locations on the body model and the laser scan; a human operator provides these. They use a body model (Hasler et al. 2009b) similar to SCAPE in that it accounts for articulated and non-rigid pose and identity deformations, but unlike SCAPE, it does not factor pose and shape in a way that allows for the pose to be adjusted while the identity of body shape is kept constant. This is important since estimating shape under clothing is significantly under-constrained in a single pose case, combining information from multiple articulated poses can constrain the solution. Their method provides no direct way to ensure that the estimated shape is consistent across different poses. They require a full 360 degree laser scan and do not estimate shape from images or range sensing cameras.

BRIEF SUMMARY OF THE INVENTION

In accordance with the present invention, a system and method to estimate human body shape from sensor data where that data is imprecise, ambiguous or partially obscured is described. To make this possible, a low-dimensional 3D model of the human body is employed that accurately captures details of the human form. The method fits the body model to sensor measurements and, because it is low-dimensional, many fewer and less accurate measurements are needed. It also enables the estimation of body shape under clothing using standard sensors such as digital cameras or inexpensive range sensors. Additionally the choice of parametric model enables a variety of new applications.

The present disclosure is directed to a system in which the sensor data is not rich and the environment is much less constrained that in prior systems. These situations occur, for example, when standard digital camera images (e.g. cell phone cameras) are used as input and when only one, or a small number, of images of the person are available. Additionally these images may be acquired outside a controlled environment, making the camera calibration parameters (internal properties and position and orientation in the world) unknown.

To recover body shape from standard sensors in less constrained environments and under clothing, a parametric 3D model of the human body is employed. The term "body shape" means a pose independent representation that characterizes the fixed skeletal structure (e.g. length of the bones) and the distribution of soft tissue (muscle and fat). The phrase "parametric model" refers any 3D body model where the shape and pose of the body are determined by a few parameters. A graphics model is used that is represented as a triangulated mesh (other types of explicit meshes are possible such as quadrilateral meshes as are implicit surface models such as NURBS). A key property of any parametric model is that it be low dimensional—that is, a wide range of body shapes and sizes can be expressed by a small number of parameters. A human body is complex and the number of vertices in a 3D mesh model of the body is often large. Laser range scans have 10's or 100's of thousands of such vertices. The presently disclosed model captures the statistical variability across a human population with a smaller number of parameters (e.g. fewer than 100). To represent a wide variety of human shapes with a low-dimensional model, statistical learning is used to model the variability of body shape across a population (or sub-population).

With a low-dimensional model, only a few parameters need to be estimated to represent body shape. This simplifies the estimation problem and means that accurate measurements can be obtained even with noisy, limited or ambiguous sensor measurements. Also, because a parametric model is being fitted, the model can cope with missing data. While traditional scanners often produce 3D meshes with holes, the presently disclosed approach cannot generate models with holes and there is no need to densely measure locations on the body to fit the 3D model. Only a relatively small number of fairly weak measurements are needed to fit the model and the recovered shape parameters explain any missing data.

Another property of the presently disclosed body model is that it factors changes in body shape due to identity and changes due to pose. This means that changes in the articulated pose of the model do not significantly affect the intrinsic shape of the body. This factoring allows the combining of information about a person's body shape from images or sensor measurements of them in several articulated poses. This concept is used to robustly estimate a consistent body shape from a small number of images or under clothing.

In one embodiment, a method and system are described that enable the recovery of body shape even when a person is wearing clothing. This greatly extends the useful applications of body shape recovery. To estimate body shape under clothing, image classifiers are employed to detect regions corresponding to skin, hair or clothing. In skin regions, it is recognized that the actual body is being observed but in other regions it is recognized that the body is obscured. In the obscured regions, the fitting procedure is modified to take into account that clothing or hair makes the body appear larger.

The presently disclosed method allows for fitting the body shape to partial depth information (e.g. from a time-of-flight sensor) that is robust to clothing. Unlike a laser range scan, most range sensors provide information about depth on only one side of the object. Information can be gained about other views if the person moves and multiple range images are captured. In this case one must deal with changes in articulated pose between captures. The presently disclosed method estimates a single body model consistent with all views. The disclosed method further uses image intensity or color information to locate putative clothed regions in the range scan and augments the matching function in these regions to be robust to clothing.

In many applications it is useful to employ just one or a small number of images or other sensor measurements in estimating body shape. Furthermore with hand-held digital camera images, information about the camera's location in the world is typically unknown (i.e. the camera is un-calibrated). In such situations, many body shapes may explain the same data. To deal with this, a method is described for constrained optimization of body shape where the recovered model is constrained to have certain known properties such as a specific height, weight, etc. A new method is defined for directly estimating camera calibration along with body shape and pose parameters. When the environment can be controlled however, other approaches to solving for camera calibration are possible. Additionally, a method and apparatus are described that uses "multi-chromatic keying" to enable both camera calibration and segmentation of an object (person) from the background.

By construction, in the presently disclosed method every body model recovered from measurements is in full correspondence with every other body model. This means that a mesh vertex on the right shoulder in one person corresponds to the same vertex on another person's shoulder. This is unlike traditional laser or structured light scans where the mesh topology for every person is different. This formulation allows body shapes to be matched to each other to determine how similar they are; the method makes use of this in several ways. Additionally, it allows several novel methods to extract standard tailoring measurements, clothing sizes, gender and other information from body scans. Unlike traditional methods for measuring body meshes, the presently disclosed methods use a database of body shapes with known attributes (such as height, waist size, preferred clothing sizes, etc) to learn a mapping from body shape to attributes. The presently disclosed method describes both parametric and non-parametric methods for estimating attributes from body shape.

Finally, a means for body shape matching takes a body produced from some measurements (tailoring measures, images, range sensor data) and returns one or more "scores" indicating how similar it is in shape to another body or database of bodies. This matching means is used to rank body shape similarity to, for example, reorder a display of attributes associated with a database of bodies. Such attributes might be items for sale, information about preferred clothing sizes, images, textual information or advertisements. The display of these attributes presented to a user may be ordered so that the presented items are those corresponding to people with bodies most similar to theirs. The matching and ranking means can be used to make selective recommendations based on similar body shapes. The attributes (e.g. clothing size preference) of people with similar body shapes can be aggregated to recommend attributes to a user in a form of body-shape-sensitive collaborative filtering.

Other features, aspects, applications and advantages of the presently disclosed system and method for estimating human body shape will be apparent to those of ordinary skill in the art from the Detailed Description of the Invention that follows.

BRIEF DESCRIPTION OF THE SEVERAL VIEWS OF THE DRAWINGS

The invention will be more fully understood by reference to the Detailed Description of the Invention in conjunction with the accompanying drawings of which.

DETAILED DESCRIPTION OF THE INVENTION

The disclosures contained in following U.S. Provisional Patent Applications are hereby incorporated by reference:

a. U.S. Provisional Application No. 61/189,118 filed Aug. 15, 2008 and titled Method and Apparatus for Parametric Body Shape Recovery Using Images and Multi-Planar Cast Shadows.

b. U.S. Provisional Application No. 61/107,119 filed Oct. 21, 2008 and titled Method and Apparatus for Parametric Body Shape Recovery Using Images and Multi-Planar Cast Shadows.

c. U.S. Provisional Application No. 61/189,070 filed Aug. 15, 2008 and titled Analysis of Images with Shadows to Determine Human Pose and Body Shape.

In the context of the present disclosure, the terms system, sub-system, component and/or process are used generally to refer to the functions performed and are not intended to imply any specific hierarchy with respect to other referenced systems, sub-systems, components and/or processes discussed herein.

SECTION 1. SYSTEM OVERVIEW

Figure 1:
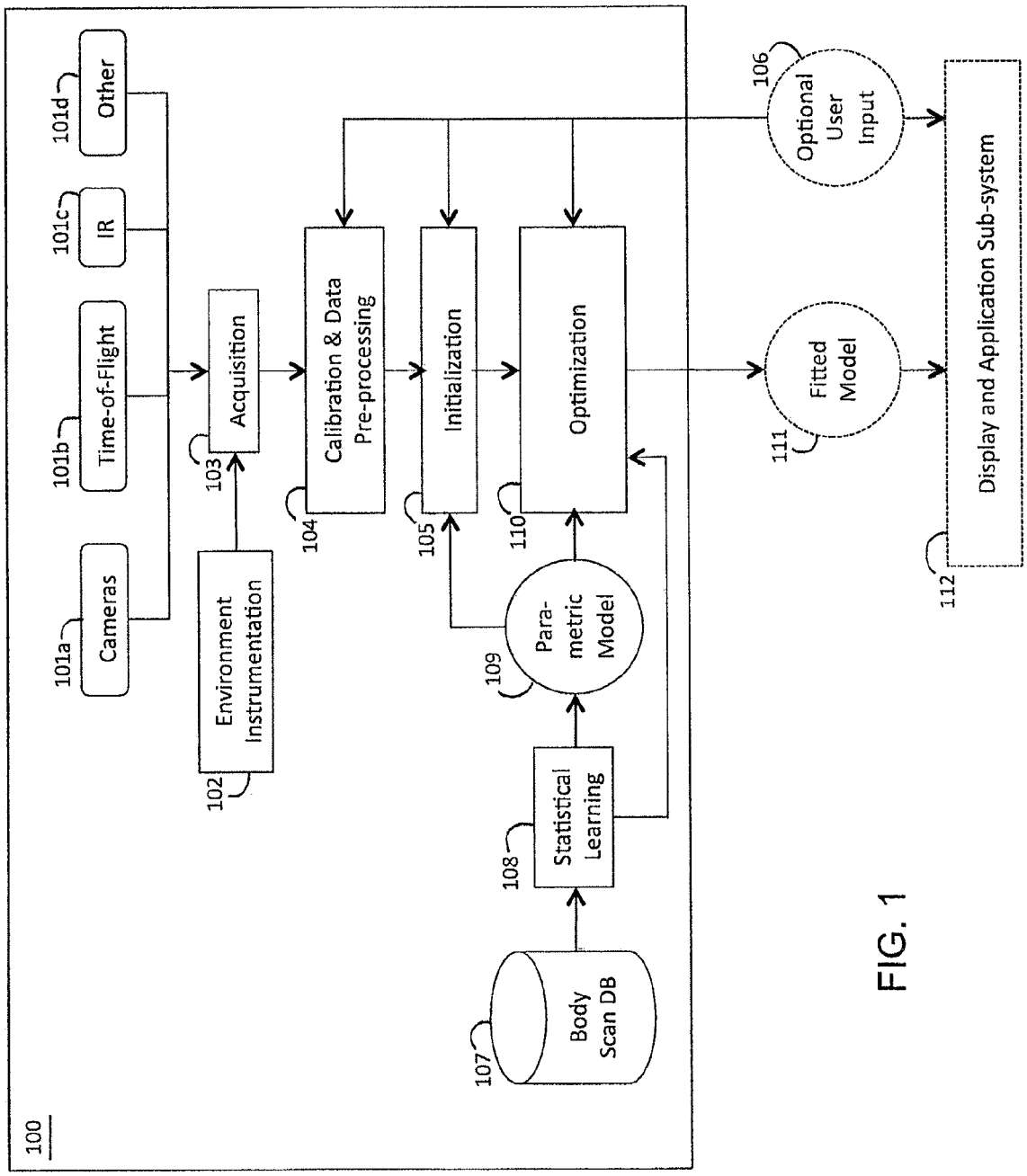
FIG. 1 is a block diagram depicting a data acquisition and fitting sub-system and a representation of a display and application subsystem shown in greater detail in FIG. 2 in accordance with the present invention.
Figure 2:
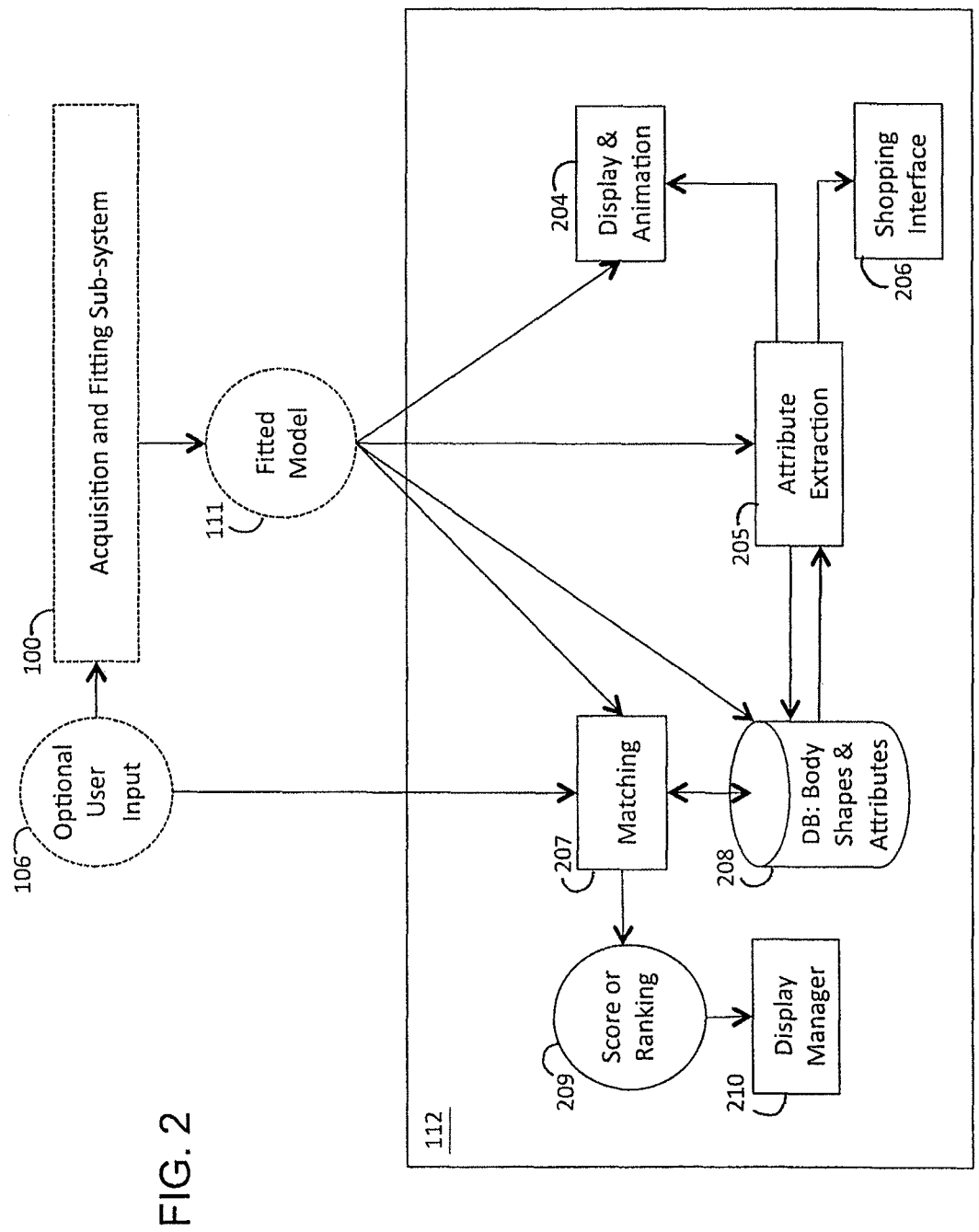
FIG. 2 is a block diagram of a display and application sub-system and a representation of the acquisition and fitting subsystem of FIG. 1 in accordance with the present invention.

FIGS. 1 and 2 provide an overview of the system. The two primary components correspond to an acquisition and fitting sub-system (FIG. 1) and a display and application sub-system (FIG. 2). The major components are summarized here and then detailed descriptions appear in the sections that follow. Finally, the pieces of the system can be used as building blocks to assemble several variants of the method described here. The system and methods are outlined using different numbers and types of sensors and then conclude with specific systems in several fields.

The system 100 depicted in FIG. 1 may include one or more sensors such as one or more digital cameras 101*a*, time of flight sensors 101*b*, IR sensors 101*c* or any other suitable sensors 101*d*. The system further includes an environment instrumentation system 102, a data acquisition system 103, a calibration and data pre-processing system 104, an initialization system 105, a mechanism for providing user input 106, a body scan database 107, a statistical learning system 108, a parametric modeling system 109, an optimization system 110. The system 100 generates a fitted model 111 which may be displayed or provided to a display and application subsystem 112.

Sensors

Standard digital image sensors (e.g. CCD and CMOS) working in the visible spectrum are typically employed although sensors working in the non-visible spectrum may also be used. One or more measurements may be taken from one or more sensors and one or more instants in time. There is no requirement that all sensor measurements be taken at the same time and, hence, the body pose may change between sensor acquisitions. Each of these sensor acquisitions is referred to as a "frame" and it should be understood that each frame could contain brightness measurements, depth measurements, surface normal measurements, etc. Multiple such frames may be captured at a single time instant or multiple time instants and may come from a mixture of sensor types. The methods described here for combining information across pose, constraining body shape and fitting under clothing are applicable across many sensors including laser scans, time-of-flight range images, infra red imagery, structured light scanners, visual hulls, etc. In all cases, the person can be segmented from the background and the 3D model either fit directly to the observations (e.g. silhouettes or range data) or extracted features from the data.

Acquisition and Environmental Instrumentation

Data from the sensors is acquired and stored in memory in the data acquisition system 103 where it is then processed by one or more CPUs. For calibration and segmentation described next, it is often useful to partially control the environment via environment instrumentation 102 to make these processes easier. To that end we describe a new multi-chromatic keying approach that combines the ideas of chroma-key image segmentation with camera calibration. The use of a specialized background pattern allows both processes to be performed simultaneously, obviating the need for a special calibration step. This is particularly useful in situations where the camera or the person is moving between captured image frames or only a single image frame is captured.

Calibration and Data Pre-Processing System

In the calibration and data pre-processing system 104, images and other sensor data is typically segmented into foreground regions and, for estimating shape under clothing, regions corresponding to skin, clothing and hair are detected. Even with many range sensors, there is an associated color image that can be used to detect skin or clothing regions. Previous methods for fitting body shape to images assumed that a static, known, background image is available to aid in segmentation of the foreground region. In general this is not possible with a small number of camera views or a moving sensor. A method is disclosed herein that enables accurate segmentation.

The pre-processing may optionally detect regions of each frame that correspond to skin, clothing or hair regions. A skin detection component is used to identify skin regions where the body shape conforms to the sensor measurements. Skin detectors can be built from training data using a simple non-parametric model of skin colors in hue and saturation space. Standard image classification methods applied to visible image data though infra-red or other sensory input could be used to more accurately locate skin.

Additionally, fitting a 3D body to image measurements requires some knowledge of the camera calibration parameters. Since it is often desirable to deal with un-calibrated or minimally calibrated cameras several methods are described for dealing with this type of data. In some situations, very little is known about the environment or camera and, in these cases, more information is required about the subject being scanned (e.g. their height). Such information may be provided via the user data input system 106.

Initialization System

The estimation of body shape and pose is challenging and it helps to have a good initial guess that is refined in the optimization process. Several methods are described herein. The simplest approach involves requiring the user to stand in a known canonical pose; for example, a "T" pose or a relaxed pose. An alternative method involves clicking on a few points in each image corresponding to the hands, feet, head, and major joints. From this, and information about body height (supplied via the optional user input system 106), an estimation of an initial pose and shape is obtained. A fully automated method uses segmented foreground regions to produce a pose and shape estimate by exploiting a learned mapping based on a mixture of linear regressors. This is an example of a "discriminative" method that takes sensor features and relates them directly to 3D body shape and pose. Such methods tend to be less accurate than the "generative" approach described next and hence are best for initialization. A method is also described for choosing an optimal set of body measurements for estimating body shape from standard tailoring measurements or other body measurements.

Body Model

A database 107 of body scan information is obtained or generated. One suitable database of body scan information is known as the "Civilian American and European Surface Anthropometry Resource" (CAESAR) and is commercially available from SAE International, Warrendale, Pa. Given a database 107 of 3D laser ranges scans of human bodies, the bodies are aligned and then statistical learning methods are applied within the statistical learning system 108 to learn a low-dimensional parametric body model 109 that captures the variability in shape across people and poses. One embodiment employs the SCAPE representation for the parametric model taught by Anguelov et al. (2005).

Optimization

Given an optional initialization of shape and pose within the initialization system 105, a fitting component provided in the optimization subsystem 110 refines the body shape parameters to minimize an error function (i.e. cost function) defined by the distance between the projected model and the identified features in the sensor data (e.g. silhouettes or range data). The fitting component includes a pose estimation component that updates the estimated pose of the body in each frame. A single consistent body shape model is estimated from all measurements taken over multiple time instants or exposures (frames). The estimation (or fitting) can be achieved using a variety of methods including stochastic optimization and gradient descent for example. These methods minimize an image error function (or equivalently maximize an image likelihood function) and may incorporate prior knowledge of the statistics of human shapes and poses.

For image data, a standard image error function is implemented by projecting the 3D body model onto the camera image plane. The error in this prediction can be measured using a symmetric distance function that computes the distance from projected regions to the observed image regions and vice versa. For range data, a distance is defined in 3D between the body model and each frame.

The above fitting can be performed with people wearing minimal clothing (e.g. underwear or tights) or wearing standard street clothing. In either case, multiple body poses may be combined to improve the shape estimate. This exploits the fact that human body shape (e.g. limb lengths, weight, etc.) is constant even though the pose of the body may change. In the case of a clothed subject, we use a clothing-insensitive (that is, robust to the presence of clothing) cost function. This captures the fact that regions corresponding to the body in the frames (images or depth data) are generally larger for people in clothes and makes the shape fitting sensitive to this fact. Combining measurements from multiple poses is particularly useful for clothed people because, in each pose, the clothing fits the body differently, providing different constraints on the underlying shape. Additionally, the optional skin detection component within the calibration and data pre-processing system 104 is used to modify the cost function in non-skin regions. In these regions the body shape does not have to match the image measurements exactly.

The clothing-insensitive fitting method provides a way of inferring what people look like under clothing. The method applies to standard camera images and/or range data. The advantage of this is that people need not remove all their clothes to obtain a reasonable body model. Of course, the removal of bulky outer garments such as sweaters will lead to increased accuracy.

The output of this process is a fitted body model depicted at 111 that is represented by a small number of shape and pose parameters. The fitted model is provided as input to the display and application sub-system 112.

The display and application sub-system 112 of FIG. 1 is illustrated in greater detail in FIG. 2. Referring to FIG. 2, the fitted model 111 may be stored in a database 208 along with other user-supplied information obtained via user input interface 106.

Display and Animation

The fitted model 111 is the output of the acquisition and fitting sub-system 100 depicted in FIG. 1. This model may be graphically presented on an output device (e.g. computer monitor, hand-held screen, television, etc.) in either static or animated form via a display and animation subsystem 204. It may be optionally clothed with virtual garments.

Attribute Extraction

In an attribute extraction subsystem 205, a variety of attributes such as the gender, standard tailoring measurements and appropriate clothing sizes may be extracted from the fitted model. A gender identification component uses body shape to automatically estimate the gender of a person based on their body scan. Two approaches for the estimation of the gender of a person are described. The first uses a gender-neutral model of body shape that includes men and women. Using a large database of body shapes, it has been determined that the shape coefficients for men and women, when embedded in a low dimensional gender-neutral subspace, become separated in very distinctive clusters. This allows the training of simple gender classifiers and their use to predict gender for newly scanned individuals based on shape parameters. A second approach fits two gender-specific models to the sensor measurements: one for men and one for women. The model producing the lowest value of the cost function is selected as the most likely gender.

In one embodiment, the attribute extraction component 205 produces standard biometric or tailoring measurements (e.g. inseam, waist size, etc.), pre-defined sizes (e.g. shirt size, dress size, etc.) or shape categories (e.g. "athletic", "pear shaped", "sloped shoulders", etc.). The estimation of these attributes exploits a database 208 that contains body shapes and associated attributes and is performed using either a parametric or a non-parametric estimation technique.

Extracted attributes may be displayed or graphed using a display and animation subsystem 204 or used as input to custom and retail clothing shopping applications as depicted by the shopping interface component 206.

Matching

Given a fitted body model 111 and optional user input from the user input interface 106, the model can be matched to a database 208 that contains stored 3D body models using a body shape matching component 207 to produce a score for each model indicating how similar the fitted body is to each element (or a subset of elements) in the database. The matching component 207 uses features of the body shape such as the parameters of the body shape model or shape descriptors derived from the vertices of the 3D body model. The match may also take into account ancillary attributes stored in the database 208 and provided by the user via the user input interface 106 such as clothing and size preferences.

The match can be used to rank elements of a list using a score or ranking component 209 for display by a display manager component 210. The list may contain associated bodies shapes and information such as preferred clothing sizes, images, text, or advertising preferences. The display of the associated information may be aggregated from the best matches or may show a list of best matches with an optional match score. This enables a selective recommendation function where a person with one body shape receives recommendations from a plurality of people with similar body shapes and attributes.

The database 208 of body shapes and attributes may include retailer or advertiser specifications of body shapes and attributes along with associated products or advertisements. The display manager 210 may present the products or advertisements to the user on any output device (e.g. graphical, auditory or tactile).

SECTION 2. CALIBRATION AND DATA PRE-PROCESSING

In the calibration and data pre-processing system 104 (FIG. 1) raw sensor data is transferred to memory where it is processed to extract information needed in later stages. Data processing includes the use of techniques for segmenting a person from a background and for calibrating the sensor(s).

2a. Foreground/Background Segmentation

A foreground segmentation component within the calibration and data pre-processing system 104 identifies the location of the person in a frame as distinct from the background. Standard techniques for image data use statistical measures of image difference between an image with and without a person present. For example, a standard method is to fit a Gaussian distribution (or mixture of Gaussians) to the variation of pixel values taken over several background images (Stauffer and Grimson 1999). For a new image with the person present, a statistical test is performed that evaluates how likely the pixel is to have come from the background model. Typically a probability threshold is set to classify the pixel. After individual pixels have been classified as foreground or background, several image processing operations can be applied to improve the segmentation, including dilation and erosion, median filtering, and removal of small disconnected components. More advanced models use Markov random fields to express prior assumptions on the spatial structure of the segmented foreground regions.

Alternatively, a statistical model of the background can be built as, for example, a color or texture histogram. A pixel can then be classified by testing how likely it was to have come from the background distribution rather than a foreground distribution. (e.g. a uniform distribution). This method differs from the one above in that the statistical model is not built at the pixel level but rather describes the image statistics of the background.

For range data, segmentation is often simpler. If a part of the body is sufficiently far from the background, a simple threshold on depth can be sufficient. More generally the person cannot be assumed to be distant from the background (e.g. the feet touch the floor). In these situations a simple planar model of the background may be assumed and robustly fit to the sensor data. User input or a coarse segmentation can be used to remove much of the person. The remaining depth values are then fit by multiple planes (e.g. for the ground and a wall). Standard robust methods for fitting planes (e.g. RANSAC or M-estimation) can be used. Sensor noise can be modeled by fitting the deviations from the fitted plane(s); this can be done robustly by computing the median absolute deviation (MAD). The foreground then can be identified based on its deviation from the fitted plane(s).

Information about segmentation from range and image values can be combined when spatially registered data is available.

2b. Camera Calibration Methods

Camera calibration defines the transformation from any 3D world point $X=[x, y, z]^T$ to a 2D image position $U=[u, v]^T$ on an image sensor. Given the correct full calibration for a camera in its environment, the exact projection of any point in the world on the camera's sensor can be predicted (with the caveat that some 3D points may not be in the frustum of the sensor). Practically, calibration encodes both extrinsic parameters (the position/rotation of the camera in the world coordinate system) and intrinsic parameters (field of view or focal length, lens distortion characteristics, pixel skew, and other properties that do not depend on camera position/orientation).

Assuming no lens distortion or that the images have been corrected for known lens distortion, the relationship between X and U can be modeled with the following homogeneous linear transformation $$[K][R\ t]\begin{bmatrix}x\\y\\z\\1\end{bmatrix} = P\begin{bmatrix}x\\y\\z\\1\end{bmatrix} = \lambda\begin{bmatrix}u\\v\\1\end{bmatrix},$$

where K is the 3×3 intrinsic parameter matrix which is further parameterized in terms of focal length, principal point and skew coefficient; R is the 3×3 rotation matrix of the camera; t is the 3×1 vector denoting the position of the world origin in the coordinate frame of the camera; P is the 3×4 projection matrix; and λ is a homogeneous scale factor (Hartley and Zisserman 2000). Note that the extrinsic parameters of the camera consist of R and t. The full calibration is comprised of the extrinsic and intrinsic parameters: $\psi=\{R, t, K\}$.

One approach to calibration involves estimating some of the camera parameters (extrinsic and/or intrinsic parameters) offline in a separate calibration step using standard methods (Hartley and Zisserman 2000, Zhang 2000) that take controlled images of a known calibration object. This is appropriate for example when the camera is known to remain stationary or where its internal state is not changing during the live capture session. Note however that setting up an initial calibration step is not always possible, as it is the case for calibrating television images. In the case of a moving camera, the extrinsic parameters have to be estimated from the available imagery or ancillary information such as inertial sensor data.

Calibration in a controlled environment involves detecting features in an image corresponding to a known (usually flat) 3D object in a scene. Given the 3D coordinates of the features in the object's coordinate frame, a homography H between the image plane and the plane of the calibration object is computed (Zhang 2000). For a given set of intrinsic parameters K (estimated online or offline), we use a standard method for upgrading the homography H to the extrinsic parameters R and t (Hartley and Zisserman 2000).

2c. Multi-Chroma Key Segmentation, Calibration, and Camera Tracking

Segmenting the image is easier when the environment can be controlled (or "instrumented") such that foreground objects are easier to detect. The most historically popular approach to instrumented segmentation is the Chroma Key method (otherwise known as "blue screening" or "green screening"), in which foreground items are photographed against a background of known color (Smith and Blinn 1996; Vlahos 1978).

Similarly, calibration is easier when the environment is instrumented. For calibration, the most common method is to use images of a black and white checkerboard of known size whose corners in the image can easily be extracted and used to compute the camera intrinsic and extrinsic parameters.

In the presently disclosed technique, these two procedures are combined. The idea is to calibrate the camera while the person is in the image and segment the person from the background at the same time. One advantage of this approach is that no separate calibration step is needed. Additionally this allows the camera to move between each frame capture; that is, it allows the use of a hand-held camera. There are several difficulties with combining standard calibration methods with standard segmentation methods. For accurate calibration the grid should occupy a large part of the field of view. Similarly, for accurate body shape estimation the person's body should occupy a large part of the field of view. Consequently, capturing a person and a calibration object at the same time means they are likely to overlap so that the person obscures part of the calibration object. Another difficulty is that the person must be segmented from the background and a standard black-white checkerboard is not ideal for this. Finally, the calibration grid must be properly identified even though it is partially obscured by the person.

To address these problems a "Multi-Chroma Key" method is employed that uses a known pattern with two or more colors (rather than the one color used in Chroma Key). As with the standard Chroma Key method, the presently disclosed method allows foreground/background segmentation. Additionally, the presently disclosed method also extends the standard Chroma Key method to enable the recovery of camera calibration information. Furthermore, the presently disclosed technique allows reconstruction of a camera's 3D position and orientation with respect to the physical scene as well as its intrinsic camera parameters such as focal length, which allows important inference about ground plane position and relative camera positioning between two adjacent shots or over an entire sequence. For example, tracking the 3D camera motion during live action is important for later compositing with computer-generated imagery. The presently disclosed approach allows the standard methods for Chroma Key segmentation to be combined with camera tracking.

Figure 3:
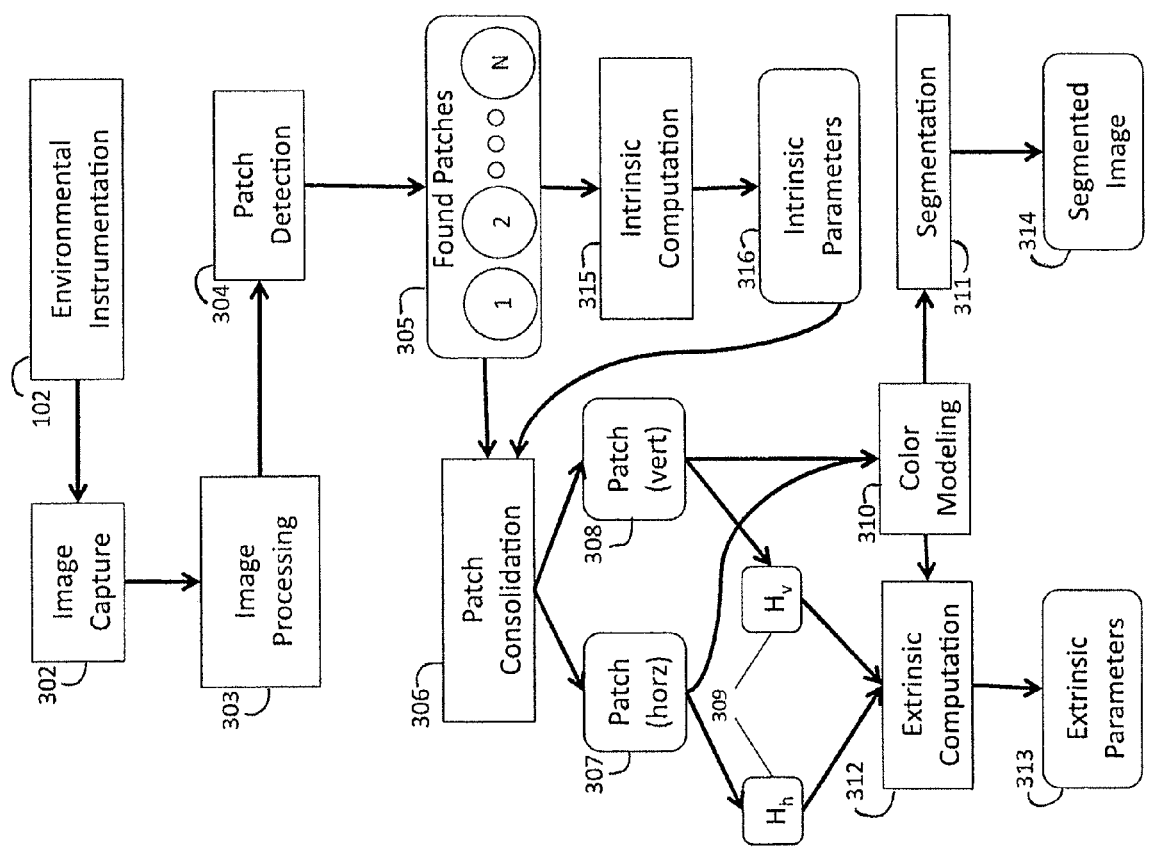
FIG. 3 is a flow diagram illustrating a method for multi-chroma key camera calibration and image segmentation.

First described is how the Multi-Chroma Key method can be used for calibration given two background colors and occluding objects. The technique is illustrated in FIG. 3. The segmentation of the person from the background is next described. The method has the following key components: 1) identifying points on a multi-color grid; 2) fitting a plane to the grid and computing the extrinsic and intrinsic parameters; 3) segmenting the background from the foreground. Many methods could potentially be used to implement these steps; we describe our preferred embodiment.

Environmental Instrumentation

Figure 4:
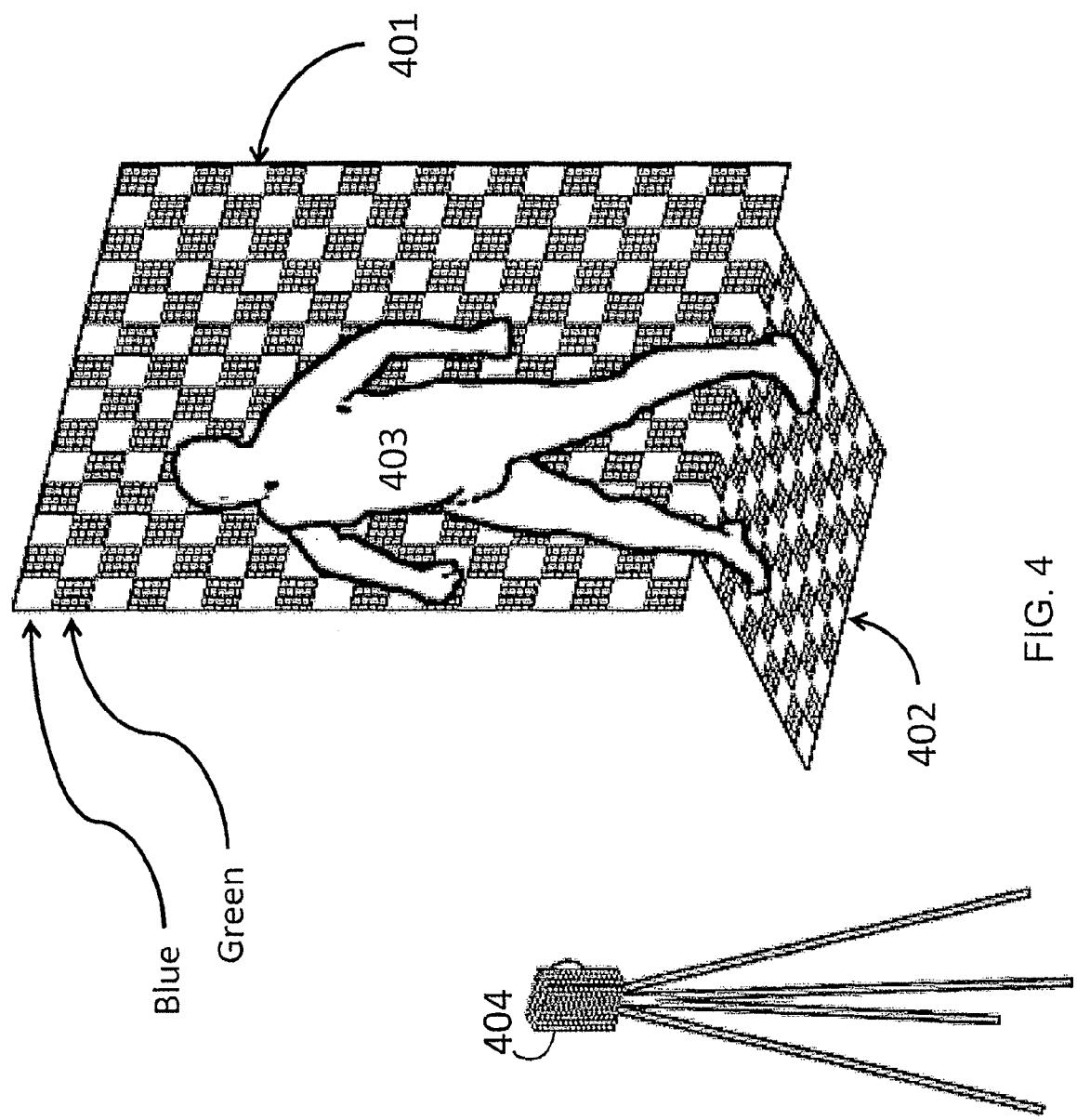
FIG. 4 is a pictorial representation of a multi-chroma key environment employing two multi-colored grids.
Figure 5:
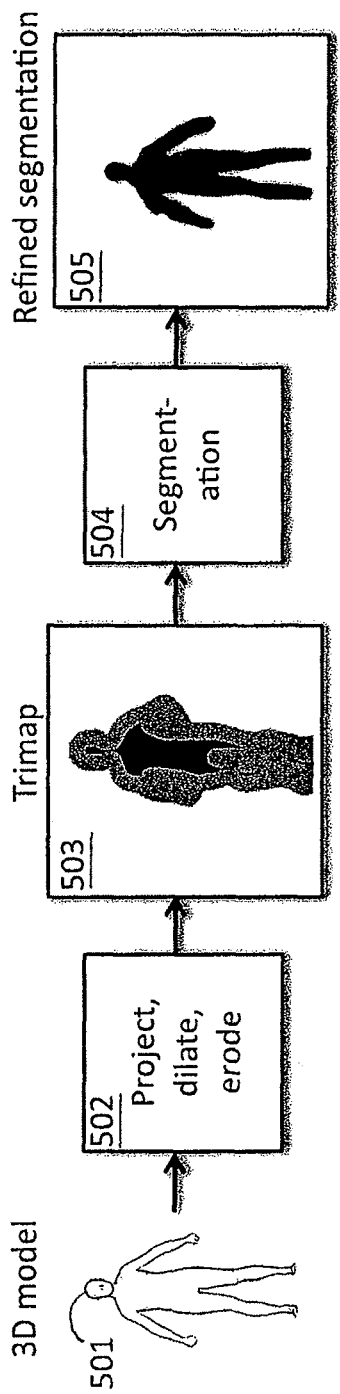
FIG. 5 is a flow diagram illustrating a method for refining segmentation using a projected 3D model and a tri-map of pixels.

Referring to FIGS. 3 and 4, surfaces are covered with a colored material (paint, fabric, board, etc.) that is static. These colored surfaces are referred to as the environmental instrumentation 102. In one embodiment two large, flat surfaces are used, one behind the person as a backdrop 401, and one on the floor 402, under the person's feet. A multi-tone pattern of precisely known size and shape is printed or painted on each surface. For best results, this pattern should avoid colors that precisely match those on the person in the foreground. In one implementation a checkerboard is used that alternates between blue and green, as shown in FIG. 4. The user 403 to be measured stands in front of the instrumented background for capture. The size of the checkers can vary, as can as the number of rows and columns of the pattern, but both should be known to the system. The checkerboard can be embedded in a larger surface; the boundaries of said surface may be of solid color (e.g. blue or green).

Image Capture

Next, image capture 302 occurs with a digital camera 404, which may be hand-held or moving and frames are stored to memory or to a disk. The intrinsic parameters of the camera may be estimated in advance if it is known they will not change. With known intrinsic parameters the image is corrected for distortion (Hartley and Zisserman 2000).

Image Processing

Following image capture as depicted at block 302, image processing is performed as illustrated at block 303. It is assumed that RGB (red, green, blue) input pixels $\{r_i, g_i, b_i\} \in I$ in the input image I are constrained to the range [0,1] by the sensor. If this is not the case (for example with 8-bit pixels) then the input pixel values are rescaled to the range [0,1].

Standard calibration methods assume a black and white checkerboard pattern. While this assumption can be relaxed, it is easy to convert the multi-chromatic grid into a black-white one for processing by standard methods. To do so, the RGB pixel values are projected onto the line in color space between the colors of the grid (i.e. the line between blue and green in RGB).

In the case of a blue-green grid, the color at each pixel in the original image I is processed to generate a new gray-scale image $\hat{I}$. Pixels $\{\hat{s}_i\} \in \hat{I}$ are computed from pixels $\{r_i, g_i, b_i\} \in I$ as follows:

$$\hat{s}_i = \frac{1}{2} + \frac{g_i - b_i}{2}$$

This results in a grayscale image which is brighter in areas that have more green than blue, and darker in areas that have more blue than green. This allows the use of standard checkerboard detection algorithms (typically tuned for grayscale images) as described next.

Patch Detection

Following image processing as illustrated at block 303, grid patch detection is performed as depicted at block 304 and described below. Pattern recognition is applied to this processed image $\hat{I}$ in order to detect patches of the grid pattern. There are many methods that could be used to detect a grid in an image. Since the background may be partially occluded by the user, it is important that the pattern recognition method be robust to occlusion.

The OpenCV library (Bradski and Kaehler, 2008) may be employed for the checkerboard detection function ("cvFindChessboardCorners"). This function returns an unordered set of grid points in image space where these points correspond to corners of adjacent quadrilaterals found in the image. Because the person occludes the grid, it may be the case that not all visible points on the grid will be connected. Thus, only a subset of the grid points corresponding to a single connected checkerboard region is returned; this subset is called a "patch". We discuss later on how to find the rest of the patches.

These image points on the patch must be put in correspondence with positions on the checkerboard in order to find a useful homography. First, we identify four ordered points in the patch that form a quadrilateral; we follow the method described in Section II of (Rufli et al. 2008). Second, these points are placed in correspondence with the corners of an arbitrary checkerboard square, from which a homography is computed (Zhang 2000). This homography still has a translation and rotation ambiguity, although the projected grid lines still overlap. We account for this ambiguity in the extrinsic computation stage 312. Third, to account for errors in corner detection, we refine this homography via gradient descent to robustly minimize the distances between all the homography-transformed grid points detected in the image and their respective closest 3D points of an infinite grid.

Once the homography for a patch is found, the image area corresponding to the patch is "erased" so that it will no longer be considered: specifically the convex hull of the points in the image space is computed, and all pixels lying inside that space are set to 0.5 (gray).

The checkerboard detection process described above is then applied again for the modified image to find the next patch of adjacent quadrilaterals and compute its homography. This is repeated until no additional corners are found as depicted at block 305. This results in a collection of patches, each with an associated homography that is relative to different checkerboard squares.

Intrinsic Computation

The detected grid patches with associated homographies following patch detection 304 can be used to estimate the intrinsic parameters of the camera illustrated at block 316. This step is necessary only in the case when the intrinsic parameters have not already been estimated using an offline calibration procedure. If at least two different views are available, the intrinsic parameters can be estimated (using the method proposed by Zhang (2000)) from the set of all patch homographies extracted in at least two different camera views. If only one view is available, intrinsic parameters may still be estimated from a set of patch homographies if common assumptions are made (zero skew and distortion, principal point at the center of the image) (Zhang, 2000; Hartley and Zisserman, 2000). This estimation step is illustrated by box 315.

Patch Consolidation

The total number of patches found in the patch detection step 304 usually exceeds the number of planar textured surfaces in the scene. In the patch consolidation step 306, each patch is assigned to one of the planar surfaces (the horizontal or vertical one). The homography for each patch can be upgraded to full extrinsic parameters (see Section 2b) given intrinsic parameters.

Given the rotation of the camera with respect to this planar surface, every other patch is then classified as either "vertical" or "horizontal" with respect to the camera by examining the 3D normal of the patch in the coordinate system of the camera. Specifically, if the patch normal is sufficiently close to being orthogonal with the camera's up vector, then the patch is classified as "vertical". This allows the grouping of patches into two larger patches: a horizontal patch 307 and a vertical patch 308. This provides a large set of points classified as "vertical", and a large set of points classified as "horizontal", each of which defines a large patch. A homography is computed for each of the large patches using the same method applied to the small patches during the patch detection step 304. This gives two homographies $H_v$ and $H_h$ 309.

Color Modeling

Given the image regions defined by the convex hull of each patch, a model of the colors of the grids is computed 310 for image segmentation 311. Note that if the grid colors are saturated, standard chroma-key methods can be extended to deal with multiple colors and the following statistical modeling step can be omitted. In general lighting however, fitting the color distributions given the found patches is beneficial.

With patches on the grids located, two color distributions are modeled: one for the vertical patch, and one for the horizontal patch. These correspond to the collection of colors associated with the areas covered by the smaller patches making up the larger ones. These smaller patches can then be used to train color distributions: one two-component Gaussian mixture model (GMM) in hue-saturation-and-value (HSV) color space for the horizontal surface, and one two-component GMM for the vertical surface. Because the surfaces face in different directions with respect to ambient lighting, they typically differ in the distribution of colors they generate.

Given these distributions, two probability images may be generated: $T_h$ and $T_v$. Note that $T_h$ gives the probability of a pixel being generated by the color distribution of the horizontal surface, and likewise $T_v$ represents the same properties for the vertical surface. By taking the per-pixel maximum $T_{max}$ of the two probability images $T_h$ and $T_v$, we obtain an image that is used for the last steps of the process: obtaining extrinsic camera parameters, and obtaining segmentation.

Segmentation

Segmentation is performed as depicted at block 311 to produce a segmented image 314 by thresholding $T_{max}$. The threshold may be adjusted manually. This separates the image into a foreground region (below the threshold) and a background region (above the threshold).

Extrinsic Computation

This step is illustrated by box 312.

Single Frame Case:

In the case of single frame, where we are only interested in the relationship between the camera and the horizontal plane, it is sufficient to upgrade $H_h$ to $\{R_h, t_h\}$ via the method described in Section 2b. This gives valid extrinsic parameters 313 relative to the horizontal plane although the location and orientation of the board inside the horizontal plane is ambiguous.

Multi-Frame Case (One Calibration Surface):

Shape estimation is better constrained from multiple camera views, however. Therefore, the case in which more than one frame is to be calibrated is now considered.

In this scenario, it is desirable to have a single world coordinate frame that relates all the camera views with consistent extrinsic parameters between views. Unlike the patch detection step 304, where the correspondence of a detected quadrilateral with the checkerboard was established arbitrarily, here we need to search for the correct correspondence in each camera view. The following adjustment is performed in order to compute the extrinsic parameters 313 with respect to a common coordinate system induced by the checkerboard. The key concept is to identify the entire board in the scene by matching it to the found feature points.

Here we propose searching over all possible ways an image quadrilateral detected in 304 can be matched with a checkerboard square. Given a pattern of M×N squares, where M and N are assumed known, there are a total of 4MN possible pairings: there are MN squares and four possible directions the quadrilateral may be "facing". To resolve ambiguities in the cardinal direction of the grid pattern, we recommend using rectangular grid patterns with even, but different, number of rows and columns, although symmetric patterns can also be handled in cases where camera motion between frames is relatively small. For each possible quadrilateral correspondence, we obtain a different homography $H_h$ using the method detailed in the patch detection step 304, which is then upgraded to the extrinsic parameters $\{R_h, t_h\}$ via the method described in Section 2b. Using the colors of the surface (as discovered via GMM in the color modeling step) and the extrinsic parameters, the calibration surface is rendered in each fully viewable candidate configuration (we assume the surface is completely within the camera frustum). Each rendered calibration surface is then compared with the observed image in the region of the rendered surface by finding the average absolute difference between the rendered pixels and the observed image pixels. The hypothesized camera configuration with the lowest such difference is selected. Other methods for robustly finding the grids in the image may be used and can be easily extended to detect grids when only part of the grid is visible in the image.

It should be noted that each such candidate configuration simply amounts to different horizontal translations and vertical orientations of the original camera (specified by $\{R_h, t_h\}$), each transformation being axis-aligned to the world coordinate system, and each translation being an integer multiple of the real-world width of the squares.

In the case of a video sequence of images, it is possible to take advantage of the small variations in camera extrinsic parameters between consecutive views and effectively perform grid tracking. Having located the grid in one frame, it is robustly tracked over subsequent frames and this gives corresponding corner locations. This eliminates the need for the exhaustive search described above.

Multi-Frame Case (Multiple Calibration Surfaces):

Although the multi-frame process results in consistent extrinsic parameters for each view, better results can be obtained by incorporating a second, non-coplanar, calibration surface (e.g. the vertical calibration surface). The steps for incorporating the additional surface are as follows.

First, for each frame, an estimate of the extrinsic parameters for the additional surface is obtained in the same manner as for the first surface. This gives $\{R_v, t_v\}$ in addition to the already computed $\{R_h, t_h\}$ for each view. This is over-parameterized, as the spatial relationship between the two surfaces is assumed constant (but unknown) between the frames. Therefore, the minimal set of extrinsic parameters includes $\{R_h, t_h\}$ for each view, and one instance of $\{R_L, t_L\}$, which specifies the extrinsic parameters of the additional surface with respect to the first surface. Because extrinsic parameters can be specified with six degrees of freedom, this makes the total number of parameters to estimate (6w+6), where w is the number of frames. These parameters can be optimized with gradient descent to minimize re-projection error of the image-space points found during patch detection 304.

This two-surface method can be extended to find a plurality of surfaces.

More General Formulations

The apparatus need not use a checkerboard or other symmetric pattern. Any known pattern will suffice and, in fact, introducing non-symmetric patterns removes ambiguities in the detection and fitting of the patterns. As an example, a non-symmetric pattern can be created by taking random pairs of grid locations and making them the same color; the result is a pattern with non-square elements.

Also the surfaces need not be planar, though planar surfaces make the computation of camera parameters from a single frame easier. In the case of non-planar surfaces an irregular pattern is preferred so that correspondence of feature points between frames may be unambiguously established. This allows the tracking of many feature points over time and the use of standard structure from motion algorithms to compute the camera parameters essentially the multi-chroma surface provides a dense "texture" that is visible for the purpose of camera motion tracking while being "invisible" for the purpose of foreground segmentation. This general formulation is particularly appropriate for standard film applications on a large set where camera motion must be tracked for the later insertion of graphics characters with live footage.

It should be recognized that the presently disclosed technique for performing calibration and segmentation may be applied to objects generally, such as human bodies, animals, inanimate objects or other background occluding objects.

Section 2d. Tri-Map Segmentation

In many cases it is not always possible or feasible to fully instrumented environment to make segmentation simple. For example a scanner in a changing room can be constructed such that the walls are painted or wallpapered with a blue and green pattern. Even so, a simple background cannot be guaranteed since the user might hang clothes on the wall or place them on the floor. In this case a tri-map based segmentation method is described to obtain the foreground region.

Given the initial shape and pose (either from fitting the body model coarsely, with only the first few shape coefficients and an approximate 3D pose of the body or from an initial low accuracy segmentation or by manual initialization) 501, we find an initial set of pixels that are likely to be inside the body that are then refined. One method projects the model into the image to create a 2D silhouette. This silhouette is then dilated and eroded by several pixels (the number may be a function of the image size) 502. This creates a "tri-map" of pixels 503 that are very certain to be inside and outside the body as well as pixels that are uncertain. Given such a tri-map 503, we use a standard segmentation method 504 such as GrabCut (Rother et al. 2004) to segment each input image into a refined foreground/background segmentation 505.

Section 2e. Image Skin Detection and Segmentation

There are many algorithms in the literature that perform skin detection (e.g. Jones and Rehg 2002). Many of these deal with variations in lighting and skin tone across different people and can be quite accurate. Clothing detection is a harder problem due to the wide variability of materials, colors, and patterns used to make clothing. Hair detection has also received some attention. In our case, skin and hair detection is sufficient to constrain the remainder of the foreground region to be classified as "clothing". Skin and clothing regions will be treated differently in the fitting process.

A method is described for segmenting an image into skin and non-skin regions, although the precise formulation is not critical. In order to detect skin colored regions in an image, a skin detector can be built from training data using a simple non-parametric model of skin pixels in hue and saturation space. By switching from the RGB to the HSV color space, the Value channel can be ignored, which captures mostly lighting intensity information. Using a large dataset of images that have been segmented into skin or non-skin, a normalized joint histogram (H,S|skin) of Hue and Saturation values is built for the skin pixels. A threshold on the histogram is used to obtain a binary skin classifier for (Hue, Saturation) pairs: P(H, S|skin)≥threshold.

After individual pixels have been classified as being skin or not skin, several standard image filters are applied to improve the segmentation, including dilation, median filtering, and removal of small disconnected components.

SECTION 3. BODY MODEL

In one embodiment, a parametric 3D body model called SCAPE (Anguelov et al., 2005) is employed. SCAPE is a deformable, triangulated mesh model of the human body that accounts for different body shapes, different poses, and non-rigid deformations due to articulation. For vision applications, it offers realism while remaining relatively low dimensional. It also factors changes in body shape due to identity and changes due to pose.

It has been observed that SCAPE has many desirable properties but other deformable graphics models exist in the literature. Synthetic body models can be generated using specialized commercial software tools (e.g. 3D Studio Max, BodyBuilder, Maya, Poser). The shape is controlled though a number of parameters while pose is varied by associating the surface mesh with a kinematic skeleton. While such models are easy to animate, and allow for pose and shape to be altered independently, the resulting shapes often lack realism.

Most realistic models learn either the deformations due to pose or due to identity changes from example 3D body scans, but not both. They use incompatible representations that make merging the two deformation models difficult. For example, Allen et al. (2002) learn a model of pose deformations using point displacements from an underlying articulated model and focus on a single subject, while Allen et al. (2003) and Seo et al. (2003) model identity changes as point displacements from an average shape, embedded in a linear subspace. The latter however can be animated using procedural skinning techniques but cannot capture muscle bulging and creates twisting artifacts at the joints.

In addition to SCAPE, two other models are known that are able to combine learned pose and learned identity shape changes. Allen et al. (2006) learn a complex system that combines corrective skinning learned from examples with a latent model of identity variation. Unfortunately the complexity of the proposed training phase limits the amount of training data that can be used, which consequently impairs the model's realism.

Hasler et al. (2009a) proposed a representation that couples pose and identity shape deformations into a single linear subspace, where the deformations are based on an encoding that is locally invariant to translation and rotation. However, their model lacks the property of being able to factor changes due to pose from changes due to identity, which is necessary for estimating a consistent shape across different poses.

While not as realistic as SCAPE, any of these parametric models or other suitable parametric models that factor pose and shape can be used instead. In particular, the simpler body model can be used to obtain an initial estimate of the pose and shape which optionally can be refined using a more realistic model such as SCAPE.

SCAPE Model

The SCAPE model is derived from a large training set of human laser scans, which have been brought in full correspondence with respect to a reference mesh, and implicitly with each other (Allen et al. 2003, Anguelov et al. 2005, Seo et al. 2003, Hasler et al. 2009b). By this, what is meant, for example, is that a mesh vertex on the right shoulder in one person corresponds to the same vertex on another person's shoulder. It also means that all aligned meshes have the same number of vertices and triangles. We use a reference mesh with V=12,500 vertices and T=25,000 triangles (Balan et al., 2007a) though both finer and coarser meshes may be used. The strength of SCAPE comes from the way it represents deformations, using shape deformation gradients between a reference mesh and other instance meshes. Shape deformation gradients are 3×3 linear transformations specific to each triangle that can be combined in a multiplicative way. This gives SCAPE the ability to model pose and body shape deformations separately and then combine the two different deformation models in a natural way.

New body shapes and poses can be created by taking a reference 3D body template mesh X and applying a series of transformations to its edges to derive a new body mesh Y with a new shape and pose. Let $(x_{t,1}, x_{t,2}, x_{t,3})$ be the vertices of a triangle belonging to the template mesh X and $(y_{t,1}, y_{t,2}, y_{t,3})$ be the corresponding triangle from a new body mesh Y. Following Anguelov et al. (2005), two edges of a triangle starting at $x_{t,1}$ as $\Delta x_{t,e} = x_{t,e} - x_{t,1}$, $e=2,3$ are defined. The deformation of one mesh to another is modeled as a sequence of linear transformations or deformations (described below) applied to the triangle edges of the template mesh:

$$\Delta y_{t,e} = R_{p[t]}(\theta) D_t^{U,\mu}(\beta) Q_t^{\alpha}(\theta) \Delta x_{t,e}.$$

A new mesh Y is created from the transformed triangles of X by solving a least squares optimization problem $$Y(\beta, \theta) = \underset{\{y_1,\ldots,y_V\}}{\operatorname{argmin}} \sum_{t=1}^{T} \sum_{e=2,3} \left\| R^{p[t]}(\theta) D_t^{U,\mu}(\beta) Q_t^{\alpha}(\theta) \Delta x_{t,e} - \Delta y_{t,e} \right\|^2.$$

Articulated Deformations.

Assuming that the mesh triangles are assigned to P individual body parts, we rotate the parts to produce the desired joint angle configuration defined by $\theta$. $R_{p[t]}(\theta)$ is a rigid 3×3 rotation applied to each triangle t corresponding to a particular body part p. We take P=15 corresponding to the head, torso, pelvis, upper and lower arms and legs, hands and feet. Additional parts can be defined; for example the torso can be divided into several parts (Anguelov et al. 2005).

Non-Rigid Pose-Induced Deformations.

Transforming a mesh according to the articulated rigid transformation above results in a new mesh that does not capture the non-rigid deformations associated with complex joints such as the shoulder, muscle budging, and deformation of soft tissue. The approach taken by Anguelov et al. (2005) was to learn a linear predictor of pose-dependent deformations used to correct the body shape for any non-rigid pose-dependent shape change. $Q_t^{\alpha}(\theta)$ is a learned 3×3 linear transformation matrix specific for a given triangle t corresponding to non-rigid pose-induced deformations such as muscle bulging; this is implemented as a linear function with linear coefficients $\alpha$ of the rigid rotations of the two neighboring body parts. The linear coefficients $\alpha$ are learned from training scan data of a single subject scanned in 70 different poses with known part orientations. The learned deformations predict the deviations from the articulated rigid transformation to the observed laser scan.

Body Shape Deformations.

Finally, the shape of the person is changed by applying a linear 3×3 shape deformation $D_t^{U,\mu}(\beta)$ to each triangle in the mesh. Given a template mesh aligned with example bodies, the deformation for each triangle in the template is computed to the corresponding triangle in each example mesh. A low-dimensional, parametric, model is sought that characterizes these variations within a population of people.

A training set is constructed of body shape deformations between the template mesh and over 2000 body scans of North American adults with roughly equal gender representation (Civilian American and European Surface Anthropometry Resource (CAESAR), SAE International. For a given mesh, the body shape deformations for all triangles are concatenated into a single column vector and every example body becomes a column in a matrix of deformations. Incremental principal component analysis (PCA) (Brand, 2002) is used to find a reduced-dimension subspace that captures the variance in how body shapes deform. The first n principal components are used to approximate the vector of deformations as $D^{U,\mu}(\beta) = U\beta + \mu$ where $\mu$ is the mean body shape, U are the first n eigenvectors given by PCA and $\beta$ is a vector of linear coefficients that characterizes a given shape; in one embodiment n=20 though more bases can be used to increase shape accuracy. The variance of each shape coefficient $\beta_j$ is given by the eigen-values $\sigma_{\beta,j}^2$ obtained by PCA.

In contrast to the original SCAPE formulation, separate eigen-models are learned for over 1,000 male and 1,000 female subjects respectively (Allen et al. 2003), as well as a gender-neutral model with all the subjects combined:

$$D(\chi,\beta^\chi)=U^\chi\beta^\chi+\mu^\chi, \text{ where } \chi\in\{male, female, neutral\}.$$

The variable $\chi$ denotes the gender model used. For the CAESAR dataset, the first n=20 principal components account for roughly 70% of the body deformation variance in the gender-neutral case and 65% of the variance in the gender specific cases.

For the remainder of the document, whenever the choice of gender model can either be inferred from the context or is not critical to the discussion, the $\chi$ gender superscript $\chi$ is omitted.

Mesh Transformation.

A new mesh Y, not present in the training set, is computed from the desired joint angles $\theta$, shape coefficients $\beta$ and gender $\chi$ by solving $$Y(\chi, \beta^\chi, \theta) = \operatorname*{argmin}_{\{y_1,\ldots,y_V\}} \sum_{t=1}^{T} \sum_{e=2,3} \left\| R^{p[t]}(\theta) D_t^{U^\chi, \mu^\chi}(\beta^\chi) Q_t^a(\theta) \Delta x_{t,e} - \Delta y_{t,e} \right\|^2.$$

This optimization problem can be expressed as a linear system that can be solved efficiently using linear least-square regression techniques. It is noted that this formulation leaves unconstrained three translational degrees of freedom. Therefore the global position of the mesh also needs to be specified and, for notational convenience, these parameters are included in the parameter vector $\theta$.

SECTION 4. INITIALIZATION OF BODY POSE AND SHAPE

Estimating body shape and pose is challenging in part due to the high dimensional nature of the problem. Body pose may be described by approximately 40 parameters while shape may be described by 20-100 or more. Searching such a space is computationally challenging and is made more difficult when the sensor input is noisy (e.g. time of flight depth data) or ambiguous (e.g. monocular image silhouettes).

One way to make the optimization of body shape and pose practical is to initialize the search near the true solution. This initialization component can take several forms depending on the application domain. If the initialization step is sufficiently accurate, it may not be necessary to perform an additional optimization step.

The initialization of body pose can be accomplished in a number of ways. Four cases are described. A simple case is described where the subject is directed to stand in a particular pose and so the articulated pose initialization is known a priori, leaving only the global pose to be recovered (Section 4a). A method is described for obtaining both the global and articulated pose from user input (Section 4b). A discriminative method is described for finding the 3D pose directly from 2D image evidence (Section 4c). Other initialization methods could be employed, such as using coarser body models which allow for an efficient, albeit less accurate, search over a larger space of poses, as described in (Balan et al. 2007a), and then initializing the present model from the coarser method's result. Finally, a method is also described herein for initialization of body shape based on measurements (Section 4d).

4a. Constraining the Set of Body Poses

In many applications it is possible to have people stand in one or more, fixed, known poses. This simplifies the initialization significantly. If the pose parameters are assumed known, then one can solve for the rigid 3D transformation that aligns the body with the image evidence. This method has the following steps:

1. Choose an initial body shape. This can be the overall mean shape or the mean shape for a particular sub-population, if this is known (e.g. women or men). A more detailed shape initialization method is defined below (Section 4d).
2. Pose the 3D body model with this initial shape in the known pose.
3. Solve for the 3D position and orientation of the body in the reference coordinate system using any of the standard optimization methods, but keeping articulated pose and shape parameters fixed. To solve for 3D position, the optimization method discussed in Section 6 that follows can be used by simply keeping the pose and shape parameters fixed. If the environment is constrained, the 3D position and orientation may be approximately known, in which case this step is skipped.

Given this starting point, the body shape and pose is refined (Section 6).

4b. Initialization of Body Pose from Clicked Points

It is possible to obtain an initial 3D body pose from user input. A user could specify the initial pose directly, for example using a 3D modeling interface, but it is desirable to provide an interface such that a non-expert user can specify the initial pose with a minimum of effort. Taylor (2000) described a method for such an method from a single image, where the user clicks on major joints in the image and provides information about whether each limb is extending out from the image plane or receding into it; given known limb lengths, he reconstructs a plausible 3D pose, under the assumption that the camera is orthographic. Lee and Chen (1985) described a similar method under the assumption of a perspective camera, which they demonstrated only on noiseless, synthetic data, allowing them to obtain necessary information about the perspective camera calibration in a manner that is infeasible for real imagery. Presently disclosed is an implementation that works on a wide variety of real images that also initializes body shape.

In accordance with the present teachings, a skeleton is defined that is composed of major joints that the user should be able to readily identify in the image, and the line segments connecting them which are referred to as limbs. If the 3D position of the joint at one end of the limb and the length of the limb are known, then the position of the other end of the limb must lie on a sphere, centered on the known joint with a radius equal to the limb length. Given a clicked point in the image plane and a method for projecting a camera ray corresponding to that clicked point into 3-space (Hartley and Zisserman 2000), the end of the limb is located using ray-sphere intersection. There are, of course, three possibilities: the ray can intersect the sphere at zero, one, or two points. If there are two intersections, they correspond to the limb extending out from the image plane or receding into it; the user can easily disambiguate these two cases and indicate which case is present using a graphical interface (GUI). If there is a single point of intersection, then the limb lies exactly in the image plane and the location of the end point is not ambiguous, but due to numerical precision, this is unlikely in practice. Finally, if there are no intersections, then the clicked point, the limb length, and the known joint position are inconsistent; an error is presented to the user and the user is allowed to readjust the point.

Taylor (2000) assumes that the camera is orthographic, which provides several advantages: finding the ray for a given clicked point is trivial and depth becomes relative, so he can simply fix one joint to a depth of 0. From this first, or root joint, he traverses the body skeleton, taking all limbs associated with the root joint and locating their endpoints; he then takes each of those newly located endpoints and follows the remaining limbs from them to locate their other ends, and so on until he has located all joints. Unfortunately, plausible results are only achieved where the orthographic assumption is close to valid, for example in photos taken with a telephoto lens.

Extending this to the case of a perspective camera allows plausible 3D poses to be found from a wide variety of images, but requires two additional items. In order to model the perspective camera, its focal length needs to be known and a way to locate the depth of one of the joints from which to traverse the skeleton and recover the pose is needed. The focal length is often encoded in the image EXIF metadata and can be easily extracted. When it is not, allowing the user to select a reasonable focal length, for example with a graphical interface, often leads to more accurate pose estimates than simply making the orthographic assumption. The average focal length over a set of example images can also be used and is often sufficient for initialization.

Locating the first (root) joint in 3D is a more difficult problem and has not been previously addressed. Some assumptions need to be made in order for the problem to be well defined. One tractable assumption is that one limb lies in the image plane; a relaxed version of this assumption can be used where the user varies the protrusion of this limb interactively, for example using a graphical interface (e.g. a slider that controls a graphics simulation illustrating said protrusion). The limb that is the closest to lying in the image plane is detected by examining the ratio of the 2D distance, d, between clicked points and the 3D limb lengths, l. The limb whose ratio d/l is the largest is the closest to lying in the image plane. The depth is then found using a ratio of similar triangles.

One limitation of the methods of both Taylor (2000) and Lee and Chen (1985) is the assumption that limb lengths are known a priori. This assumption is relaxed in the present invention by employing a statistical model of human shape built from a database of scans of real humans. For a given pose, limb lengths are defined as a linear function of the vertices of a mesh transformed into that pose. Anthropometric data such as height and weight specified by the user are obtained to find an estimated body shape (Section 4d, below) and thus approximate limb lengths specific to the person.

If range data is available with known spatial relationship to the visible image data, the clicked points in the visible image can be directly mapped to the 3D range data. This greatly simplifies the initialization because the ambiguities about the depth of the points are removed. The pose of the body skeleton can be optimized so that the 3D location of the joints directly fit the 3D measurements. Alternatively, the user can specify (click) the points directly on a visual presentation of the range data.

4c. Learned Mapping from Features to Shape and Pose

Automatic initialization of the body shape and pose can be obtained by directly fitting a mathematical model relating image measurements to body shapes and poses. This is an example of a discriminative method. Such methods have been used for estimating body pose (Agarwal and Triggs 2005, 2006; Kanaujia et al. 2007; Poppe and Poel 2006; Sminchisescu et al. 1999, 2006) but not body shape; in fact, they are specifically designed to be invariant to body shape variations. The first known description of a discriminative method for body shape estimation is discussed in Sigal et al. (2007, 2008).

Discriminative approaches to pose estimation attempt to learn a direct mapping from image features to 3D pose from either a single image (Agarwal and Triggs 2006; Rosales and Sclaroff 2002; Sminchisescu et al. 2005) or multiple approximately calibrated views. These approaches tend to use silhouettes (Agarwal and Triggs 2006; Rosales and Sclaroff 2002) and sometimes edges (Sminchisescu et al. 1999, 2006) as image features and learn a probabilistic mapping in the form of Nearest Neighbor (NN) search, regression (Agarwal and Triggs 2006), mixture of regressors (Agarwal and Triggs 2005), mixture of Bayesian experts (Sminchisescu et al. 2005), or specialized mappings (Rosales and Sclaroff 2002). While effective and fast, they are inherently limited by the amount and the quality of the training data. More importantly they currently do not address estimation of the 3D body shape itself. The deficiencies of the current models for discriminative pose estimation are addressed by the present invention to deal with the estimation of 3D body shape. A probabilistic model is introduced from which samples are drawn, and these samples can be used as initial estimates for a generative body shape optimization method (Section 6).

Grauman et al. (2003) use a combination of generative and discriminative methods. For a multi-view set of 2D image contours they use a generative approach to match a learned multi-view-contour model to the image data (i.e. they solve for the parameters of the low-dimensional contour model). Given the training data associating 2D contours with 3D models, they use the parameters of this 2D contour match to find the missing 3D parameters that should be associated with them. In contrast, the presently disclosed discriminative approach learns a direct mapping from 2D image features in a single image to 3D shape and pose parameters.

Figure 6:
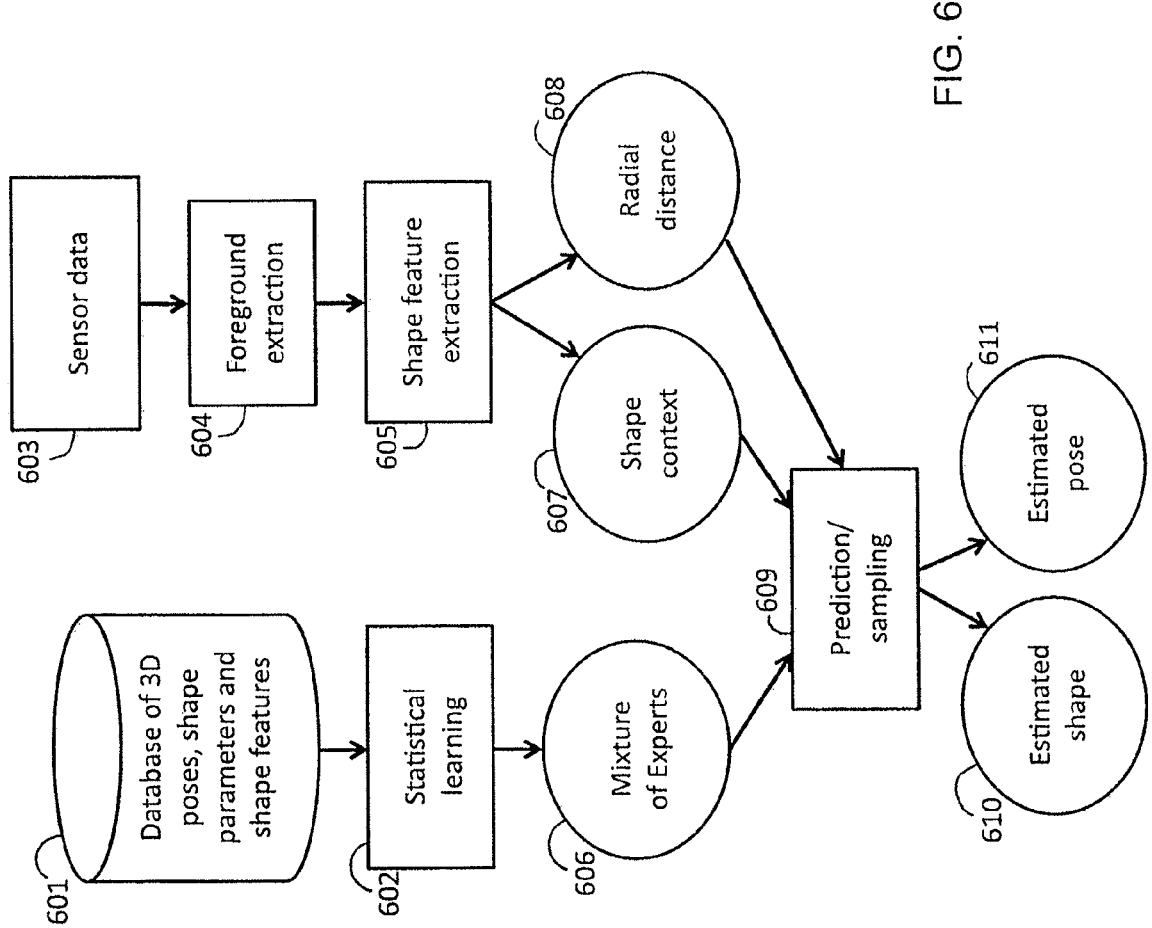
FIG. 6 is a flow diagram depicting a method of performing discriminative body shape and pose estimation.

For discriminative pose and shape estimation as depicted in FIG. 6, a Mixture of Experts model 606 is employed, with experts defined using kernel linear regression. A statistical learning method illustrated at block 602 uses a database 601 of training body shapes, poses and corresponding shape features to build a direct probabilistic mapping between monocular silhouette contour features and the body shape and pose parameters (in the form of the Mixture of Experts model 606). The approach recovers an approximation to the 3D shape and pose of the human body directly from features in a sensor data 603 such as a single monocular image. The input sensor data is processed to identify the foreground region corresponding to the body as illustrated by foreground extraction block 604 and the result is then processed to extract shape features as illustrated at block 605. Samples are drawn from this probabilistic model as illustrated at 609 where each sample corresponds to a 3D body pose 611 and shape 610. The sampled shapes are sufficiently accurate to initialize the more precise generative optimization process discussed in Section 6.

In one embodiment, the shape features in the database 601 are obtained by projecting the example 3D body models model into the image plane of a synthetic camera to produce a silhouette. From this silhouette features such as radial distance 608 or shape contexts 607 are estimated. The mixture of experts 606 is trained using the database 601 of body shapes and poses along with their corresponding shape features as projected onto a synthetic camera view. Any suitable parametric model of the body could be used but in one embodiment, the SCAPE model is used to generate 3D body shapes and their projected image silhouettes. While the focus here is on 2D image features, one should note that the learned mixture of experts does not take images or silhouettes as input. In general, it takes feature descriptors computed from sensor input. One can replace the 2D silhouettes with range maps or other sensor data and compute different feature vectors such as 3D radial distance, spherical harmonics, 3D curvature features, etc. In the case of a range sensor, the 3D body model is used to produce synthetic training range data corresponding to particular sensor viewing directions. The core learning and prediction methods are independent of the source of the feature vectors. Furthermore, the sensor data may come from one or more sensors such as multiple camera views. In the case of multiple views, the features associated with each view may be concatenated into one feature vector for training.

2D Shape Feature Extraction

The foreground extraction component 604 is used to extract a putative region corresponding to the location of the person in a 2D image. Image silhouettes are commonly used for human pose estimation; while limited in their representational power, they are easy to estimate from images and fast to synthesize from a mesh model. Given a foreground region, shape feature descriptors are extracted to characterize the 2D shape 605. They may be used together as a combined feature or separately. Two shape features are described below but many other 2D image features could be used (e.g. shape context over internal and external edges (Sminchisescu et al. 2005) or descriptors such as SIFT (Lowe 2004), HOG (Dalal and Triggs 2005), Vocabulary Trees (Kanaujia et al. 2007), Hyperfeatures (Kanaujia et al. 2007) or HMAX features (Riesenhuber and Poggio 1999; Kanaujia et al. 2007)).

Feature 1: Histograms of Shape Context 607.

Shape contexts (SC) (Belongie et al. 2001) are rich descriptors based on the local shape-based histograms of the contour points sampled from the boundary of the silhouette (or internal and/or external edges). At every sampled boundary point the shape context descriptor is parameterized by the number of orientation bins, $\phi$, number of radial-distance bins, r, and the minimum and maximum radial distances denoted by $r_{in}$ and $r_{out}$ respectively. As in (Agarwal and Triggs 2006), scale invariance is achieved by making $r_{out}$ a function of the overall silhouette height and by normalizing the individual shape context histogram by the sum over all histogram bins. Assuming that N contour points are chosen (e.g. at random) to encode the silhouette, the full feature vector can be represented using a histogram with $r_N$ bins. Even for moderate values of N this produces high dimensional feature vectors that are hard to deal with.

To reduce the silhouette representation to a more manageable size, a secondary histogram step is used (Agarwal and Triggs 2006). In this bag-of-words model, the shape context space is vector quantized into a set of K clusters (a.k.a. codewords). The K=100 codebook is learned by running k-means clustering on the combined set of shape context vectors obtained from the large set of training silhouettes. Once the codebook is learned, the quantized K-dimensional histograms are obtained by voting into the histogram bins corresponding to codebook entries. Soft voting has been shown (Agarwal and Triggs 2006) to reduce effects of spatial quantization. The final descriptor $X_{sc}$ of length K is normalized to have unit norm to ensure that silhouettes that contain different number of contour points can be compared.

The resulting codebook shape context representation is translation and scale invariant by definition. Following prior work (Agarwal and Triggs 2006; Poppe and Poel 2006) one embodiment uses $\phi=12$, $r=5$, $r_{in}=3$, and $r_{out}=\kappa h$ where h is the height of the silhouette and $\kappa$ is typically ¼, ensuring the integration of contour points over regions roughly approximating the size of a human limb (Agarwal and Triggs 2006); other parameters settings are possible. For shape estimation, it has been determined that combining shape context features across multiple spatial scales (e.g. $\kappa=\{¼, ½, \ldots\}$) into a single feature vector is more effective. This can be done by simply concatenating the feature representations obtained with different settings for $\kappa$. Since this may result in high dimensional feature vectors one can optionally perform iterative feature selection (Bo et al. 2008) using one of a variety of machine learning techniques (e.g. by looking at the relative information gain of each feature vector dimension).

Feature 2: Radial Distance Function 608.

The Radial Distance Function (RDF) features are defined by a feature vector $$X_{RDF}=\{p_c,\|p_1-p_c\|,\|p_2-p_c\|,\ldots,\|p_N-p_c\|\},$$

where $p_c$ is a vector of image positions for the centroid of the image silhouette, and $p_i$ is a point on the silhouette contour; hence $\|p_i-p_c\|$ is a scalar value measuring the distance from the centroid to point i on the contour. In one embodiment, we use N=100 points, resulting in the $X_{RDF}$ being a vector of 102 elements. This ensures that the dimensionality of the RDF descriptor is comparable to that of shape context feature above.

Unlike the shape context descriptor, the RDF feature vector is neither scale nor translation invariant. Hence, RDF features are best suited for applications where camera calibration is known and the training data can be constructed using this known calibration information. This is possible in an embodiment such as a changing room scanner where the camera or other sensors remain in a fixed location and the location of the person is fairly constrained.

Mixture of Experts (Learning)

To produce initial estimates for the body pose and/or shape in 3D from image features, the present method first models the conditional distribution p(Y|X) of the 3D body state Y given the feature vector X. Intuitively this conditional mapping should be related to the inverse of the camera projection matrix and, as with many inverse problems, is highly ambiguous. To model this non-linear relationship a Mixtures of Experts (MoE) model is used to represent the conditional distribution (Agarwal and Triggs 2005; Sminchisescu et al. 2005).

The parameters of the MoE model are learned by maximizing the log-likelihood of the training data set $D=\{(x^{(1)}, y^{(1)}), \ldots, (x^{(N)}, y^{(N)})\}$ consisting of N input-output pairs $(x^{(i)}, y^{(i)})$. In one embodiment, an iterative Expectation Maximization (EM) algorithm, based on type-II maximum likelihood, is used to learn parameters of the MoE (Sminchisescu et al. 2005). The presently disclosed model for the conditional probability can be written as:

$$p(Y\mid X) \propto \sum_{k=1}^{M} p_{e,k}(Y\mid X, \Theta_{e,k})p_{g,k}(k\mid X, \Theta_{g,k})$$

where $p_{e,k}$ is the probability of choosing pose Y given the input X according to the k-th expert, and $p_{g,k}$ is a "gate" that models the probability of the input being assigned to the k-th expert using an input sensitive gating network; in both cases $\Theta$ represents the parameters of the mixture and gate distributions respectively.

For simplicity and to reduce complexity of the experts kernel linear regression with constant offset, $Y=\beta X+\alpha$, was chosen as the expert model, which allows an analytic solution of the parameters $\Theta_{e,k}=\{\beta_k, \alpha_k, \Lambda_k\}$ using weighted linear regression, where $$p_{e,k}(Y \mid X, \Theta_{e,k}) = \frac{1}{\sqrt{(2\pi)^n |\Lambda_k|}} e^{-\frac{1}{2}\Delta_k^T \Lambda_k^{-1} \Delta_k}$$

and $\Delta_k = Y - \beta_k X - \alpha_k = Y - \mu_k$. Of course non-linear kernels (e.g., Radial Basis Functions) could also be used and there are standard methods to fit these to the data described herein.

Pose and shape estimation is a high dimensional and ill-conditioned problem, so simple least squares estimation of the linear regression matrix parameters typically produces severe over-fitting and poor generalization. To reduce this, ridge regression is used and smoothness constraints are added on the learned mapping that regularize the solution. The matrix of regression coefficients can be estimated as follows:

$$\beta_k = (D_Y^T W_k D_Y + \lambda I)^{-1} D_Y^T W_k D_X$$

where $D_X = \{x^{(i)} | i=1 \ldots N\}$ is a vector of inputs, $D_y = \{y^{(i)} | i=1 \ldots N\}$ is vector of corresponding outputs, $W_k = \text{diag}(w_k^{(1)}, w_k^{(2)}, \ldots, w_k^{(N)})$ is a diagonal matrix with optional "relative importance" parameters (for a given expert k), for each corresponding training sample, along its diagonal ($w_k^{(i)}$ is between 0 to 1, such that sum over $w_k^{(i)}$ for all k equals 1), I is the identity matrix, and $\lambda$ is a smoothness parameter. The offset parameters $\alpha_k$ are estimated as $$\alpha_k = \frac{\sum_{i=1}^{N} w^{(i)} x^{(i)}}{\sum_{j=1}^{N} w^{(j)}}.$$

Since the solution of the ridge regressors is not symmetric under the scaling of the inputs, the inputs $\{x^{(1)}, x^{(2)}, \ldots, x^{(N)}\}$ are normalized by the standard deviation in each dimension respectively before solving.

The smoothness is controlled by a parameter $\lambda$. An overly smooth mapping (that results from setting $\lambda$ to a large value) will not capture the structure of the regression problem and will generally result in nearly the same output pose and shape for any set of input features (rendering the discriminative method useless). An under-smoothed mapping (resulting from setting $\lambda$ to a very small value) will generally overfit the training data and also produce sub-optimal estimates on the test data. To choose an appropriate value for $\lambda$ a withheld validation dataset is used to ensure that optimal performance is achieved.

To learn the gate parameters, the probability that a given training sample is generated by one of the M experts (e.g., by expert k) is first estimated. This value, $z_k^{(n)}$, is the "ownership weight" for expert k of the training instance n. These ownership weights are computed by taking the product of the probability of activation of the gate for expert k (given an estimate of current gate parameters, $\Theta_{g,k}$)

$$p_{g,k}(k \mid X = x^{(n)}, \Theta_{g,k}) = \frac{1}{\sqrt{(2\pi)^n |\Sigma_k|}} e^{-\frac{1}{2}(x-\mu_k)^T \Sigma_k^{-1}(x-\mu_k)},$$

and the probability of the expert k generating the desired output (given the estimate of the current expert parameters, $\Theta_{g,k}$), $$p_{e,k}(Y = y^{(n)} \mid X = x^{(n)}, \Theta_{e,k}) = \frac{1}{\sqrt{(2\pi)^n |\Lambda_k|}} e^{-\frac{1}{2}\Delta_k^T \Lambda_k^{-1} \Delta_k}$$

divided by the sum of this product over all M experts:

$$z_k^{(n)} = \frac{p_{e,k}(y^{(n)} \mid x^{(n)}, \Theta_{e,k}) p_{g,k}(k \mid x^{(n)}, \Theta_{g,k})}{\sum_{j=1}^{M} p_{e,j}(y^{(n)} \mid x^{(n)}, \Theta_{e,j}) p_{g,j}(j \mid x^{(n)}, \Theta_{g,j})}.$$

Intuitively this measures the fraction of the time a desired output pose and shape is generated from a given input set of features by a given expert k. Once this is computed the new parameters of the gates can be found by computing sufficient statistics of the corresponding statistical distribution, by weighting the input features by the probability of them being interpreted by the given expert k; similarly the parameters of the experts can be found by weighted regression based on the input-output training pairs (with the same weights); see above. In the weighted regression the method simply uses "ownership weights", $z_k^{(i)}$, as "relative importance" weights, $w_k^{(i)}$, resulting in $W_k = \text{diag}(z_k^{(1)}, z_k^{(2)}, \ldots, z_k^{(N)})$. The entire process can then be iterated to refine the parameters of the model.

The above discussion describes the expectation-maximization (EM) procedure for the MoE model. In one embodiment, three separate models are learned: shape, $p(v|x)$, articulated pose, $p(\theta|X)$ and global position of the body in the world, $p(\tau|X)$. Of course they could be combined and learned together as well. Similar to (Agarwal and Triggs 2005) one embodiment initializes the EM learning by clustering the output 3D poses and shapes using a k-means procedure. This results in $z_k^{(i)}=1$ for those training examples i that are assigned to the same k-th cluster, and $z_k^{(j)}=0$ for all remaining samples.

Articulated pose and shape experiments were conducted using both RDF and SC features (global position requires RDF features since SC is location and scale invariant). SC features tend to work better for pose estimation whereas RDF features perform better for shape estimation. Hence, the following conditional models are learned: $p(v|X_{RDF})$, $P(\theta|X_{SC})$ and $p(\iota|X_{RDF})$. In cases where calibration is unavailable, the shape is estimated using $p(v|X_{SC})$ which tends to produce reasonable results but cannot estimate the overall height of the person. The number of mixture components, M, and regularization parameter, $\lambda$, are estimated by learning a number of models and cross validating on a withheld dataset.

Prediction/Sampling

Given the MoE model 606, initial guesses for the body shape and pose are generated given only a single input image or other sensor data. In particular, one embodiment does so by drawing samples from the probabilistic model. Since the MoE defined above is a mixture of linear Gaussian elements, this can be achieved given input feature vector X. Sampling involves first choosing an expert, k, at random, proportional to the gaiting weights (which sum to one). This then defines a linear model that predicts the mean of the expert, $\mu_k = \beta_k X - \alpha_k$. Finally a sample is drawn from the Gaussian distribution defined by $p_{e,k}$. Since the model is divided up into separate discriminative models for the shape, $p(v|X)$, position, $p(\tau|X)$, and articulated pose, $p(\theta|x)$, of the body, samples are drawn independently from each. To obtain a joint estimate for the pose, shape and position, the samples from the three models are combined. This can be done, for example, by independently sampling from each of the three trained models and concatenating all parameters into a single joint sample vector. In general, this process may require the total number of joint samples that is a product of the number of samples required to characterize each of the three conditional distributions.

Several such joint samples can be generated. These are then used to start the optimization process using one of several methods to fit the 3D body model to image or other sensor evidence (Section 6). Alternatively, the samples may be used without any further optimization.

Shape Consistency

The accuracy of this discriminative method can be improved by modeling the consistency in the estimated shape over time. If several images of the person are available in possibly different poses, the shape parameters θ should be consistent for all these poses. One can recover a better set of shape parameters by taking a product over conditional distributions obtained in each frame. Since the form of each conditional distribution is a mixture of Gaussians, the final product will also be a mixture of Gaussians, but the representation (and computation required to compute this final mixture) will grow exponentially with the number of frames. One way to battle this computational complexity is by characterizing the modes of the distribution rather than the full distribution. This can be done by sampling an estimate for the shape parameters from either one of the conditional distributions at random or from the product (e.g., by using Gibbs sampling (Ihler et al. 2003)) and then refining this sample using a gradient ascent procedure defined over the product of conditional distributions. This is efficient because the gradient of the product can be expressed using products of simple factors from the gradient expressions of the individual conditionals.

Similarly, if it is known the poses come from a sequence of images then temporal consistency may be enforced on the poses such that the change in pose between frames is small. This can be done by training an auxiliary discriminative model, $p(\theta_t|\theta_{t-1}, X_t)$, where the articulated pose at frame t, $\theta_t$, is estimated (regressed) from the pose at the previous time frame t−1, $\theta_{t-1}$, and features at frame t, $X_t$. In essence the training and the use of this model is precisely the same as before, except the training proceeds to learn from data triplets $D=\{(\theta_t^{(1)}, \theta_{t-1}^{(1)}, x_t^{(1)}), \ldots, (\theta_t^{(N)}, \theta_{t-1}^{(N)}, x_t^{(N)})\}$ (two inputs and a single output, $\theta_t$). The pose estimation can then be done by using the old discriminative model, $p(\theta_1|X_1)$, for the first frame resulting in a distribution over $\theta_1$; then subsequently using the auxiliary model, $p(\theta_t|\theta_{t-1}, X_t)$, to propagate these estimates temporally (while still taking into account observations), e.g., $p(\theta_2|\theta_1, X_2)$, $p(\theta_3|\theta_2, X_3)$ and so on.

The key challenge is to ensure that the representation of distributions over the articulated pose (θ) does not grow during inference as they are propagated through this multi-modal conditional, $p(\theta_t|\theta_{t-1}, X_t)$, from frame to frame. This can be done by fitting a fixed representation to the estimated distribution at every frame. For example by minimizing the KL divergence between a Gaussian mixture with a fixed number of components and the estimated mixture (the number of components of which may differ from frame to frame).

4d. Initialization of Shape from User Supplied Measurements

Note that while the body shape estimation methods disclosed here provide one way of obtaining a body shape model, they are not the only way. Several on-line retail-clothing applications allow people to enter their own body measurements; these are often quite inaccurate and variable. Still others allow users to answer various questions about what sizes fit them and their qualitative shape. Either of these input methods can be used to match people to body shape models.

Nearest-Neighbor Matching

Figure 7:
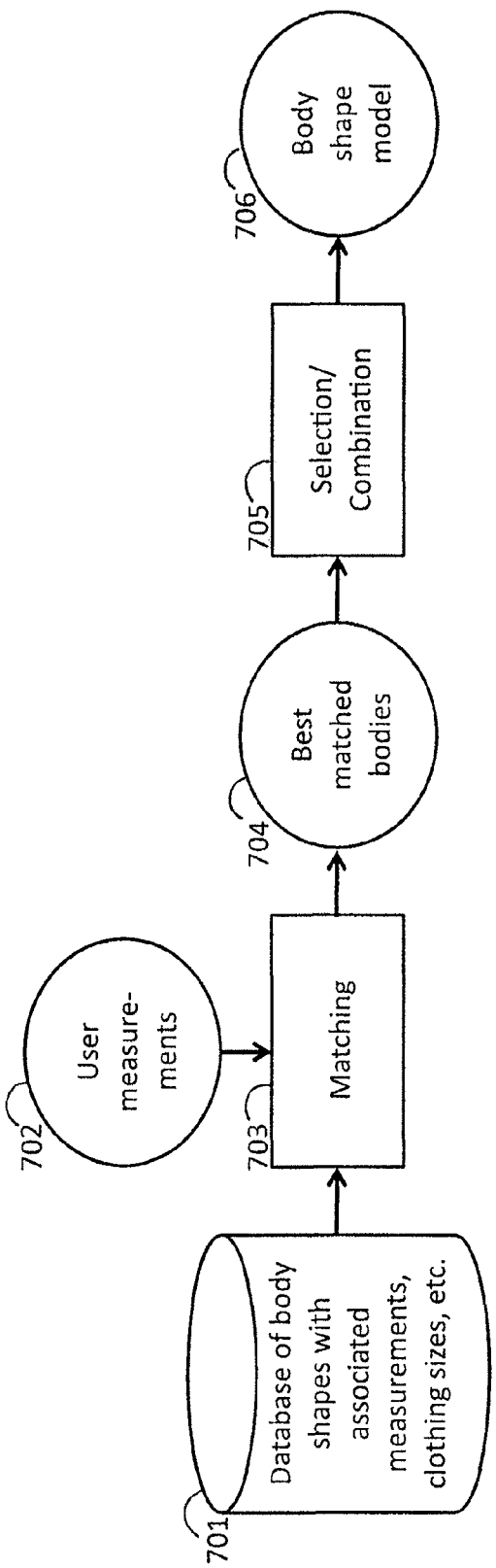
FIG. 7 is a flow diagram depicting a method for initializing a body shape model from user-supplied measurements.

Referring to FIG. 7, in an off-line process a database 701 of 3D body shape models is generated using the capture methods described here or other methods such as 3D laser range scanning. Measurements and qualitative shape information are stored in the database for each scanned subject. This is then used in a user-generated shape estimation component. For a new person, their measurements and qualitative shape information 702 is matched to the database 701 via a matching function 703 to find similar people 704. From a selection or combination of similar people 705, a body shape model 706 is constructed, for example by averaging the body shapes. Alternatively a plurality of matching body shapes are presented to the user on a display and they can select which looks most like them using a computer interface. This user-derived body shape can then be used for initialization or, without further optimization, as any other body shape model.

The matching component 703 can be efficiently implemented as nearest neighbor search (NN) using any of several standard methods for efficient implementation (e.g. using a KD-tree). One must be careful in defining how measurements are matched and how this match is scored. Some measurements may be more reliable or more important than others and should therefore count more heavily. One can select the best match and simply take the body shape parameters of the corresponding person as those of the user. Alternatively, the best n matches 704 can be taken and combined. Given a match score for each of the n matches, a weighted average of the shape coefficients for each matched body is computed. The resulting set of linear shape coefficients is taken to represent the user body.

Prediction Using Linear Regression

An alternative method is described by Allen et al (2003, 2004). The approach is to learn a mapping body shape=$f$(measurements)

that expresses the shape coefficients $\beta_i$ for a body i as a linear combination of h body measurements $m_i$ plus a bias constant $$\beta_i = \begin{bmatrix} \beta_{1,i} \\ \beta_{2,i} \\ \vdots \\ \beta_{k,i} \end{bmatrix} = F \begin{bmatrix} m_{1,i} \\ m_{2,i} \\ \vdots \\ m_{h,i} \\ 1 \end{bmatrix} = F m_i$$

Given a training set of n body shapes with measurements M and corresponding shape coefficients B the constraints in matrix form as $$B = \begin{bmatrix} \beta_{1,1} & \beta_{1,2} & \cdots & \beta_{1,n} \\ \beta_{2,1} & \beta_{2,2} & \cdots & \beta_{2,n} \\ \vdots & \vdots & & \vdots \\ \beta_{k,1} & \beta_{k,2} & \cdots & \beta_{k,n} \end{bmatrix} = F \begin{bmatrix} m_{1,1} & m_{1,2} & \cdots & m_{1,n} \\ m_{2,1} & m_{2,2} & \cdots & m_{2,n} \\ \vdots & \vdots & & \vdots \\ m_{h,1} & m_{h,2} & \cdots & m_{h,n} \\ 1 & 1 & \cdots & 1 \end{bmatrix} = FM$$

Allen et al. (2003, 2004) learned F via least squares estimation $$F = BM^\dagger = B(M^T M)^{-1} M^T$$

where $M^\dagger$ is the pseudo-inverse of M.

It has been found that hand measurements are often inaccurate and least squares estimation is highly sensitive to outliers. Consequently the present invention uses a robust iteratively reweighted least squares method to fit F.

For a practical method of initialization or body shape generation, it is important to 1) minimize the number of measurements that must be entered and 2) maximize the contribution of each measurement. The international ISO 20685 standard defines a comprehensive set of body measurements. An optimal subset of these or similar measurements is sought that predicts body shape accurately. A greedy algorithm is defined to establish this subset.

This algorithm is defined in detail in Section 10 for producing a set of multiple measurements from the body vertices. That method is a general way of finding a set of predictors that predict multiple values. Here the predictors are measurements, $m_i$ (instead of vertices) and the multiple predicted values are linear shape coefficients.

With this greedy algorithm it has been determined that approximately 15 measurements are sufficient to predict body shape with reasonable accuracy.

SECTION 5. GENERIC OBJECTIVE FUNCTIONS

The presently disclosed model is parameterized by a set of pose parameters θ, shape coefficients β and gender χ. The problem of estimating human body shape from sensor data is reduced to one of solving for the optimal body model parameters that minimize some error function $E(\chi, \beta^\chi, \theta)$ given sensor measurements. A generative approach is adopted in which predicted model parameters are used to construct a 3D body model from which various features are extracted and compared with features from sensor data. Several error functions are described depending on the type of sensor input used: foreground image silhouettes from one or more calibrated camera views, or range images. Standard methods are presented which are used to illustrate the fitting process. Additionally, methods are described to deal with more challenging situations involving clothing or moving cameras.

5a. Camera Images

An initial embodiment is first described that uses calibrated foreground image silhouettes for estimating the body pose and shape parameters and assumes the subject wears minimal or tight fitting clothing. Balan et al. (2007a) used this approach to estimate body shape from multiple calibrated cameras. The framework is general however and can be augmented to exploit additional image features such as edges and optical flow (Sminchisescu and Triggs, 2003), shadows (Balan et al. 2007b), etc.

Given an estimated body model reconstructed from the model parameters, the model is projected into a camera view k assuming known extrinsic and intrinsic camera calibration. This produces a predicted image silhouette $S_{k,\chi,\beta^\chi,\theta}^e$. This silhouette is compared with the observed silhouette, $S_k^o$, in camera view k, obtained by foreground segmentation (Section 2a).

Measures have been proposed in the literature for computing (dis)similarity of silhouettes. For instance, one of the most widely used measures is based on silhouette overlap, computed by summing the non-zero pixels resulting from a pixel-wise XOR between the two image masks (predicted and observed). While computationally efficient, this measure is not very informative in guiding the search during optimization. Instead a modified version of the Chamfer distance is employed.

Specifically the asymmetric distance between silhouettes S and T is defined as $$\tilde{d}^\tau(S, T) = \frac{\sum_{i,j} S_{ij} \cdot C_{ij}^\tau(T)}{\sum_{i,j} S_{ij}},$$

where $S_{ij}=1$ for the pixels inside silhouette S and 0 otherwise; $C_{ij}^\tau(T)$ is a distance transform function which is zero if pixel (i,j) is inside T and is a robust Euclidean distance to the closest point on the boundary of T for points outside. In order to cope with errors in the image silhouettes, $C_{ij}^\tau(T)$ is made robust by capping the Euclidean distance at a certain threshold τ (e.g. 20 pixels for an image size of 800 by 600). For pixels (i, j) that are more than τ Euclidean distance away from T, $C_{ij}^\tau(T)=\tau$. The denominator is a normalization term that gives invariance to the size of the silhouette.

The objective function for the minimal clothing case is first defined using the bi-directional objective used by Balan et al. (2007a). This is later extended to deal with clothing. The objective function uses a symmetric distance to match the estimated and observed silhouettes for a given camera view k $$E_{1Pose;NoClothes;1Cam}^k(\chi,\beta^\chi,\theta)=\tilde{d}^\tau(S_{k,\chi,\beta^\chi,\theta}^e, S_k^o)+\tilde{d}^\tau(S_k^o, S_{k,\chi,\beta^\chi,\theta}^e).$$

In effect this objective function equally penalizes the regions of the model silhouette that fall outside the image silhouette and the regions of the image silhouette that are not covered by the model's projection. This is appropriate for the case where the subject wears tight-fitting clothing.

In the case where multiple synchronized camera views are used, where the images are taken at the same time instant, the constraints over the K camera views are integrated to optimize a consistent set of model parameters $$E_{1Pose;NoClothes}(\chi, \beta^\chi, \theta) = \sum_{k=1}^{K} E_{1Pose;NoClothes;1Cam}^k(\chi, \beta^\chi, \theta).$$

5b. Range Images

In contrast to image observations that provide constraints in 2D, there exist sensors that capture depth measurements directly in 3D (e.g. sparse or dense stereo images, laser range scans, structured light scans, time-of-flight sensors). Having 3D measurements simplifies the matching problem with a 3D body model. These measurements may consist of point clouds or polygonal meshes, and optionally contain color information or surface orientation.

One embodiment fits body pose and shape to this data using an Iterative Closest Point (ICP) strategy. Generic ICP is a well understood algorithm used for aligning two point clouds. Broadly speaking, the algorithm establishes point correspondences between the source shape (body model) and the target shape (3D sensor measurements), defines an error function that encourages established corresponding points to be aligned, computes the optimal parameters that minimize the error, transforms the source shape using the optimal parameters and iterates to establish new point correspondences and refine the alignment.

One embodiment uses the error term $E_{1Pose,NoClothes,3D}(\chi,\beta^\chi,\theta)$ to encourage the vertices $y_v$ on the body model to move towards the closest respective points on the target shape T given by the sensor data:

$$E_{1Pose;NoClothes;3D}(\chi, \beta^{\chi}, \theta) = \sum_{v \in V} w_v \Gamma^2_{\tau_{dist}}(y_v(\chi, \beta^{\chi}, \theta), T).$$

Here V denotes the set of body model vertices and the function $\Gamma_{\tau_{dist}}(y_v, T)$ computes the distance from a vertex $y_v$ to the closest compatible point on the target shape T. Note that the closest compatible point is selected only at the beginning of each ICP iteration and this correspondence is maintained during the optimization of body model parameters. From an implementation point of view, a KD-tree structure is used to efficiently establish correspondences with the target shape. The compatibility criterion restricts the distance between them to a threshold $\tau_{dist}$, (e.g. 150 mm) to avoid matching through holes in the target shape. In the case where the target shape is represented as a mesh or an oriented point cloud, the compatibility criterion also safeguards against front-facing surfaces being matched to back-facing surfaces, measured in terms of the angle between the surface normals. Two points are considered incompatible if their normals are significantly apart (typically by more than 45 degrees). If there are no compatible points for a vertex, the $\Gamma$ distance is simply set to zero. The weight $w_v$ is used to account for holes in the target shape, particularly in the case of partial scans or depth maps that only provide a partial view of the body shape. In this case many vertices on the body model have no correct correspondence on the scanned mesh. Fortunately, at each ICP iteration, the vertices $y_v$ with no true correspondence can readily be identified as the ones whose closest point on the target shape is located on the boundary edge of a hole. For these vertices the weight $w_v$ is set to 0; in all other cases $w_v$ is equal to 1. Moreover, for calibrated sensing devices that only provide a range image for half the object (i.e. the part visible to the sensor), at each ICP iteration vertices on the current model that could not have be seen by the sensing device given the current estimate of the body are identified and their $w_v$ weights are set to 0.

SECTION 6. OPTIMIZATION

Two types of penalty functions are identified that are used to recover the parameters of interest (i.e. body shape and pose): 1) sensor error terms $E_{sensor}(\chi, \beta^{\beta}, \theta, \ldots)$ that penalize mismatches between the estimated model and the input sensor data, and 2) prior error terms $E_{prior}(\chi, \beta^{\beta}, \theta, \ldots)$ that enforce domain knowledge about the model parameters. The latter type are described in Section 6b. It should be understood that the sensor error terms can be linearly combined (thus changing the relative importance of each term) together with the prior energy terms to obtain a global objective function that we seek to optimize:

$$E(\chi, \beta^{\chi}, \theta, \ldots) = E_{sensor}(\chi, \beta^{\chi}, \theta, \ldots) + E_{prior}(\chi, \beta^{\chi}, \theta, \ldots)$$

Example sensor error terms include $E_{1Pose;NoClothes;1Cam}^k$, $E_{1Pose;NoClothes}$, $E_{1Pose;NoClothes;3D}$ (Secton 5), $E_{clothes;2D;sensor}$, $E_{clothes;3D;sensor}$ (Section 7), $E_{Sequence}$ (Section 8). Section 6b defines the following prior error terms: $E_{constraints}$, $E_{shape}$, $E_{pose}$ and $E_{interpenetration}$.

Robust Penalty Functions

In the sensor and prior error terms described below there is often a penalty function, denoted $\rho(\square)$. Although this can be as simple as $\rho(x)=x^2$, in many cases it is beneficial to use a robust penalty function. Many robust penalty functions may be used including L1, Huber mini-max, Lorentzian, Tukey's bi-weight, etc. (see Black and Rangarjan 1996 for examples). In one embodiment the robust penalty function is the Geman-McClure function $$\rho(x) = \frac{x^2}{\sigma^2 + x^2}.$$

6a. Optimization Strategy

A series of objective functions of the form $E(\chi, \beta^{\chi}, \theta, \ldots)$ are defined and minimized to recover shape and pose. Since the number of parameters to estimate is large and the objective function has local optima, several strategies are described that can be used to effectively find good solutions.

First, initial estimates of the parameters are optionally obtained using the techniques described in Section 4, which provide a good starting point for optimization. An optional stochastic search method (Balan et al. 2007a) can be used to generate more hypotheses of possible shape and pose parameters. Initial estimates of pose and shape are then refined using a direct search method. In particular, the simplex method described by Lagarias et al. (1998), a gradient-free direct search method, may be used; in one embodiment this is implemented using the MATLAB function "fminsearch" (MATLAB 2008). Alternatively, any other suitable optimization technique can be applied.

Gender and Subpopulation Estimation

In many applications, the gender of a person being scanned may be known or the user may specify that information. In these cases, body shape using the appropriate gender-specific body model is estimated (Section 3). When gender is not known there are several options. One can fit a gender-neutral body model that is capable of representing male or female bodies. Second, one can fit using both male and female body shape models and select the one that achieves a lower error of the objective function. Third, one can fit a gender-neutral model and then classify gender directly from the estimated shape coefficients, as described in Section 10. Once gender is known, a refined shape estimate using the appropriate gender-specific shape model is produced. The same strategies can be used for other subpopulations (e.g. to infer ethnicity).

Partitioned Search Space

Faster convergence is obtained by partitioning the search space. For a given frame and gender value, in one embodiment it is desirable to alternate between optimizing pose and optimizing shape in an incremental fashion: after initializing with an initial pose and shape model, the process of optimizing the global position of the torso and the first few shape coefficients (e.g. the first 6) corresponding to the shape variation directions with the largest eigenvalues is commenced. The rotation of individual body parts is then estimated, starting with those closest to the torso (upper arms and upper legs) followed by lower arms and legs. Then all part rotations together with additional shape coefficients (e.g. the first 12) are jointly optimized. In the last phase, the full set of unknown variables including all part rotations and shape coefficients are optimized.

In the case where integration of information across multiple poses is performed, the optimization process alternates between optimizing a single set of shape parameters applicable to all postures, and optimizing the pose parameters $\theta_p$ independently for each posture.

Coarse-to-Fine

A computational speedup can be achieved by adopting a coarse-to-fine approach where the body model is fit to a low-resolution image and the parameters are refined at successively finer resolutions in a standard multi-resolution image pyramid.

6b. Constrained Optimization

Sensor evidence is often noisy or ambiguous, for example in the case of one, or a small number of, images, or a single low-resolution range image. In cases like these it can be difficult or impossible to accurately estimate pose and shape without some sort of prior knowledge. With the application of appropriately formulated priors and constraints in the optimization process, model fitting can be greatly improved.

There are two classes of prior knowledge that are used to constrain the optimization process: knowledge about the specific individual, such as height, weight, age, or gender; and knowledge that applies to all humans. The former must be formulated in such a way that all the available information about the individual can be used effectively. Two approaches to this problem are described, each having different advantages and areas of applicability: hard constraints, where the search space of the optimization is limited to those values that satisfy the constraints; and soft constraints where the search space is not restricted but rather deviations from the constraints are penalized in the optimized energy function.

1. Hard Constraints on Body Shape

It is desirable to constrain body shape to maintain certain attributes; in particular, the case is considered in which there is a strong linear relationship between said attributes and the shape coefficients (e.g. height). In general, if the shape is represented as a k-dimensional vector $\beta=[\beta_1, \ldots, \beta_k]^T$, the set of all possible shapes is given by $R^k$. However, a set of h, where h<k, attributes, which are constrained to fixed values $m=[m_1, \ldots, m_h]^T$, defines a linear subspace of $R^k$ in which those constraints are satisfied. Optimization can be performed such that the shape varies only in this sub-space.

For each attribute $i \in \{1, \ldots, h\}$ the axis $\vec{d}_i$ is found in the shape space $R^k$ that is the direction of maximum change (typically called the attribute axis). This axis is simply the gradient of the attribute with respect to the shape parameters $$\vec{d}_i = \nabla m_i = \left[\frac{\partial m_i}{\partial \beta_1}, \frac{\partial m_i}{\partial \beta_2}, \ldots, \frac{\partial m_i}{\partial \beta_k}\right]$$

and can be computed empirically from training data. To the extent that variation in body shape is linear in the constraining attribute, any change in shape orthogonal to the attribute axis does not alter the attribute value. Therefore the subspace of all feasible solutions is given by the k−1 dimensional hyperplane orthogonal to $\vec{d}_i$ and containing a shape point that achieves the desired attribute value $m_i$. Since there are h attribute constraints, the space of all valid solutions is given by the intersection of h k−1 dimensional hyperplanes. Assuming the attribute axes are linearly independent, the intersection is the k−h dimensional hyperplane that contains a point satisfying all the constraints and is the orthogonal complement to the subspace of $R^k$ spanned by the attribute axes $D=[\vec{d}_1, \ldots, \vec{d}_h]$. The orthogonal complement for D is given by $W=[\vec{w}_1, \ldots, \vec{w}_{k-h}]=\text{null}(D^T)$. In order to find a point of intersection of the hyperplanes, the strategy presented in Section 4d is used to learn a direct mapping F from attribute values m to a shape $\beta^0$ satisfying the attribute constraints:

$$\beta^0 = F\begin{bmatrix} m \\ 1 \end{bmatrix}.$$

This point together with the orthogonal complement of the space spanned by the attribute axes fully determine the attribute preserving subspace. The shape $\beta=[\beta_1, \ldots, \beta_k]^T$ is therefore re-parameterized in terms of hyper-parameters $\beta'=[\beta_1', \ldots, \beta_{k-h}']^T$ as $$\beta(\beta') = W\beta' + F\begin{bmatrix} m \\ 1 \end{bmatrix}.$$

This method has the advantage of speeding up optimization, for all optimization methods, because it reduces the search space. It requires that body shape be linear in some function of the constraints, but we find that for many useful constraints this is sufficiently close to true. For example, body shape is sufficiently linear in height and cube root of weight.

2. Soft Constraints on Body Shape

Often user-supplied attributes, such as height or weight, are known. Solutions (body shapes) are preferred that agree with these attributes. Constraining body shape to match certain attributes is enabled by the attribute estimation method in Section 10, which predicts attributes from shape parameters β. Human measurements are noise prone and may be biased; other properties may be discrete (clothing size or self reported frequency of exercise). In these cases user constraints are enforced only weakly.

Given a function predicting measurements from body shape, a prior is defined that combines multiple "soft" constraints and this prior is included in the overall objective function. Specifically, $$E_{constraints}(\beta) = \sum_{i=1}^{h} w_i \rho(f_i(\beta) - m_i)$$

is defined where there are h soft constraints corresponding to known attribute values $m_i$ and for each of them a function $f_i(\beta)$ is known that takes body shape parameters and predicts attributes (Section 10). The error function ρ can be either quadratic or a robust error function and $w_i$ is a scalar weight inversely related to the uncertainty of attribute $m_i$. The scalar weights can be estimated from training data from the residual variance in fitting $f_i(\beta)$.

The power of this method is in the flexibility in defining $f_i(\beta)$. For stochastic and simplex optimization methods, this function could be anything (such as a non-parametric method using nearest-neighbor search). In one embodiment we take $f_i(\beta)$ to be a linear function as described in Section 10; this makes the constraint term differentiable with respect to the shape parameters.

3. Other Prior Error Terms

The two above constraining methods are user-specific. Prior error terms that apply to all bodies are described below. Interpenetration. A priori it is known that the pose and shape cannot be such that the body interpenetrates itself or known objects in a the world; a plausible estimate can never, for example, have one of the arms inside the torso. Previous model-based methods for preventing this condition tend to use simplified part-based representations of body shape since, for general meshes, testing mesh intersection is a nontrivial computation. The aligned nature of the presently disclosed parametric model is leveraged to approach the accuracy of a general mesh based interpenetration test while preserving the desirable computational properties of simpler models.

The presently disclosed model is already segmented into P individual body parts; it is known which vertices of the model correspond to body part p (Section 3). One can approximate a test to determine if two body parts intersect by testing if any vertex of the first part is inside the convex hull of the second part. This can be done using a standard point-in-polygon (PIP) test in 3D: if any dot product of the ray, going from the point to each surface triangle center, with the triangle normal (where the triangles have been oriented such that their normals point outside) is negative, then the point cannot be in the convex polygon. The penalty function is then defined as $$E_{interpenetration}(\chi, \beta^\chi, \theta) = \rho\left(\sum_{p=1}^{P} \sum_{v \in Y \setminus Y_p} PIP(v, convhull(Y_p(\chi, \beta^\chi, \theta)))\right)$$

which counts the number of mesh vertices v that are inside the convex hull of each of the body parts (excluding of course the vertices belonging to the part itself). Y is used to denote the set of all mesh vertices, $Y_p$ the set of vertices belonging to part p, and $\rho$ a robust operator. In general, the torso is not well approximated by its convex hull and consequently a test is performed to determine if torso vertices are inside other body parts, but not vice-versa.

Another important case of interpenetration is between the body model and the ground plane. In cases where the ground plane is known (e.g. as a result of calibration), an additional interpenetration penalty is added to penalize body shapes and poses that produce vertices that like below the ground. Testing for intersection with ground is straightforward because it is assumed to be a plane. A high penalty can be used to prevent any interpenetration or the distance of the model below the ground can be computed and the penalty can be a function of this distance. Analogously a penalty for "floating" above the ground ensures that the body model touches the ground plane.

Shape prior. A penalty is defined for body shapes that do not conform to the observed statistics of true human bodies. The present body shape model is learned from training bodies (Section 3) and the resulting PCA model includes the variance along each principal component direction. The variance, $\sigma_{\beta,i,\chi}$, along these shape-deformation directions characterizes the shape of the population being modeled. A standard Gaussian noise assumption would lead to an error term defined by the Mahalanobis distance of a body from the mean.

To avoid biasing the estimates toward the mean one embodiment uses a different penalty term. Specifically, a robust shape prior is formulated that penalizes extreme shapes while assigning the same fixed cost for more average shapes:

$$E_{shape}(\chi, \beta^\chi) = \sum_i \rho\left(\max\left(0, \frac{|\beta_i^\chi|}{\sigma_{\beta,i,\chi}} - \sigma_\beta^{thresh}\right)\right)$$

where $\rho$ is robust operator. Typically $\sigma_\beta^{thresh}=3$, is chosen, thus penalizing only those shapes that are more than 3 standard deviations from the mean.

Pose prior. There are some poses that are anatomically impossible or highly unlikely. The elbow, for example, cannot extend beyond a certain angle. To control this, a prior is enforced on body pose that is uniform within joint angle limits and only penalizes poses beyond those limits. Impossible joint angles are penalized in a robust manner, similar in formulation to the shape prior:

$$E_{pose}(\theta) = \sum_i \rho_1\left(\frac{\max(0, \theta_i^{min} - \theta_i, \theta_i - \theta_i^{max})}{\sigma_{\theta,i}}\right) +$$

$$w \sum_i \rho_2\left(\max\left(0, \frac{|\theta_i - \theta_i^0|}{\sigma_{\theta,i}} - \sigma_\theta^{thresh}\right)\right)$$

where i ranges over all the pose rotation parameters. Note that both the angle bounds $[\theta_i^{min}, \theta_i^{max}]$ and the variances $\sigma_{\theta,i}$ can be specified from anthropometric studies or learned from motion capture data. The second term penalizes poses that deviate more than $\sigma_\theta^{thresh}$ standard deviations (typically 3) from an initial pose $\theta_i^0$. This second term is appropriate for cases when the initial pose is pre-specified and known, but varies between subjects or between images of the same subject. In such cases, w is set to 1; if the initial pose is unknown, w is set to 0.

6c. Optimizing Shape Across Varying Pose

In many situations it is desirable to be able to estimate human shape even when there is limited information. Doing so may require combining information from multiple frames of sensor data. If these frames are captured at different time instants, the articulated body pose may change between frames. Consequently the presently described system can optimize a single consistent body shape across frames containing different poses.

Case 1: Multiple Monocular Images with Changes in Pose Between Images.

Consider the situation there are two or more digital images of a person taken at different times. In the time between capturing each image the person's pose may have changed. Each image on its own provides very limited information about the shape. Consequently it would be desirable to combine information from multiple such images. A video sequence from a single camera (e.g. a surveillance camera or a movie or television show) presents an equivalent scenario.

Case 2: Clothing that Obscures the Body.

Often it is desirable to know the shape of a person without having to have them undress or wear tight fitting clothing. Here any single pose of the body does not reveal the entire shape. This is true whether the sensor data is images or more detailed 3D data (e.g. from a laser range scanner, time of flight sensor, or structured light system). Here it is noted that as a person moves in their clothes, the way the clothes obscure the body changes—they become loose or tight on different parts of the body in different poses. By combining information from all these poses, and by using what is known about the shape of human bodies, one can estimate the most likely shape underneath the clothing.

In both cases, the presently disclosed approach relies on using a body model that factors body shape from the pose representation. Indeed it has been found that the SCAPE model provides a representation of body shape in terms of the shape coefficients β that is relatively invariant to body pose θ (Balan et al. 2008). To exploit this constancy, a "batch" optimization is defined that extends the objective function to include P different poses but a single body shape consistent for all poses:

$$E_{batch}(\chi, \beta^\chi, \Theta) = \sum_{p=1}^{P} E_{1Pose;*}(\chi, \beta^\chi, \theta_p),$$

where $\Theta = (\theta_1, \ldots, \theta_p)$ and $E_{1pose}$ represents an error term that evaluates how well the pose and shape estimates match the sensor observations at a single time instant (e.g. $E_{1pose;NoClothes;1Cam}^k$, $E_{1Pose;NoClothes}$, $E_{1Pose;NoClothes;3D}$). The particular choice depends on the type of sensor data (images or depth sensors) as described in Section 5.

SECTION 7. CLOTHING

Estimating the human shape is made more challenging when the subject is wearing loose clothing that obscures the true form of the naked body. The vast majority of existing methods for estimating human shape require that the subject undress or wear minimal tight fitting clothing and cannot cope with the case where the clothing obscures the body shape. Various sensing/scanning technologies exist that allow fairly direct access to body shape under clothing including backscatter X-ray, infra-red cameras and millimeter waves. While the presently disclosed body fitting techniques could be applied to these data, for many applications, such as forensic video analysis, body shape must be extracted from standard video images or range measurements. This problem is relatively unexplored.

Figure 8:
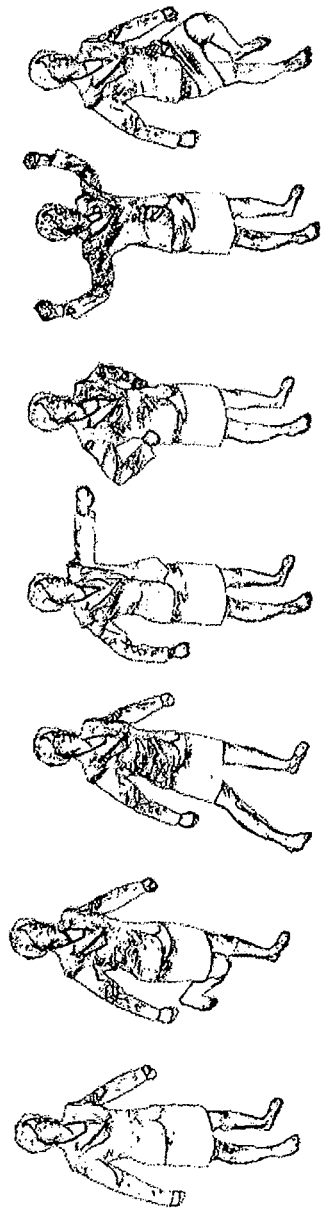
FIG. 8 depicts a clothed person in multiple poses.

Here an observation model is defined that deals with clothing robustly using the concept that silhouettes in 2D, and range data in 3D, represent bounds on the underlying body shape. Consequently the true body should fit "inside" the image measurements. In the case of a clothed person, the observations may only provide loose bounds on body shape. This makes the problem significantly under-constrained and therefore requires additional assumptions to regularize the solution; this is achieved using the error terms defined in Section 6. Additionally, the objective function is made aware of the clothing, or lack of it, in different regions of the body. Regions in the sensor data are identified that are likely to be skin. In these regions, the optimization method constrains the fitted body model to match the sensor observations (silhouette contours or range data). In the remaining clothed (or hair) regions, the objective function is modified so that it does not have to strictly match the observations. Additionally, it is noted that clothing provides constraints on body shape that vary with pose as illustrated in FIG. 8. In each posture depicted in FIG. 8, the clothing is loose or tight on different parts of the body. Each posture provides different constraints on the possible underlying body shape. Constraints from multiple poses, such as these, are accumulated by a consistent body model across poses as described in Section 6.

7a. Camera Images

In the case of image silhouettes, the concept is introduced of a maximal silhouette-consistent parametric shape that weakly satisfies the following constraints:
1. the projected model falls completely inside the foreground silhouettes;
2. the model attempts to fill the image silhouette mainly in regions with tight or no clothing;
3. the intrinsic shape is consistent across different poses; and
4. the shape of the object belongs to a parametric family of shapes (in our case human bodies).

Each aspect is discussed below.

The first constraint is satisfied by penalizing the regions of the projected model silhouette, $S_{k,\chi,\beta^\chi,\theta}$, that fall outside the observed foreground silhouette $S_k^o$. The silhouette match error in camera k from Section 5 is separated into two pieces:

$$E_{1Pose;clothes;2D;1Cam}(\chi,\beta^\chi,\theta) = E_{inside}^k(\chi,\beta^\chi,\theta) + E_{expand*}^k(\chi,\beta^\chi,\theta)$$

For the "inside" term, the same distance function as defined in Section 5a is used:

$$E_{inside}^k(\chi,\beta^\chi,\theta) = \tilde{d}^\tau(S_{k,\chi,\beta^\chi,\theta}, S_k^o).$$

For the second constraint, it is desirable that the projected model explain as much of the foreground silhouette as possible; if the subject were not wearing clothing this would just be the second term from the minimal-clothing case: $\tilde{d}^\tau(S_k^o, S_{k,\chi,\beta^\chi,\theta}^e)$. In the more general setting where people wear clothing or interact with objects, the observed foreground silhouettes will be too large producing a bias in the shape estimates. To cope with this, several strategies are employed. The first is to down-weight the contribution of the second constraint, meaning it is more important for the estimated shape to project inside the image silhouette than to fully explain it. The second is to use features in the image that are more likely to accurately conform to the underlying shape. In particular, skin-colored regions are detected and, for these regions, the second constraint is given full weight. The detected skin regions are denoted by $S_k^s$ and the non-skin regions of the observed foreground silhouette by $S_k^o \setminus S_k^s$. Third, in the non-skin regions a robust penalty function controlled by a parameter $\tau^c \ll \tau$ is employed. Recall that the distance function, $\tilde{d}^\tau$, already has a threshold $\tau$ on the maximum distance, which makes the term robust to segmentation errors. In putative clothing regions this threshold is reduced to $\tau^C$. When the clothes are tight (or skin is being observed), it is desired that the error term increasingly penalize non-skin regions even when they are far from the model silhouette. In this case, a large threshold $\tau$ is appropriate. However, if the clothes are expected to be loose, a small threshold $\tau^c$ effectively disables the silhouette distance constraint in non-skin regions. It is possible to apply the robust operator also to the skin term (with a corresponding $\tau^s$ threshold greater than $\tau^c$) to protect against errors in skin detection (but typically $\tau^s := \tau$).

The "expansion" constraint is then written as $$E_{expand}^k(\chi,\beta^\chi,\theta) = \tilde{d}^{\tau^s}(S_k^s, S_{k,\chi,\beta^\chi,\theta}) + \lambda_c \tilde{d}^{\tau^c}(S_k^o \setminus S_k^s, S_{k,\chi,\beta^\chi,\theta}^e)$$

with $\lambda_c \ll 1$ (e.g. 0.1).

Different parts of the body can be obscured by different pieces of clothing with different looseness characteristics. The above formulation can be extended to incorporate any additional knowledge about the looseness of clothing in G different regions of the body. More generally, imagine the image silhouette is segmented into regions corresponding to different classes of clothing with associated looseness/tightness properties. Such classes can represent broad categories such as skin versus non-skin regions as described above, or can include more refined categories such as hair, t-shirt, jacket etc. Each category, g, has an associated looseness threshold $\tau_g$ and relative importance $\lambda_g$. The "expansion" constraint can be generalized as:

$$E_{expand2}^k(\chi, \beta^\chi, \theta) = \sum_{g=1}^{G} \lambda_g \tilde{d}^{\tau_g}(S_k^g, S_{k,\chi,\beta^\chi,\theta}^e).$$

Segmentation of the image into G labeled regions can come from user input or can be obtained automatically using general skin, clothing and hair classifiers described in the literature (see Section 2e).

When a clothed subject is observed with clothing in only a single pose, the shape estimate may not be very accurate. Additional constraints can be obtained by observing the subject in different poses. This requires estimating a different set of pose parameters in each frame, but a single body shape consistent for every pose (Section 6c):

$$E_{clothes;2D;1Cam}(\chi, \beta^\chi, \Theta) = \sum_{p=1}^{P} E^k_{1Pose;clothes;2D;1Cam}(\chi, \beta^\chi, \theta_p)$$

where $\Theta=(\theta_1, \ldots, \theta_P)$ represents the different body poses.

In the case of multiple synchronized camera views where the images are taken at the same time instant, we integrate the constraints over the K camera views to optimize a consistent set of model parameters:

$$E_{clothes;2D;sensor}(\chi, \beta^\chi, \Theta) = \sum_{k=1}^{K} E^k_{clothes;2D;1Cam}(\chi, \beta^\chi, \Theta)$$

Finally, the sensor constraints are combined with domain knowledge constraints to ensure the shape remains within the family of human shapes by exploiting the availability of a large database of body shapes. It is not required that the estimated shape exist in the database; instead, computed statistics on shape variability are used to penalize unlikely shape parameters, $E_{shape}(\beta^\chi)$ as described in Section 6b. Pose and interpenetration priors $E_{pose}(\theta_p)$ and $E_{interpenetration}(\chi, \beta^\chi, \theta_p)$ that penalize un-natural poses exceeding anatomical joint angle limits are also enforced (also described in Section 6b). The final objective function is $$E_{clothes;2D}(\chi, \beta^\chi, \Theta) = E_{clothes;2D;sensor}(\chi, \beta^\chi, \Theta) +$$
$$E_{shape}(\chi, \beta^\chi) + \sum_{p=1}^{P} E_{pose}(\theta_p) + \sum_{p=1}^{P} E_{interpenetration}(\chi, \beta^\chi, \theta_p)$$

This objective function is optimized using the strategy described in Section 6.

7b. Range Data

The concepts used for the camera images can be applied to the case of 3D sensor measurements. The shape is sought that weakly satisfies the following constraints:
1. the fitted model is close to the 3D measurements in regions with tight or no clothing;
2. the 3D range measurements lie outside the body;
3. the intrinsic shape is consistent across different poses; and
4. the shape of the object belongs to a parametric family of shapes (in our case human bodies).

Building on the approach presented in Section 5b, the optimization is formulated using a weighted Iterative Closest Point (wICP) algorithm.

First, tightness constraints are derived by identifying clothed and unclothed regions in the target shape T (i.e. the sensor range measurements). The unclothed regions dominate the fitting process by down-weighting the distance function for model vertices corresponding to clothed regions. Bare skin detectors are used to identify areas in sensor data that provide tight constraints on shape (e.g. identify the arms and legs of a person wearing loose shorts and t-shirt). Specifically, in the case of range data that comes with associated texture information (e.g. a registered color image or a texture map), skin regions are detected similarly to the image case using a color-based skin classifier (see Section 2e). These areas are used to guide the parametric shape and pose fitting process and rely on the correlations in the learned model of body shapes to provide the shape for model regions that do not have tight constraints.

At a given ICP iteration, let $V_S$ be the set of body model vertices whose closest match on the target shape T was classified as skin, and $V\backslash V_s$ the non-skin vertices. For the skin regions, the same error function is used as defined in Section 5b, fully enforcing the tightness constraint, while for the non-skin regions, their contribution is down-weighted through $\lambda_c$:

$$E_{1Pose,Skin,3D}(\chi, \beta^\chi, \theta) =$$
$$\sum_{v \in V_s} w_v \Gamma^2_{\tau_{dist}, \tau^s_{dist}}(y_v(\chi, \beta^\chi, \theta), T) + \lambda_c \sum_{v \in V\backslash V_s} w_v \Gamma^2_{\tau_{dist}, \tau^c_{dist}}(y_v(\chi, \beta^\chi, \theta), T)$$

Recall from Section 5b that $\Gamma$ is the distance from vertex $y_v$ to the closest compatible point on T, $w_v$ is a binary variable that is 1 only for visible vertices whose closest point on T is not on a hole boundary, and $\tau_{dist}$ prevents matches more than $\tau_{dist}$ distance away. If the subject is wearing clothing, the target shape will be enlarged without necessarily exceeding the $\tau_{dist}$ threshold (e.g. 150 mm), which is intended to prevent matching when there is no true correspondence due to large regions of missing data. As such, the range measurements in clothed regions will bias the shape estimates. For the non-skin regions, the $\Gamma$ distance is made robust to clothing by capping the Euclidean distance at a threshold $\tau_{dist}^c$. This parameter is the equivalent of $\tau^c$ in the image case (Section 7a). For vertices whose distance to the closest compatible point on T is larger than $\tau_{dist}^c$, $\Gamma$ is set to $\tau dist^c$. In the case of loose clothing, the $\tau_{dist}^c$ parameter is set much lower than for non-skin regions, effectively disabling the tightness constraint unless the model is very close to the target shape T. In the case of tight clothing, $\tau_{dist}^c$ needs to be set larger. For the skin regions, an equivalent parameter $\tau_{dist}^s$ can be introduced with a larger value; typically $\tau_{dist}^s := \tau_{dist}$.

More generally, as in the image case, the target shape can be segmented into multiple regions $V_g$ (with user input or automatically using general skin/hair/clothing classifiers described in the literature) corresponding to G classes of clothing with associated looseness thresholds $\tau_{dist}^g$ and relative importance $\lambda_g$:

$$E_{1Pose,Classes,3D}(\chi, \beta^\chi, \theta) = \sum_{g=1}^{G} \lambda_g \sum_{v \in V_g} w_v \Gamma^2_{\tau_{dist}, \tau^g_{dist}}(y_v(\chi, \beta^\chi, \theta), T)$$

One undesirable property of this error term is that it treats the source shape and the target shape almost symmetrically. It fails to account for the fact that clothing has a uni-directional effect; clothing increases the observed shape which means the body model should fit entirely inside the target shape, but does not have to fully explain it. In the case of partial scans, the "inside" property is poorly defined. Rather, the constraint is formulated that all points of the target shape must lie outside or on the surface of the body model. In one embodiment, a penalty term is introduced to account for points that are inside the body:

$$E_{1Pose,Inside,3D}(\chi, \beta^\chi, \theta) = \sum_{v \in T} \Lambda^2(T_v, Y(\chi, \beta^\chi, \theta))$$

The function $\Lambda(T_v, Y)$ computes the Euclidean distance by which a target vertex $T_v$ is inside the body mesh $Y$. Because the mesh is closed, a standard Point-In-Polygon test (i.e. choose any ray through the point and count the number of intersections it makes with the mesh $Y$; if that number is odd then the point is inside $Y$) will determine if the point is inside $Y$. If not then the distance is set to 0. If the point is inside $Y$, $\Lambda(T_v, Y)$ is simply the distance from the point $T_v$ to the closest point on the mesh $Y$, capped at $\tau_{dist}$ to be robust against noise in the sensor data.

A full objective can be obtained by estimating a consistent shape across P different poses $$E_{clothes;3D;sensor}(\chi, \beta^\chi, \Theta) = \sum_{p=1}^{P} (E_{1Pose,Classes,3D}(\chi, \beta^\chi, \theta_p) + E_{1Pose,Inside,3D}(\chi, \beta^\chi, \theta_p))$$

and expanded to include domain knowledge constraints as described in Section 6:

$$E_{clothes;3D}(\chi, \beta^\chi, \Theta) = E_{clothes;3D;sensor}(\chi, \beta^\chi, \Theta) +$$
$$E_{shape}(\chi, \beta^\chi) + \sum_{p=1}^{P} E_{pose}(\theta_p) + \sum_{p=1}^{P} E_{interpenetration}(\chi, \beta^\chi, \theta_p)$$

It should be also noted that the terms in the objective functions can all be weighed by different scaling constants to change the relative importance of each term. This objective function is updated at each ICP iteration and optimized using the strategy described in Section 6.

SECTION 8. SIMULTANEOUS CAMERA CALIBRATION AND SHAPE RECOVERY

This section considers the more general and less constrained scenario involving a moving person and one or more cameras where the camera(s) are not calibrated. Camera calibration is important for the accurate recovery of body shape, as it specifies the geometric relationship between the 3D world and the image plane (see section 2b). Previous methods for body shape estimation have relied on using stationary cameras in a controlled environment, which allowed them to perform a separate calibration procedure of the intrinsic and extrinsic camera parameters independent of the images used for body shape recovery (Lee et al. 2000, Seo et al. 2006, Balan et al. 2007a). Here we focus on a single uncalibrated camera case taking several images from multiple locations, orientations and/or zoom. The case of multiple fixed cameras is formulated the same way but is simpler because image data can be captured simultaneously so that the body may be treated as though it were rigid. In the general case, a single camera is considered that takes a sequence of images of a person in the scene. The scene is assumed to be rigid with the exception of the person who may change pose between captured images and the camera may be moving as well. The person may be wearing clothing or may be minimally clothed. While solutions to the problem of estimating rigid scene structure from multiple uncalibrated images have been proposed in the literature, the more difficult problem of estimating dynamic structure in the scene (i.e. the shape of a moving person changing their pose) from uncalibrated images is presently addressed. Also related is the work of Hasler et al. (2009a) who use multiple, unsynchronized, moving, but intrinsically-calibrated cameras for capturing human motion. They do not estimate body shape or use body shape in calibration but rather use standard rigid-structure from motion methods applied to the rigid background scene.

The assumption of a calibrated camera is reasonable in many situations of practical interest. Even with uncalibrated surveillance video, calibration can often be obtained using standard techniques (e.g. as described in Hartley and Zisserman 2000). In general, for snapshots (e.g. from a cell-phone camera), calibration may not be available and any calibration information (even if only approximate) needs to be estimated directly from the images used to capture the subject, without requiring a dedicated calibration procedure. Note that accelerometers or inertial sensors (e.g. as in the Apple iPhone) can provide information about camera motion that can help in this procedure. While there is literature on both camera calibration and shape recovery (of visual hulls) from silhouettes (e.g. Boyer 2006; Criminisi et al. 2000; Hernandez et al. 2007; Yamazaki et al. 2007), the prior art does not address articulation or humans per se. These methods typically assume a dense set of views of a rigid scene or strong restrictions on the type of camera motion; none deal with non-rigid human pose variation.

Let $\Psi = \{\psi_1, \ldots, \psi_P\}$ be the camera calibration parameters for P images taken by the same uncalibrated camera in different locations, or even by different cameras. Each $\psi_p$ contains the intrinsic and extrinsic parameters of the camera for each image (see Section 2b for a description of the camera parameters). Note that all these parameters can be estimated or the estimation can be restricted to a subset. Sometimes it is assumed that the focal length is known from EXIF data and does not change; this assumption is not critical and can be relaxed to estimate focal length as well. Often one can also assume that the radial distortion is minimal for high-quality cameras.

The $\psi_p$ parameters define the projection of the 3D body into the image p. In the case of image silhouettes, the dependence on these parameters is made explicit in the prediction of the image silhouette. The predicted model silhouette for image p is written as $$S_p^e(\chi, \beta^\chi, \theta_p, \psi_p).$$

Note that there is a different set of pose parameters $\theta_p$ for each image because the pose of the body may change, while there is a single set of shape parameters $\beta^\chi$. The previous objective functions are refined to allow optimization over the camera parameters $$E_{Body}(\chi, \beta^\chi, \Theta, \Psi) = \sum_{p=1}^{P} D(S_p^e(\chi, \beta^\chi, \theta_p, \psi_p), S_p^o),$$

where D is the combined bi-directional silhouette error in the case of no clothing (i.e. $E_{1Pose;NoClothes;1Cam}^k$ in Section 5a), or the more sophisticated error in the case of clothing (i.e.

$E_{1Pose,clothes;2D;1Cam}$ in Section 7a). In the case of moving cameras, the foreground regions $S_p^o$ can be found interactively or by using statistical segmentation methods (see Sections 2a and 2d). In one embodiment, the GrabCut segmentation algorithm (Rother et al. 2004) is applied after manually drawing bounding boxes around the subject in each frame with a graphical interface.

Optimizing this function over the body shape $\beta^\chi$, multiple poses $\Theta$ and camera parameters $\Psi$ is often not sufficient as there are many unknowns and silhouettes provide limited constraints on the camera parameters.

To make the problem better constrained, several other optional terms are added to the objective function. First, the segmentation of foreground and background regions is exploited. This segmentation may be in the form of a binary segmentation or a tri-map that contains certain foreground, certain background, and uncertain regions (Section 2d). The foreground is not rigid and the error term above accounts for this by allowing the pose parameters to vary. The background however can be assumed to be rigid. Estimating camera parameters for multiple views of a rigid scene is a well understood Structure-from-Motion problem (Hartley and Zisserman 2000, Snavely et al. 2008). The novelty here is to ignore the known foreground, which contains the person, and only use the background. Additionally, accelerometer or inertial sensor measurements can be incorporated to constrain or replace the camera motion estimation problem.

Hasler et al. (2009a) take an approach in which a person is moving in a rigid scene. They use standard feature tracking and a robust RANSAC method to ignore non-rigid parts of the scene that hopefully correspond to the moving foreground person. This gives the camera motion of the rigid background; tracked points on the foreground person are treated as noise.

In the present system a feature-based approach is employed:
1) Detect feature points $f_{p,i}$ in the background regions of each image p; e.g. SIFT features (Lowe 2004)
2) Establish correspondences between feature points in different images (matching); using i to index corresponding feature points and $f_{p,i}$ to denote if feature i was detected in image p
3) Given pairs of images with matching points, robustly estimate initial camera parameters and the 3D location of the feature points $X=(X_1, \ldots, X_F)$ while rejecting outlying matches by minimizing the standard Structure-from-Motion objective function $$E_{Rigid}(\Psi, X) = \sum_{p=1}^{P}\sum_{i=1}^{F} 1_{f_{p,i}} \cdot \delta(\psi_p, f_{p,i}, X_i),$$

where $\delta$ computes a robustified Euclidean distance between the $f_{p,i}$ image feature, if detected, and the projection its 3D location $X_i$ onto the image plane using camera parameters $\psi_p$.
4) Refine camera parameters through a global bundle-adjustment phase (Hartley and Zisserman 2000), optionally incorporating accelerometer or inertial sensor measurements of the camera motion In the present case the camera movement is expected to be small. It is also expected that the person will fill a significant portion of the image meaning that there will be relatively few background features to match. The person may also be photographed against a fairly plain background, further reducing feature matches. Finally, there may not be very much depth variation in the background. Consequently the standard estimation of camera parameters alone may not be very accurate.

To deal with this, the objective function for the body pose is combined with the rigid background term $$E_{Calib1}(\chi,\beta^\chi,\Theta,\Psi,X)=E_{Body}(\chi,\beta^\chi,\Theta,\Psi)+E_{Rigid}(\Psi,X).$$

Note that the camera parameters for a given image have to be the same for both the foreground (non-rigid body) and background (rigid) scene.

Note that the rigid term uses features in the scene. Its performance can be improved by adding special features to the environment. For example, the user can print out a checkerboard grid of known dimensions on a piece of paper and put it at their feet. In this case, the each camera view can be solved for easily as the problem reduces to a standard camera calibration problem. If the grid is small however, additional constraints may still be needed.

Additionally, there is no need to solve a general camera calibration problem. The photography of a person is a much more constrained problem. People tend to take photographs by either holding a camera viewfinder up to their eye or by viewing the display of a digital camera slightly lower than eye level. The camera orientation is also constrained by the height of the camera, the field of view and the height of the subject. Consequently, a "prior" is formulated on the camera calibration parameters that is specific to this problem. Previous, more general, priors have been used for calibration (Fitzgibbon et al. 2007); that work assumed the prior was unknown but shared among a set of stereo cameras. Here we assume a known prior, which can be learned from examples of people taking pictures of other people in an environment with calibration objects present. Alternatively the priors can be set "by hand". For example, if we know the camera is held upright (no tilt), this can be "built in" as a "hard" prior on camera orientation. In these cases the new objective becomes $$E_{calib2}(\chi,\beta^\chi,\Theta,\Psi,X)=E_{body}(\chi,\beta^\chi,\Theta,\Psi)+E_{Rigid}(\Psi,X)+E_{CamPrior}(\Psi).$$

In one embodiment $E_{CamPrior}(\Psi)$ is a Gaussian probability distribution around the mean value for each parameter (or the von Mises probability distribution for the rotation parameters), however it can be extended to a mixture of Gaussians to deal with the multi-modal distribution on camera height. Not all camera parameters must be estimated in all applications. In some situations it may be sufficient to estimate camera orientation relative to the person or the ground plane (Hoiem et al. 2006, 2008). Hoiem et al. (2006) note that a reasonable prior on camera height places it at approximately 1.67 m above the ground, corresponding to the average eye level of an adult male.

Finally there is one other valid assumption in the present case that can improve accuracy. It can be assumed that the camera orientation (and position) is similar between every snapshot. This provides a "temporal prior" on the camera parameters that penalizes large changes in orientation for example. Again this prior can be learned from training examples of people taking several photos of another person or can be set by hand. If the number of camera views is small the prior can be applied to every pair of views or, in general, the prior is only applied to neighboring views in a sequence as follows $$E_{Calib3}(\chi, \beta^\chi, \Theta, \Psi, X) =$$

$$E_{Body}(\chi, \beta^\chi, \Theta, \Psi) + E_{Rigid}(\Psi, X) + E_{CamPrior}(\Psi) + \sum_{p=2}^{P} \rho_1(\psi_{p-1}, \psi_p)$$

where $\rho_1$ is a penalty function defining the Euclidean distance between camera parameters and the images are temporally ordered from 1 to P.

Note that this formulation provides a method for extracting camera pose and body shape over an image sequence such as television sequence. In that case a prior can also be placed on the temporal change in body pose to enforce that the pose changes slowly from frame to frame $$E_{Sequence}(\chi, \beta^\chi, \Theta, \Psi, X) = E_{Body}(\chi, \beta^\chi, \Theta, \Psi) +$$

$$E_{Rigid}(\Psi, X) + E_{CamPrior}(\Psi) + \sum_{p=2}^{P} \rho_1(\psi_{p-1}, \psi_p) + \sum_{p=2}^{P} \rho_2(\theta_{p-1}, \theta_p)$$

where $\rho_2$ is a penalty function defining the Euclidean distance between pose parameters. Analogously, body shape could be allowed to change slowly as a function of time by enforcing a prior favoring small changes in $\beta^\chi$. Finally, as with any of the objective functions defined above, they can be augmented to include the pose and shape priors described in Section 6b. The terms in the objective functions can all be weighed by different scaling constants to change the relative importance of each term.

The optimization can be done using a gradient-free direct search simplex method as described in section 6a. To avoid getting stuck in local optima, the following strategy may be used in optimizing the objective function:

1. Segment the images into foreground and background regions. In the clothes case, also identify skin and clothed regions.
2. Perform standard robust Structure-from-Motion on the putative background region of the images to obtain initial estimates for $\Psi$ and X. Here, alternate between optimizing calibration and 3D feature locations using $E_{Rigid}$.
3. Alternate between optimizing body model parameters and camera calibration parameters using $E_{Sequence}$, or $E_{Calib3}$, and 3D feature locations using $E_{Rigid}$.

SECTION 9. MATCHING

A body-shape matching component searches a database of body shapes to find shapes that are similar to a user's shape. This component uses a matching function to determine how similar two different body shapes are. There are many methods for matching 2D or 3D shapes. A common method for comparing 3D shapes uses spherical harmonics (Funkhouser et al. 2005). These methods are particularly appropriate when the shapes are very different. When the shapes are similar like human bodies, and the meshes are aligned as in the present case, much more precise measures can be used.

Many efficient database search methods for this kind of problem are well known in the art and include methods like KD-trees, nearest neighbor search and locality sensitive hashing (Andoni and Indyk 2008). For small databases, even exhaustive search works well. The choice of search algorithm is not considered further, rather focus below is on the choice of distance measure.

Four classes of matching will be considered here, as follows:

1. Body shape matching incorporates the global overall shape similarity between bodies.
2. Measurement matching incorporates the comparison of traditional 1-dimensional measurements that are possible to make by hand, but which can also be inferred from a 3D body shape model.
3. Ancillary matching incorporates information that does not directly determine (but may be correlated with) shape. Ancillary data may include information about clothing or other products a person has purchased or rated.
4. Product matching incorporates information about a specific product of interest to the match. This may include user-supplied ratings of the product such as a "fit" rating.

These matching terms are combined to produce a match score.

Previous methods for sizing clothing from measurements have relied on matching tailoring measurements or categorical information (such as "hourglass" or "pear shaped") supplied by users (Rose 1999; Wannier and Lambert 2006) or derived from 3D body scans (Wang 2005). None of these methods directly match 3D body shape representations. As subsequently described, 3D body shape matching is combined with these other methods as an option.

Matching Body Shapes

Euclidean vertex distance. Given aligned body models, it is possible to simply compute the (square) distance between then as the average (square) distance between all the vertices, $v_{1,i}$ and $v_{2,i}$ in two models $$d_{Verts}^2 = \frac{1}{N} \sum_{i=1}^{N} \|v_{1,i} - v_{2,i}\|^2$$

where N is the number of vertices in the model. This distance takes advantage of the fact that the model factors pose and shape, allowing both models to be placed in the same pose before comparing them, but it does not explicitly model "shape" and is disproportionately affected by height. This can be mitigated by first height normalizing the vertices to a common height; depending on the application, this distance may be preferred normalized or un-normalized. The squared distance may also be replaced by a robust function to produce a robust distance measure.

Shape coefficient distance. Given the learned shape deformation models for a population, the shape of a person is approximated as a linear combination of basis shapes. The linear coefficients, $\beta$, can be used to measure distance $$d_{Body}^2 = \frac{1}{K} \sum_{j=1}^{K} (\beta_{1,j} - \beta_{2,j})^2 / \sigma_i^2$$

where K is the number of bases used in matching, $\sigma_i^2$ is the variance along each principal component direction (as defined by the eigenvalues computed during PCA). The use of the normalizing terms, $\sigma_i^2$, is optional and they may all be set to 1. Using the estimated $\sigma_i^2$ gives the Mahalanobis distance, which has the effect of increasing the importance of the shape variations that account for less of the actual variation between people. Often the principal components accounting for the largest variation are more related to perceived differences in shape. Consequently, better shape matching is achieved by setting the scaling values to 1. It should be understood that the squared distance can be replaced by a robust distance function, which may also depend on $\sigma_i^2$.

Shape coefficients provide a good foundation for comparing two body shapes. By definition they capture important shape variations across the population. Some shape variations may not be important in some applications however. The face region is one example. The importance of the face (or other region) can be decreased or eliminated by using weighted PCA. This is described in Section 10 on prediction from specialized shape coefficients.

Shape Transformations.

While shape bases are useful for matching, other shape features can be used. For example, spin images (Johnson 1997) can be used to define a shape descriptor and used to match bodies. Anguelov et al. (2005) used PCA-compressed spin images to align meshes. In the present invention, spin-images are used in a different way to define shape descriptors that can capture the shape of the body, either globally or locally, and then used to match a given body into a database of bodies that are already in correspondence.

An alternative is to define a radial distance feature in 3D. This is analogous to the 2D radial distance function used in Section 4 (Initialization) and is made practical by the alignment of the body shapes. The centroid of the body is computed from the vertices and the distance to a pre-defined subset of vertices is computed. This gives a feature vector that may be used as is, or compressed (e.g. with PCA or vector quantization). Matching into the database then uses distances between the feature vectors, which can be trivially computed.

Matching Measurements

The matching of user measurements to a database has been described in Section 4d. For initialization, these measurements are provided by the user. For matching, however, they may also be generated from the body model using any of the measurement methods described in Section 10 (Extracting Measurements).

$$d_{Measure}^2 = \sum_{i=1}^{m} (f_i(\beta_1) - f_i(\beta_2))^2 / \sigma_i^2$$

where m measurements, $f_i(\beta_1)$, are made from the body and where the variance associated with each measurement is $\sigma_i^2$.

Matching Ancillary Data

In addition to body shape, matching two people can take into account other features such as age, ethnicity, clothing size preference and other ancillary data. The database of stored body shapes may have ancillary data such as clothing brands and sizes that fit well. For example, when a person orders clothes using their body model through an on-line retailer, they can provide feedback about the clothing and how it fits using a rating system and text input. This information is stored in the database along with their body shape model.

In addition to linear and circumference measurements, non-metric or discrete properties such as clothing sizes or body types may be used in the match. For discrete measures that are represented by non-numeric values (e.g. bra cup size, build type, or "petite"), a distance function, $d_i$(value1, value2), is defined that returns a numeric value for ancillary data type i.

One method for doing this is to convert the discrete measures into numeric values. For bra cup sizes for example, this is straightforward. Another example is shoulder slope which can be discretized into a few categories like "square", "sloped" or "very sloped"; these can be mapped to the values 1, 2, 3 for example. The distance is then computed using these numeric values with a possible scaling constant to make the distance commensurate with the linear and circumference measures.

Some categories like ethnicity are best represented by a scaled binary value. People of the same ethnicity, for example, would have a distance of 0 while any difference in ethnicity would give a positive constant distance.

More generally, a lookup table is defined that specifies the distance between A ancillary values. These too may be individually scaled with weights determining the importance of each term $$d_{Ancillary} = \frac{1}{\sum w_i} \sum_{i=1}^{A} w_i d_i(a_{1,i}, a_{2,i})$$

where $a_{j,i}$ is the ancillary value i for body j and each $d_i$ is a function (e.g. lookup table) that returns the distance between the values of type i.

Product Matching

In addition to body shape, the match score may take into account information about products such as clothing. A distance $d_{2prod}(p_1, p_2)$ is defined between products. This may be implemented as a lookup table. Let $p_i$ be a vector of clothing descriptors such as [Brand, Gender, Clothing_Type, Style, Size]; for example [Gap, Women, Jeans, Relaxed, 8]. The product distance function returns the distance between any two such descriptor vectors. If a value is missing it can be represented by NA. An exact match of brand, clothing type, style and size could be assigned a distance of zero. A match that only includes brand, clothing type and size can be assigned a higher value. Differences in size produce proportionally higher distances.

In a typical scenario, a person with body $\beta_1$ (called the probe) wishes to know if a particular garment with properties $p_1$ will fit them. Consider a potentially similar body, $\beta_2$, (called the test) that may have many product vectors associated with it.) Let $p_j(\beta_2^{ID})$ be the $j^{th}$ such product vector of this test body where $\beta_i^{ID}$ is used to denote the unique database identifier for body i. The product distance between probe and test bodies is defined as $$d_{Product}(p_1, \beta_2^{ID}) = \min_j (d_{2prod}(p_1, p_j(\beta_2^{ID})))$$

where the closest matching (minimum distance) product vector is found and this distance is returned as the overall match.

More generally, if the product of interest is not known, then a general product distance between two bodies can be computed as $$d_{Product2}(\beta_1^{ID}, \beta_2^{ID}) = \min_{i,j} (d_{2prod}(p_i(\beta_1^{ID}), p_j(\beta_2^{ID})))$$

which finds the two most similar product vectors for the two bodies and returns their distance.

Additionally, stored in the database with information about products is optional user-supplied ratings. The ratings can be used to augment the product match score; for example by adding a constant to it. A high rating could add zero while a low rating could add a large constant. In this way, both similarity of the item and its rating are combined.

Combined Distance

Combinations of these different matching distances may be used in weighted combination. For example $$\text{Match}(\beta_1,\beta_2)=w_1 d_{Body}(\beta_1,\beta_2)+w_2 d_{Measure}(\beta_1,\beta_2)+ w_3 d_{Ancilary}(\beta_1^{ID},\beta_2^{ID})$$

where the $w_i$ are weights that can be varied relative importance of the terms and If product-based matching is desired, this becomes $$\text{Match}(\beta_1,\beta_2,p)=w_1 d_{Body}(\beta_1,\beta_2)+w_2 d_{Measure}(\beta_1,\beta_2)+ w_3 d_{Ancilary}(\beta_1^{ID},\beta_2^{ID})+w_4 d_{Product}(p,\beta_2^{ID})$$

Note that setting $w_1$, $w_2$, and $w_3$, to zero produces a match score that depends only on product information and ratings.

SECTION 10. EXTRACTING BODY MEASUREMENTS

Most of the methods for body shape estimation have had the goal of using the body shape to extract various measurements. These could be linear measurements such as height, circumferences such as waist size, volumes, or weights. Measurement extraction has many applications in fitness and weight loss, health care, clothing pattern making, and clothing sizing to name a few. Other types of information can also be extracted from body shape models, many of which have not previously been addressed such as gender, ethnicity, age, posture, body mass index (BMI), fitness level, etc.

Most previous approaches work directly on the geometry of an individual body scan. Typical scanners return a "cloud" of points, which is then triangulated to produce a 3D mesh model. Each scan produces a different mesh and scans of different people produce very different meshes. It is typically assumed that the body is in a known canonical (standard) pose. In this case, where the meshes are not in correspondence, the standard method for extracting measurements involves computing distances on the surface of the mesh. There are several ways this is done. For linear measurements between two points on the surface one can compute the Euclidean or geodesic distance. The geodesic distance can be constrained to lie along a path passing through certain landmarks. Computing circumferences involves "slicing" the mesh with a plane by computing the intersection of the triangles of the mesh with the plane. The intersection gives a closed contour and the length of this contour gives the circumference. Sometimes it is preferable to compute the convex hull of the contour as it may correspond better to the measurements obtained by a standard tape measure on the real body. Slices can be taken through the body shape model at any orientation. For example, given the orientation of the upper arm, a slice perpendicular to this orientation gives the perimeter of the arm at a given location. This can be applied to any part of the body. A slice may intersect more than one body part (e.g. both legs). If so one must segment the slice into parts. This can be problematic when body parts are touching (e.g. measuring the girth of the thigh when the inner thighs of a heavy person touch).

10a. First Disclosed Approach to Body Measurement Extraction Posing for Measurements.

We refer to the measurement method discussed above as the "standard" approach. Having a parametric body model that factors shape and pose provides significant additional capabilities and benefits. Specifically, the pose of the body can be changed without changing the underlying identity of the person. So, for example, if the person is scanned in a relaxed pose (arms at their side), their arm span can be measured by transforming the mesh into a "T" pose as described in Section 3 and then measuring the distance between the wrists. A complicated geodesic distance measurement is thus transformed into a simple Euclidean distance measurement.

Measuring Parts.

Additionally, because the body model is segmented into parts, by construction (Section 3), the body can be sliced on a plane and one can determine which intersections correspond to which parts. For example, the intersection can be performed with only the part of interest. In the case of the thighs as noted above, this allows measurement of each thigh without an additional and difficult segmentation of the plane intersection.

Knowing Where to Measure.

Finally, where one measures the body is critical for accuracy. With standard body scans, feature points must be identified and this can be difficult if there is noise in the scan. For example, arm length requires the identification of the shoulder and the wrist, both of which can be difficult to locate in standard scans. Given body models that are all in alignment as described herein, these features can be determined once on any individual mesh and the vertex locations are then automatically known on all other meshes.

To locate landmarks with accuracy greater than the resolution of the presently disclosed model, training scans are taken with known locations of key points on the body. A function is then learned mapping vertices to the location of the key points. Typically a local neighborhood of vertices (or global shape parameters) is taken and linear regression is used to learn this prediction function (details of the linear prediction method are presented in Section 10b).

This same method can be used to learn where to slice the body and at what angle. For example, determining the correct height and angle for measuring the waist is a known and difficult problem. Given training examples of the correct parameters of the intersecting plane, a mapping is learned from vertices of the body (or global shape parameters) to plane parameters.

Measuring the waist for pants is known to be particularly difficult because personal preference (related to body shape) varies where this measurement should be taken. A machine learning approach (Section 10d, below) is used to match a body to a database of bodies with ancillary data specifying body measurements as well as where to measure the body. Combining information from the best matching bodies gives a prediction for where to measure a new body.

This statistical learning approach for determining where and how to take standard measurements is one example of a more general and powerful statistical approach described in detail below.

10b. Second Disclosed Approach to Body Measurement Extraction—Statistical Approach The statistical method for estimating body measurements discussed below also differs significantly from the standard approach noted above. This statistical method uses the fact that all the body models are in correspondence and that the shape of the body has been characterized by a small number of parameters. The general formulation involves using training data containing body models and the desired measurements and learning a function that maps shape information to measurements:

$$\text{measurement}=f(\text{body shape}).$$

The measurement can be any of the standard measurements described above such as locations of landmarks or parameters for standard measurement techniques. The measurement may also be other personal data that correlates with body shape, such as age. The body shape information can be any shape descriptor computed from the body model. In one embodiment, the body shape information is taken to be the linear coefficients, $\beta$, characterizing the shape of the body. Linear or non-linear transformations of the mesh, filtering, spin images, spectral components, the mesh Laplacian, etc. could all be used as input. In this embodiment the function f(.) is taken to be linear, but it could be non-linear, a mixture of experts, non-parametric, etc. In particular, f(.) could be implemented non-parametrically using nearest-neighbor search (Section 10d). In the non-parametric form, the matching function described in Section 9 is used to find the N closest bodies and then their stored measurements are combined to produce a weighted combination (e.g. weighted mean or median). The linear version is presented in detail but it should be clear to someone practiced in the art that other standard functions could be used.

Allen et al. (2003, 2004) considered the related problem of predicting body shape from measurements (Section 4). Like the first method below they used a linear prediction function. They did not consider the case of predicting measurements from shape coefficients. The present disclosure goes further to predict measurements from properties of the body such as vertices or functions of vertices and shows how to select these properties or vertices automatically.

Prediction from Shape Coefficients

First considered is the case of predicting measurements from shape coefficients, $\beta$. Given a training database containing n body shapes with known measurements, the following system of linear equations is defined $$m_i = [m_{i,1} \; m_{i,2} \; \ldots \; m_{i,n}] = f_i \begin{bmatrix} \beta_{1,1} & \beta_{1,2} & \ldots & \beta_{1,n} \\ \beta_{2,1} & \beta_{2,2} & \ldots & \beta_{2,n} \\ \vdots & \vdots & & \vdots \\ \beta_{k,1} & \beta_{k,2} & \ldots & \beta_{k,n} \\ 1 & 1 & \ldots & 1 \end{bmatrix} = f_i B$$

where $m_{i,j}$ is measurement i for body j and $\beta_{q,j}$ is the linear coefficient q for body j. Here it is assumed the bodies are represented by k linear basis shapes. The linear "filter", $f_i$, maps shape coefficients to single measurements and can be learned using least squares estimation $$f_i = m_i B^\dagger = m_i (B^T B)^{-1} B^T,$$

where $B^\dagger$ is the pseudo-inverse of B.

Typically hand measurements are used to obtain the ground truth data in $m_i$. These are often inaccurate, and consequently one can use robust regression rather than least squares, such as a standard iteratively re-weighted least squares method with a robust penalty function. The exact choice of penalty is not critical.

Given a new body that is not in the training set, the measurement $m_{i,j}$ is predicted from the coefficients $\beta_j = [\beta_{1,j}, \beta_{2,j}, \ldots, \beta_{k,j}, 1]^T$ as $m_{i,j} = f_i \beta_j$. Note, more generally, the training vector $m_i$ can be replaced by a matrix M containing several measurements for each training subject and then $f_i$ becomes a matrix F that maps body shape parameters to many measurements simultaneously: M=FB.

Prediction from Specialized Shape Coefficients

The shape coefficients, $\beta$, are global descriptors of shape—varying one shape coefficient may vary the shape across the entire body. Measurements however are typically quite local. Details of facial shape for example may be only weakly correlated with the shape of the waist. Consequently more local measures of body shape are optionally used. Specifically, different shape subspaces are computed that focus on the properties of interest. For example, one can compute a new shape subspace that ignores the vertices of the face. Prediction of measurements from shape coefficients in the restricted space ignores any variation due to face shape.

Correspondence of all vertices across all models allows such subspaces to be found by weighted PCA where a low weight (e.g. zero) is given to certain vertices or triangle deformations. This can also be done at a part level. For example, a shape subspace can be constructed for just the torso region and the coefficients of this model used to predict measurements related to the torso such as chest circumference.

Given a body shape defined with the standard deformation subspace coefficients, $\beta$, this needs to be related to the reduced subspace models. The $\beta$ coefficients define a deformation of every triangle in the model. This deformation is taken and projected onto the new specialized subspace. If some weights were zero during PCA learning the resulting subspace will be orthogonal to them and they will not have any affect in this projection. The resulting projection gives a new set of linear coefficients, $\beta'$, in the specialized subspace. These coefficients are not generic in that they cannot synthesize any body shape but rather characterize the amount of deformation of particular sub-areas of the body.

Additionally, the standard shape basis is designed to allow the generation of arbitrary human body shapes. Generative models such as this are not always the best for detailed analysis. To address this, other transformations of the mesh can be used that accentuate relevant shape aspects of the body. One embodiment computes a spin-image representation (Johnson 1997) of each body and then computes a low-dimensional model of these representations. Measurement prediction is then made from these coefficients in the same way as described above for the standard shape basis. Below, when discussing prediction from vertices, it should be understood that the 3D location of the vertices of the model can be replaced by some other representation such as a spin-image, mesh Laplacian, or local curvature representations.

Prediction from Vertex Coordinates or Derived Predictors

Another way to focus on local shape properties relevant to a specific measurement is to replace the matrix B above by a matrix of 3D vertex coordinates instead. To focus on specific parts of the body, a subset of the vertex coordinates $\{x_1, y_1, z_1, \ldots, x_{n_v}, y_{n_v}, z_{n_v}\}$ that are most relevant for predicting a specific measurement is selected. There are several methods that can be used to select the subset.

Using a Random Subset of Vertices.

A simple method that works surprisingly well is to select a random subset of vertex coordinates to form the rows of a matrix B, whose columns span all the training examples. This method effectively spreads the selected vertices uniformly over the whole body. If a given vertex coordinate has low predictive value, regression will automatically give it a low weight in the filter f while more predictive vertex coordinates will be given higher weights.

Greedy Selection of Correlated Vertices.

Another way to select a subset of vertex coordinates is to choose those that are highly correlated with the measurement of interest (this correlation can be computed for every vertex coordinate). Often many of the vertex coordinates will be highly correlated with each other and therefore are redundant. To select a small, yet predictive, group a "greedy" approach is employed.

Given a subset of i−1 vertex coordinates selected from $\{x_1, y_1, z_1, \ldots, x_{n_v}, y_{n_v}, z_{n_v}\}$, in accordance with the disclosed method, an $i^{th}$ vertex coordinate is chosen to add to the subset.

This is accomplished by first robustly estimating the best linear filter, f, that predicts the desired measurement vector from the i−1 vertex coordinates. The prediction is then subtracted from the known vector of the true measurements, m, for all the bodies. This defines a residual vector, m*. To select the $i^{th}$ vertex coordinate, the correlation, $r_j(m^*)$, of each vertex coordinate, $v_j$, with the residual vector is computed. The vertex coordinate that maximizes this correlation is taken and the process repeated.

In pseudo code, the method is

```
V₁ := { argmaxⱼ(rⱼ(m)) }
for i from 2 to k do
    f_{i-1} := robustfit(B(V_{i-1}), m)
    m* := m - f_{i-1} B(V_{i-1})
    V_i := { V_{i-1}, argmaxⱼ(rⱼ(m*)) }
end for
``` where $V_i = \{v_1, \ldots, v_i\}$ is the currently selected set of i vertex coordinates, m* is the residual error between the ground truth vector of measurements, m, and the current prediction. $B(V_i)$ is the matrix of vertex coordinates whose rows are the subset of vertex coordinates $V_i$, and whose columns span all the training examples. The method robustfit($B(V_{i-1})$, m) is a robust version of the standard least-squares problem: $f_{i-1} = mB(V_{i-1})^\dagger$.

Note that rather than use vertex coordinates, the output of any filter applied to the vertices could be used instead and the same methods described will work. For example a filter that computes local surface curvature (e.g. second derivative of the surface) could be used instead of vertex coordinates.

Predicating Multiple Measurements.

The greedy method above is defined to predict a single measurement for each body and finds a set of vertex coordinates or other parameters that linearly predict that measurement. It is often useful to predict several measurements from the same subset of vertex coordinates. Consequently a single set of vertex coordinates or other parameters is sought that simultaneously predict a set of body measurements.

The algorithm is modified from above

```
V₁ := { argmaxⱼ(cⱼ(M)) }
for i for 2 to k do
    F_{i-1} := robustfit(B(V_{i-1}), M)
    M* := M - F_{i-1} B(V_{i-1})
    V_i := { V_{i-1}, argmaxⱼ(cⱼ(M*)) }
end for
``` where the vector of measurements has been replaced by a matrix M, the filter by a matrix F, and the residual function by a cost function, $c_j$, that combines information from many measurements.

Let $r_j(M_k)$ be the correlation of vertex coordinate j to the measurement (or residual) $M_k$ where k selects the row of M corresponding to a particular measurement (or residual) across all the bodies. Now, rather than selecting the vertex coordinate that maximizes $r_j$ for a single measurement, multi-measurement method computes the vertex coordinate that is "best" in some sense for all the measurements. This means combining information from the predictions for multiple measurements into a single value denoted $c_j(M^*)$. There are many ways to do this. The simplest but most computationally expensive way is to simply fit (robustly) a new prediction matrix F for the addition of each possible vertex coordinate, use that F to predict all the measurements and choose the vertex coordinate that produces the lowest residual error. With a large number of vertex coordinates this becomes impractical so an approximate method is employed in one embodiment.

The goal is to choose a vertex coordinate that is "good" in the sense that it reduces the residual errors in predicting all the measurements. Intuitively it may be desirable to favor the accurate prediction of some measurements over others. For example, it may be desirable to favor the prediction of measurements that have high variance in the training set. Let be the variance of measurement k across the training set of bodies. Then the cost function is defined as $$c_j(M^*) = \sum_{k=1}^{n} \sigma_k^2 r_j(M_k^*).$$

where n here denotes the number of measurements. This combines the correlations for each measurement (appropriately weighted) into a single score for vertex coordinate j.

Predictions for Sub-Populations

In the above discussion all the bodies in the database have been treated equivalently and a single mapping from bodies to measurements has been learned. Of course men and women have different shapes and the optimal measurement predictions may use different shape coefficients or vertices. The same is true for different ethnic groups or age groups. For example, one can learn a predictor for Asian women, athletic women, or men under 30 years of age. Consequently prediction functions are defined for different sub-populations. Then, when estimating body measurements, if the sub-population is known, the appropriately trained model is used for prediction. If not, then a generic model is used. The model of the greatest specificity is used.

10c. Discrete Measurements

The discussion above has focused largely on continuous measurements where the mapping can be represented by linear or non-linear functions. There are many discrete, or categorical, measurements that are also of interest and that can be estimated from body shape. Examples include discrete sizes such as dress size, jacket size, bra cup size, etc. For non-numeric measurements (e.g. cup size), if there is a natural order to the sizing, it can be converted to a continuous scale by mapping it to the real line. For example, women's bra cup sizes can be mapped from A, B, C, D, etc. to 1, 2, 3, 4.

For some applications, qualitative judgments may be important. For example, when fitting a man's shirt, it may be valuable to classify their body type. Example classifications include:

Shoulder category
1 Normal
2 Slopping Shoulder Long Neck
3 Square Shoulder Short Neck
Upper Body Type
1 Slim
2 Regular
3 Fit
4 Athletic
5 Hefty
Mid-Section Type
1 Flat Stomach
2 Slight Stomach
3 Medium Stomach
4 Large Stomach
5 Hefty Values such as these can be predicted in many ways. One is to convert them to numeric values and use linear prediction (above) or the method below. Alternatively, given a database of labeled bodies, any number of multi-class classifiers can be trained or nearest-neighbor matching employed (Section 10d).

Given numeric measurements, the regression methods described in section 10b are used in one embodiment to learn a function from coefficients or vertex coordinates (or filtered values thereof) to the numeric values. Given a new body, the numeric value is predicted and the closest matching numeric value is then found (e.g. by rounding the predicted value to the nearest integer), taking this to be the answer. However, when dealing with clothing sizes it is important to note that they are not consistent between brands, models, and even production dates. Consequently, such predictions are best made for specific garments given a training set of body shapes for which that make, style and size are known.

Gender

One important "discrete" measurement is gender. Automatically detecting gender is convenient for users and allows the use of gender-specific models and methods for fitting and measurement. Two methods are disclosed for classifying gender.

The first uses the linear body shape coefficients, β. If a single PCA shape model is constructed with both men and women then it has been observed that the coefficients of men and women in this space are very distinct. Classification of gender can be achieved using a simple linear classifier though more complex methods such as support vector machines could be used (Cristianini et al. 2000). These methods are standard classification methods in the literature.

An alternative method fits separate male and female body models to sensor data and then evaluates how well they explain the measurements (e.g. silhouettes or range data). The model that produces the lowest error is selected as the best fitting gender:

$$\operatorname*{argmin}_{\chi \in \{male, female\}} \left( \min_{\beta_\chi, \Theta} E(\chi, \beta_\chi, \Theta) \right).$$

Most previous work on gender classification from images has focused on faces (e.g. Moghaddam et al. 2002), but in many situations the face may be too small for reliable classification. The other large body of work is on estimating gender from gait (e.g. Li et al. 2008). Surprisingly, this work typically takes silhouettes and extracts information about gait while throwing away the body shape information that can provide direct evidence about gender. The presently disclosed approach is the first method to infer a parametric 3D human body shape from images of clothed or minimally clothed people and to use it for gender classification.

10d. Non-Parametric Prediction Based on Body Matching

Figure 9:
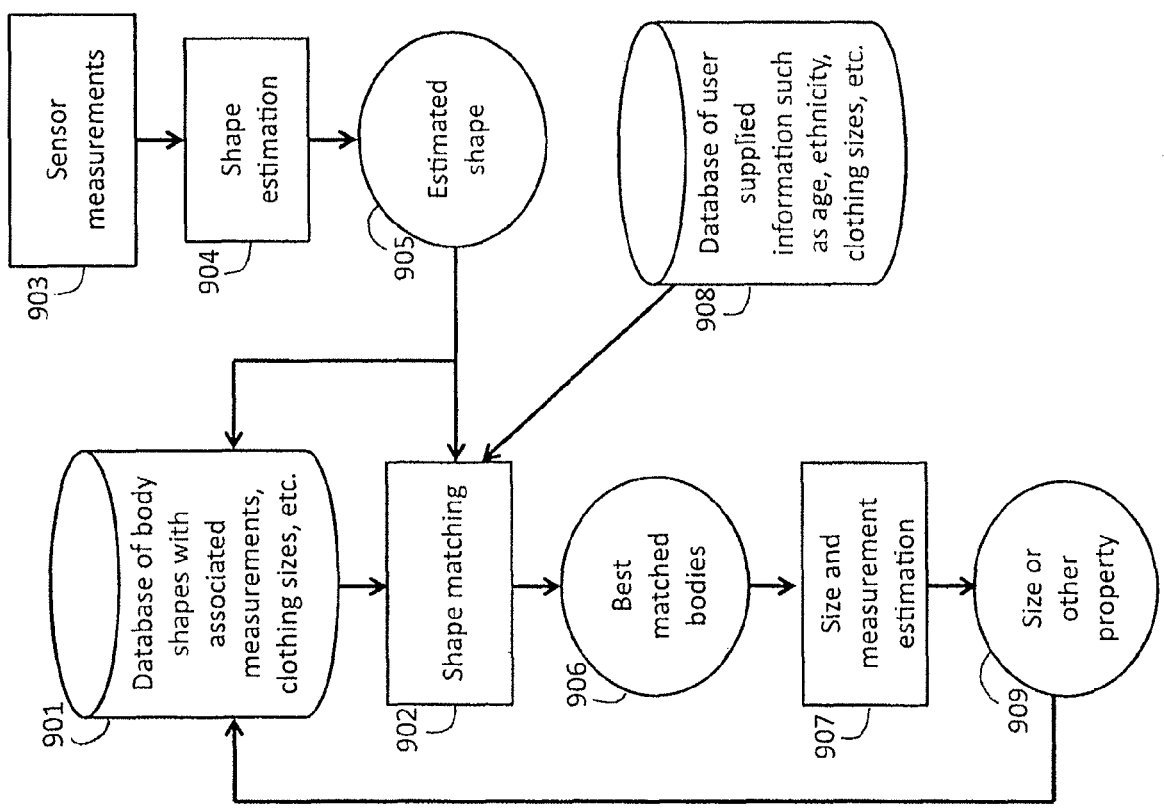
FIG. 9 is a flow diagram depicting shape based collaborative filtering.

The above parametric linear methods can be extended to non-linear functions. FIG. 9 is a flow chart depicting a method employed for shape-based collaborative filtering. In the shape-based collaborative filtering method, a body shape is matched to a database to find similar shapes. The stored measurement and size data for the best matching shapes are then combined to produce an estimated measurement or size for the input body.

More specifically, and referring to FIG. 9, if the database of body shapes and measurements 901 is sufficiently large, non-parametric methods can be used. This approach uses the body-shape matching component 902 described in Section 9 to determine how similar two body shapes are. Given sensor data 903, body shape is estimated 904, for example using one of the scanner embodiments described in Section 11, to produce an estimated shape 905. Given a probe body shape represented by shape coefficients 905 and optional ancillary data such as age, gender, ethnicity, clothing sizes, etc. obtained, for example from a database 908, the N closest matching bodies 906 in the database 901 can be found. The match score for each body j can be transformed to a value $w_j$ between 0 and 1.

If the task is to extract waist size, for example, as depicted at step 907 then this is computed from the N matching bodies 906. Each body j in the database has stored with it the ground truth measurement or attribute $m_j$. Consequently the N measurements are combined in one of several ways such as the weighted average $$m^* = \frac{\sum_{j=1}^{N} w_j m_j}{\sum_{i=1}^{N} w_i}$$

where the weight is derived based on the match distance between the probe body and each of the N example matches. Alternatively the median $$m^* = \operatorname*{median}_{i}(m_i)$$

is computed. Note m* has a different meaning here than in the Section 10b.

This shape-based selective recommendation is referred to as shape-based collaborative filtering because it combines information from multiple people to make a recommendation for a new individual. Unlike other collaborative filtering methods that, for example, match people based on movie preferences, here the matching is based on body shape and optional ancillary information.

This method works well for predicting discrete clothing sizes, particularly since sizing varies significantly from brand to brand and across clothing categories. In this case, the matching function can take into account whether an individual body in the database has size information for a particular garment (or category of garment) using the product match distance function (Section 9). Only bodies where relevant size information is present are then included in the match and used to compute the desired measurement (e.g. dress size). If, for example, sizing is desired for a particular brand and style of clothing, the match function can be modified to address this requirement. This is implemented including clothing brand and style information in the ancillary or product match terms (Section 9). Body models that have ancillary product data corresponding to the desired brand and style are given a low distance while any body missing that brand and style is given a higher distance. The standard shape-based similarity terms then weight more highly bodies that have similar shapes and have ancillary product data about particular brands.

SECTION 11. SCANNING SYSTEMS

The methods described here can be configured in several ways to produce different types of body scanners using the techniques described in the preceding sections (2-8). Four such systems are described.

11a. Changing Room Scanner

Described here is one of many possible scanning systems which may be built using the techniques described in the preceding sections (2-8). The system consists of several cameras mounted on the walls of a small room or booth, as for example, a changing room in a retail clothing store. In this system the environment is instrumented to simplify segmentation and to deal with calibration. This scenario is most similar to existing body scanners in that it works in a controlled environment, but the presently described system is robust to variations in the environment over time and hence is appropriate for less controlled settings.

A simple implementation of such a scanner involves mounting the cameras and calibrating them off-line. Additionally the background is painted green or blue to allow segmentation based on chroma-keying. Unfortunately for such an implementation, vibration and customer activity may cause camera extrinsic parameters to vary over time, introducing error into the estimated body shapes. Similarly, the customer may bring objects into the scanning room with them and leave them in the field of view of the cameras. This means that simply computing foreground segmentation based on chroma-keying or simple background subtraction will produce inaccurate segmentations and thus inaccurate body shapes.

A pipeline is presently described for a changing room scanner that addresses these considerations by automatic adaptation to the current background and camera configuration.

A multi-chromatic calibration pattern on the floor and walls is used. As described in Section 2c, this pattern aids calibration without detracting from segmentation. The changing room does not need complete coverage of the pattern, and may vary in paint color outside of the pattern; but better accuracy may be achieved with large patterns filling the field of view of each camera. The calibration can be checked for accuracy with each image acquisition and automatically re-calibrated if it is out of alignment (Section 2c).

Figure 10:
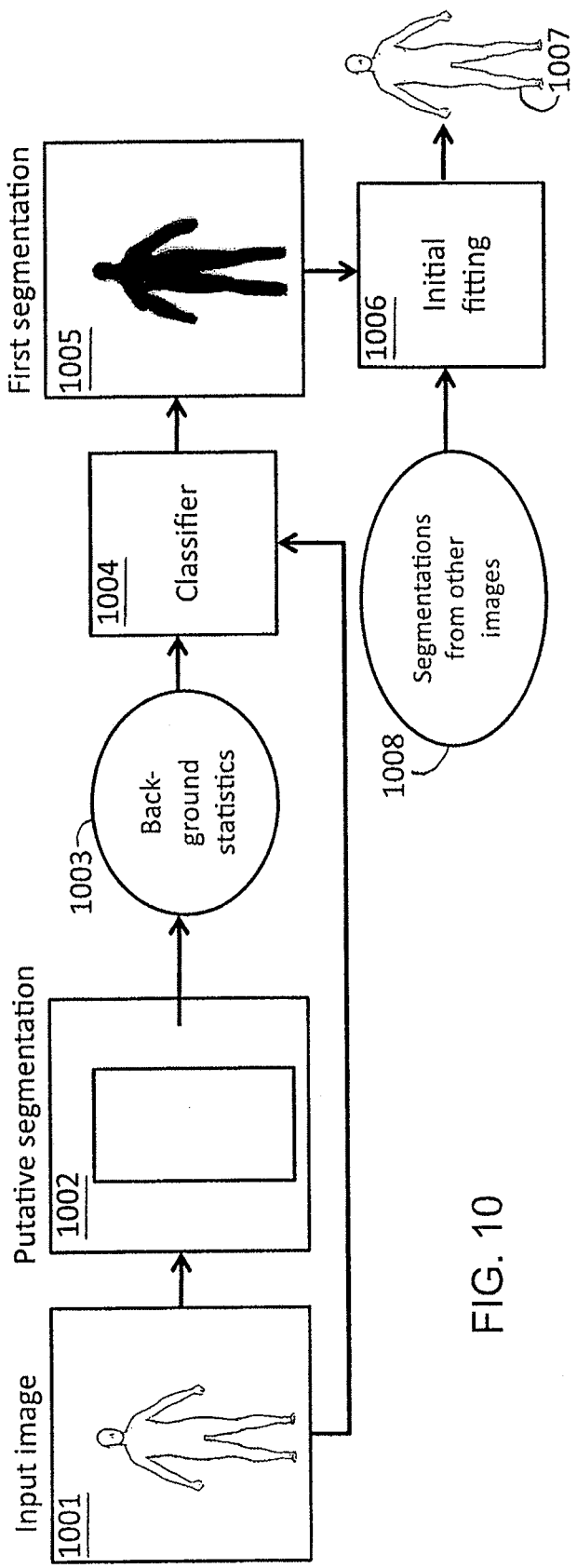
FIG. 10 depicts a flow diagram depicting method of obtaining a coarse segmentation background and foreground images and utilizing the coarse segmentation to obtain a course estimate of body shape and pose.

During a scan, as illustrated in FIG. 10, a user stands in a known location in an expected pose and images are acquired 1001. A region in the image where the body could possibly be located is determined (e.g. background subtraction) in every camera view as depicted at block 1002. Background statistics (e.g. color and texture histograms) are computed for each view in regions where the subject is not expected to be located, as depicted at block 1003. Pixels (or regions of pixels) in each view are compared to the background statistics by a classifier component 1004 and classified as possible foreground or background pixels using a simple threshold, resulting in an initial foreground segmentation 1005.

From the initial segmentation from multiple images 1008 and a roughly known pose, the body shape is coarsely fit 1006 to get an estimate of the height and overall build as depicted at block 1007 and described in Section 6. This is done by optimizing only the first few body shape coefficients and the 3D position of the body while keeping articulated pose fixed (this can be done at lower image resolution). With an initial guess of the body location and size, the segmented foreground regions are refined using the tri-map method described in Section 2d.

With calibration and this refined segmentation, the standard fitting process described in Section 6 is used. In this scenario there may be no user input of measurements, so individual-specific constraints may be unavailable. The system described here requires the user to stand in a particular pose, but such a scanner may instead allow a variety of poses (Section 8) and clothing (Section 7) and use an automatic initialization algorithm, as described in Section 4.

11b. Portable Scanner

The changing room scanner described above assumes multiple cameras that are relatively fixed and mounted in the environment. These assumptions are now relaxed and a system is described having a single camera that is held by the operator. Using this single camera, one or more photographs are taken; since these frames are not acquired simultaneously, variation in the pose of the subject may occur from frame to frame.

One embodiment uses one or more MultiChroma Key grids (described in Section 2c) to enable simultaneous segmentation and calibration. A single grid placed on the floor is sufficient to enable extrinsic calibration. A second grid can be placed behind the subject to aid in segmentation and provide further constraints on calibration.

Figure 11:
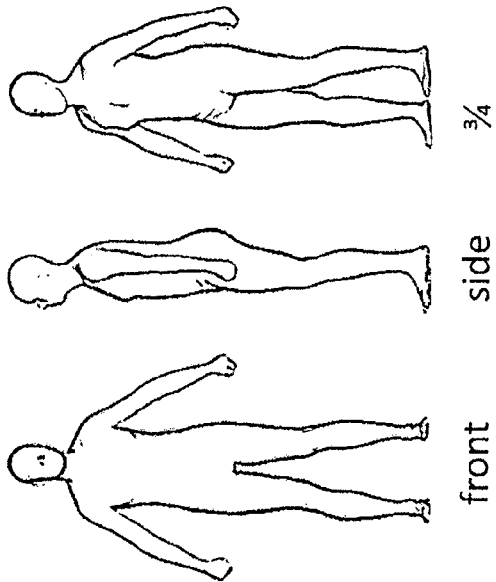
FIG. 11 depicts sample poses used for body shape estimation from multiple images with changes in pose.

Images are captured with the subject in several specified poses such as those in FIG. 11. The objective function is optimized to solve for pose in every frame, therefore variations in pose between frames is acceptable. If clothing is worn, a wider range of poses is typically beneficial to capture extra constraints on the underlying body shape (see FIG. 8).

The multi-chromatic grid is detected (Section 2c) in the images and camera parameters are computed (Section 2b). Knowing the grid location enables the identification of the multi-chromatic regions and the training of a statistical model of the color variation in them. This allows the foreground segmentation process to account for variations in lighting conditions that affect the measured color of the multi-chromatic calibration surfaces (Section 2c).

Segmentation is performed as defined in Section 2c. If the approximate pose of the subject is known, a separate initialization step is unnecessary. Given the foreground regions found using multi-chroma keying and a known initialization for pose, the method solves for the body pose and shape following the procedure described in Section 6. A consistent shape is optimized across all images and the pose is allowed to vary in each image. Optionally the pose prior (Section 6b) is used to prevent the estimated pose from deviating too far from the initialization. Also, optionally, user input is allowed for constrained optimization (Section 6b).

11c. Scanning from Snapshots

Body shape capture is now considered in a natural, un-instrumented environment. Given the ubiquity of digital cameras in the marketplace (from high quality digital SLRs to cell-phone cameras), body shape capture from such devices has the potential to make body scanning extremely accessible. While this general problem is challenging, the components described here are assembled into a complete system to take several snapshots and recover a full body model. A diagram for this system is shown in FIG. 12.

Figure 12:
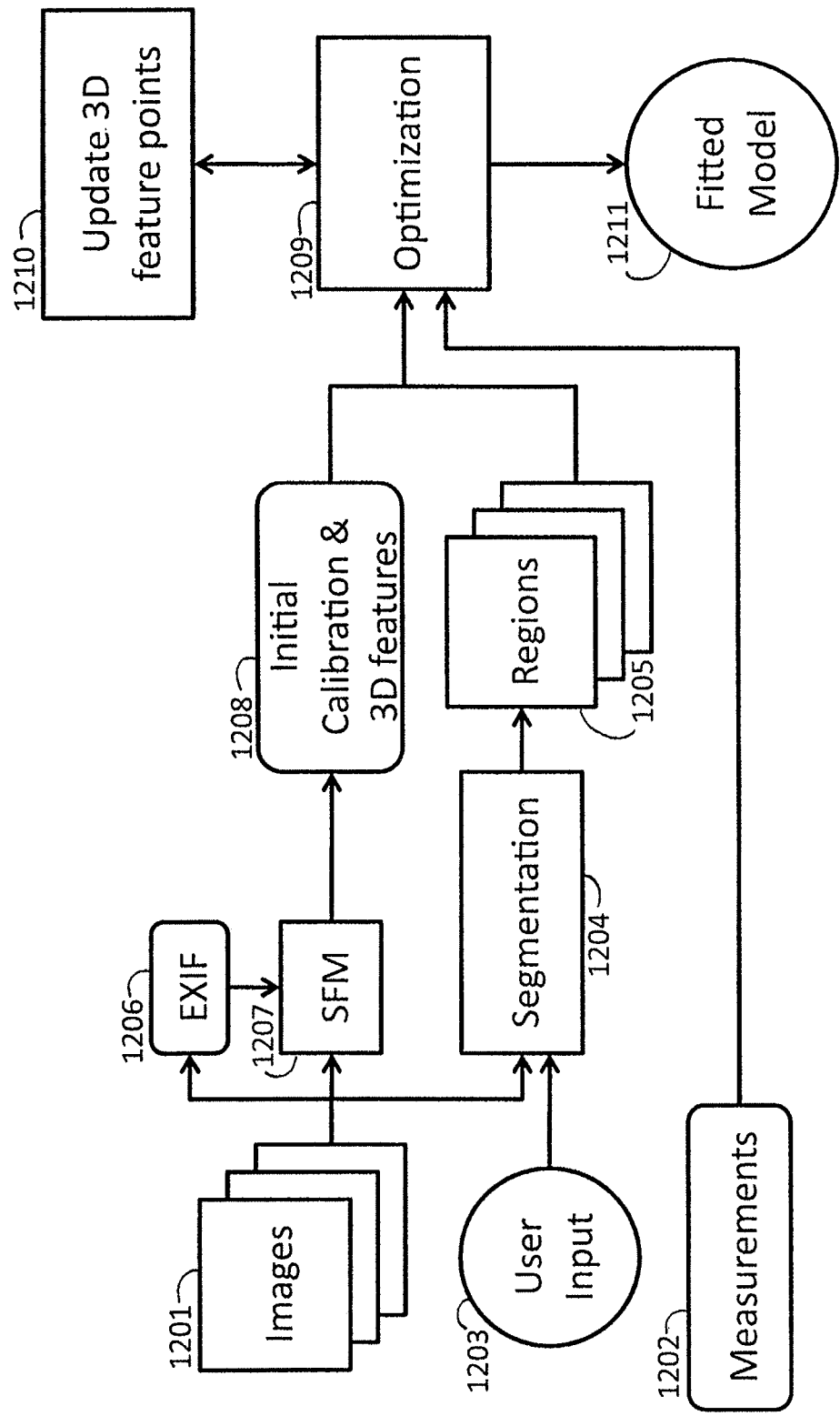
FIG. 12 depicts a flow diagram of a method for recovering a full body model from several images, such as several snapshots obtained from a handheld camera.

Referring to FIG. 12, the user obtains pictures of himself as depicted at block 1201 at several orientations—for example frontal, side and ¾ views (see FIG. 11) and/or in several poses (see FIG. 8). The user may wear minimal or tight-fitting clothing, or may wear looser clothing in which case the optimization method described in Section 7 is used. The photos may be taken with a hand-held camera. The approximate position and rotation of the camera should remain fairly constant between images (though a tripod is not necessary).

Height or other measurements 1202 may be provided by the user. These measurements 1202 are integrated into the objective function during optimization, as described in Section 6. In this uncalibrated case, at least one body measurement (e.g. height) is needed to constrain the optimization.

A putative segmentation for each frame is obtained using one of the segmentation methods described in Section 2 or using input 1203 from the user. For manual segmentation, the images are presented to the user on a display device and the user can either drag a rectangle over the region containing the body, or can click on a few points which are used to obtain a rough body model using the method described in Section 4 from which a tri-map is extracted as described in Section 2d. In either case this is used as input to guide an image based segmentation algorithm 1204, for example, based on graph cuts. In the case that the user is clothed, the image is segmented into three regions: skin, clothing/hair regions, and background. If the user is wearing tight-fitting clothing, then the image may be segmented into only foreground and background. For each frame, this produces a foreground silhouette and an optional classification for each foreground pixel as skin or non-skin as illustrated by regions 1205 (Section 2e).

Camera calibration is not available in the case of snapshots. The focal length, however, is typically available from the image's EXIF metadata 1206. Other intrinsic parameters may be initialized to reasonable default values (no distortion, center of projection at mid-image), which approximately hold for most cameras (Hartley and Zisserman, 2000). These values are optionally used to initialize a standard Structure-from-Motion (SFM) algorithm that is applied to the background regions across frames as described in Section 8 and illustrated at block 1207. This produces an initial calibration 1208.

If the user adopts a pre-defined pose, no special initialization step need be performed. The body is initialized in the known pose with shape parameters predicted from the input measurements (e.g. height, gender, age) as described in Section 4.

The shape, pose and calibration optimization 1209 is performed as described in Section 8 to minimize, for example, $E_{sequence}$. Optionally, the optimization 1209 alternates with the background structure-from-motion (SFM) component 1210, which updates the location of 3D feature point locations X given the current camera calibration parameters $\Psi$ (see Section 8). This process converges to produce a pose and calibration for each frame and a single body shape as depicted at block 1211.

11d. Surveillance Scanning

Unlike other technologies, the presently disclosed system can estimate body shape using regular cameras and works when people are changing pose and wearing clothes. This enables an automatic method for acquiring a person's measurements from surveillance cameras. This body shape information may be used for several purposes depending on the scenario.

In a retail shopping scenario, multiple cameras capture the body of customers as they move around a retail store. The system can be focused on a specific region and activated when a person is detected entering this region. Detection can be performed using simple image differencing or auxiliary sensors such as motion detectors or force plates. Robust estimates of the background can be updated over time enabling effective segmentation of foreground regions; such algorithms have been described in the literature.

Given multiple calibrated cameras and segmentation, the person's body shape is fit to the image data. An initialization component predicts one or more possible body poses based on foreground silhouettes or other image features (Section 4). The body pose and shape estimation components optimize the fit to the foreground silhouettes in each camera as described in Section 6. Depth sensors (e.g. stereo or time of flight) may or may not be used, but when used, they help with both segmentation and shape estimation.

The clothing sensitive image error function is employed as described Section 7 to provide an estimate of body shape under the clothing. The estimated body shape and an image of the person's face may be transmitted to an in-store terminal and may be accessed by the customer or store clerk. The body shape model may then be used in any of the applications described Section 12.

An alternative use of in-store cameras is for forensic video analysis. Here the estimation of height, weight, and other biometric information can be extracted and provided to police or matched against stored measurements to identify individuals based on body shape characteristics.

11e. Scanning with Range Sensors

The above embodiments focus on the use of standard digital cameras for estimating body shape. Of course, there are many other types of sensors that could be employed such as time-of-flight, stereo or structured light sensors that return information about scene depth. If the person is wearing tight fitting clothing, then a parametric body model can be fit to this data using an iterative closest point (ICP) method, as described in Section 5b, to first match the model vertices with observation data points given an initial pose and shape and then optimize both pose and shape based on the matched 3D points. With a new pose and shape, the closest points are found again and the process is repeated (See Section 5 for details). If the subject is observed in multiple poses, the formulation in Section 6c is used to integrate shape constraints over multiple poses.

In many common scenarios such has home entertainment scenarios, users of such a device are typically clothed. Thus the recovery of body shape under clothing remains a key issue. The method described here fits the body shape under clothing in range imagery (Section 7). The basic principles are the same as for standard imagery: the true body shape falls inside the measurements (clothing increases size), body shape is constant across pose, clothing provides constraints on shape that vary with pose, and some regions of the body are observed with either no clothing or tight fitting clothing.

In Section 7 a modification to the standard ICP cost function is described that allows clothing to be taken into account. Many range scanning devices simultaneously acquire visible imagery, which either provides a texture map or per-vertex coloration for the range data. This allows the classification of sensor data points as either skin or clothing using the skin classifier described in Section 2e (or more generally to classify each as corresponding to one of G classes using user input or skin/hair/clothing classifiers described in the literature (Section 7b)).

Given this classification, the clothing-aware ICP method alternates between optimizing pose and shape using the cost function $E_{clothes;3D}(\chi, \beta^\chi, \Theta)$ defined in Section 7 and updating the closest points.

12. APPLICATIONS

This disclosure has described the core body shape estimation methods and several scanner embodiments that they support. Additionally these core methods, combined with shape matching and shape measurement, support a range of applications. Each of these relies on the estimation of body shape from measurements (either sensor data or measurements such as height and waist size). Given a parametric body model, the measurement and matching components are used in various ways below. Many of these uses rely on a database of body models and associated ancillary data.

Body Shape Database

When a body model is created, it may be stored in a secure database with a unique identifier associated with a user. Specifically, the shape coefficients are stored along with the version of the shape basis used (including the date of creation and whether it was created for a sub-population). This allows the body to be reconstructed, matched or measured independent of when it was scanned. If a pair of bodies are created with two different shape bases, it is straightforward (given vertex correspondence) to convert one or both of them into a common basis for comparison or measurement (Section 10). Additionally, ancillary data that the user enters may be stored such as their age, ethnicity, clothing sizes, clothing preferences, etc.

A user may access their body model in one of several standard ways such as by logging onto a website over a computer network using a unique identifier and password. The body model information may also be stored on a physical device such as a phone, key fob, smart card, etc. This portable version allows the user to provide their information to a retailer for example using an appropriate transmission device (e.g. card reader).

The body identifier may be provided by the user to retailers, on-line stores, or made available to friends and relatives with or without privacy protection. In providing access to their body model, the user may provide limited rights using standard digital property rights management methods. For example, they may provide access to a friend or family member who can then provide their information to a clothing retailer, but that person could be prohibited from viewing the body model graphically. As another example, a user could provide access to display the body to video game software to enable the use of the model as a video game avatar, but restrict the further transmission of the model or its derived measurements.

When a person purchases clothing from a retailer (e.g. over the Internet) using their body model, the size and brand information may be (optionally) stored with their body model. This information may be entered manually by the user with a graphical interface or automatically by software that collects the retail purchase information. Optionally the user can provide one or more ratings of the item related to its fit or other properties and these may be stored in the database in association with the clothing entry.

If a person has multiple body scans obtained on different dates, they may all be maintained in the database. The most recent model can be used by default for matching and measurement. When ancillary data is stored, it is associated with the most current scan at that time. Additionally, storing multiple body models enables several applications. For example, body measurements can be extracted and plotted as a function of time. The shape of the body can also be animated as a movie or displayed so as to show the changes in body shape over time. One method provides a graphical color coding of the body model to illustrate changes in body shape (e.g. due to weight loss). Since all model vertices are in correspondence, it is easy to measure the Euclidean distance between vertices of different models. This distance can be assigned a color from a range of colors that signify the type of change (e.g. increase or decrease in size as measured by vertex displacement along its surface normal). Color can alternatively be mapped to other shape attributes (such as curvature) computed from the mesh. The colors are then used to texture map the body model for display on a graphical device.

Shape-Based Collaborative Filtering

Collaborative filtering or recommendation uses information about many people to predict information about an individual who may share attributes in common with others. A common example is movie ratings. If many people who liked movie X also liked movie Y, an individual who liked X but has not seen Y may reasonably be expected to like Y.

A new form of collaborative filtering based on 3D body shape is presently disclosed. People with similarly shaped bodies may be expected to be interested in similar products such as clothing or weight loss products. Specifically if many people with similar body shapes to X buy pants of size Y, then an individual X may also be expected to fit size Y. Thus, a body shape model is used as described to match people based on body shape (Section 9 and 10d).

Several embodiments of this method of body shape matching are possible.
1. Size recommendation. If a user is shopping for clothing of a particular type, the system identifies N people with similar body shapes (Section 9 and 10d) for whom ancillary data related to this (or similar) item is stored in the database (e.g. use the product distance function). A function is used (e.g. a weighed combination based on body shape distance) to predict the best size (Section 10d). Body shape as well as similarity in clothing preference may be used in the matching (Section 9).
2. Community ratings. Instead of being presented with a specific size, the user is presented with a list of ratings for the product by people of similar size. The degree of similarity is shown along with optional entries such as the rating, comments, photos, etc. The degree of similarity can be expressed on a point scale or percentage scale by taking the body shape distance measure (Section 9) and normalizing it to a new range (e.g. 1-100 where 100 is an exact match and 1 is the match to a very different body shape).
3. Community blogs. People with similar body shapes may be trying to lose weight or increase their fitness. Shape-based matching is used to find people with similar body shapes. Groups of people with similar shapes (an possibly preferences) define a "community". Users can post information (e.g. in a blog format) about themselves and find postings by other members of the community who of similar shape (or who have undergone as similar change in shape). The key concept is that community is defined based on body shape-related properties.

Matching Using Fit Models

Figure 13:
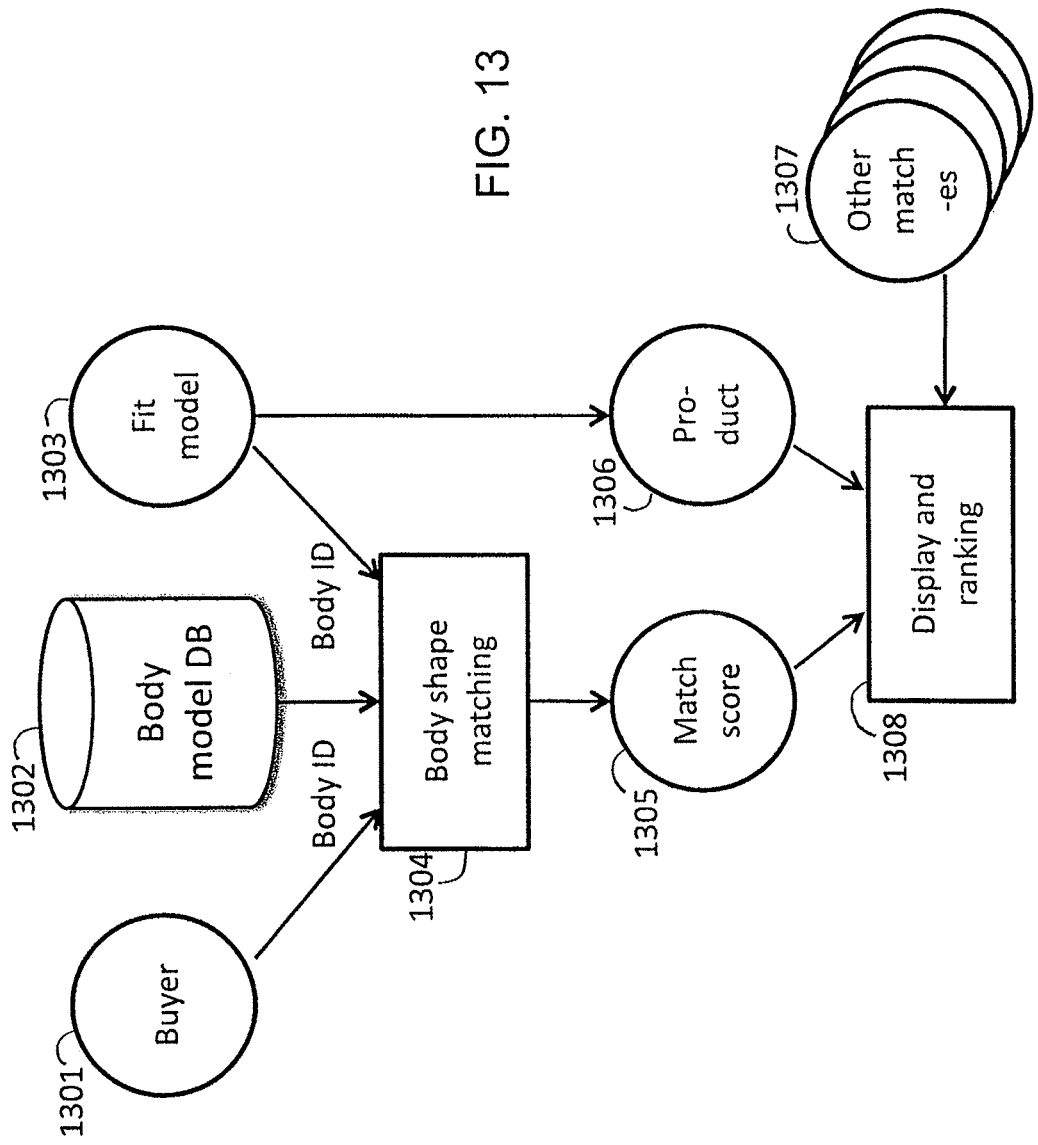
FIG. 13 is a flow diagram depicting a method of performing body shape matching of a potential buyer of goods to fit models that enables a body-shape sensitive display and ranking of products.

A method of performing matching using fit models is illustrated in FIG. 13. A seller of a particular garment can associate a body shape, or fit model 1303 with a garment where that body is known to fit that garment. For example an individual wants to sell an item of clothing that fits them through an on-line auction. They list the item along with a unique identifier that can be used to match any other body model to theirs. A buyer 1301 looking for clothing provides their unique body identifier and the matching component 1304 compares the 3D body shapes and ancillary data (including optional ratings of clothing fit) retrieved from a database 1302 to determine the match score 1305. Given a plurality of other matches from other fit models 1307 a display and ranking software component 1308 sorts the items for sale based on the match score 1305 (how similar their body is to the seller's). This method for sizing clothing applies to any retail application where a fit model for each clothing size is scanned and the associated body identifier is used to determine whether a new individual will fit that size. A score of the quality of fit (based on the body match score) can be presented or a threshold on the match score can be used to identify one (or a small number of) size(s) (i.e. fit models) that will fit the user's body. This method is analogous to having a friend or personal shopper who is the buyer's size and shape and who tries on clothing for them to see if it fits before recommending it.

Matching and Sizing Using a Community of Fit Models

More generally, there may be a large database of people who have tried on the same (or similar) garment and each of them can be viewed as a fit model; every person in the database can be a fit model for any product associated with them. The match distance (Section 9) between bodies incorporates shape and other attributes. Attributes can include one or more ratings of the product (for fit, style, value, etc.). The total match score can then include a term for the fit rating indicating whether the garment fits the fit model. Alternatively, the match can be performed on body shape and an aggregate fit rating for the matched bodies computed (Section 10d). If the matched bodies have associated reviews for the product stored in the database, these reviews may be optionally displayed to the user such that they are optionally ranked by match score.

In an alternative embodiment, the match similarity is computed only based on product information (brand, style, size) using the ancillary or product distance function (Section 9). A user selects a particular garment and a list of matches (IDs) is generated from the database where each ID corresponds to a person who has purchased and/or rated the product. The body shapes of the matching IDs are compared to the user's body shape by computing the body shape match score. An aggregate of all these scores is computed; for example by computing the mean score. This score is presented to the user (e.g. on a 100-point scale) to indicate how well the garment may fit them.

Automatically Obtaining Fit for Clothing Presented on a Web Page

Figure 14:
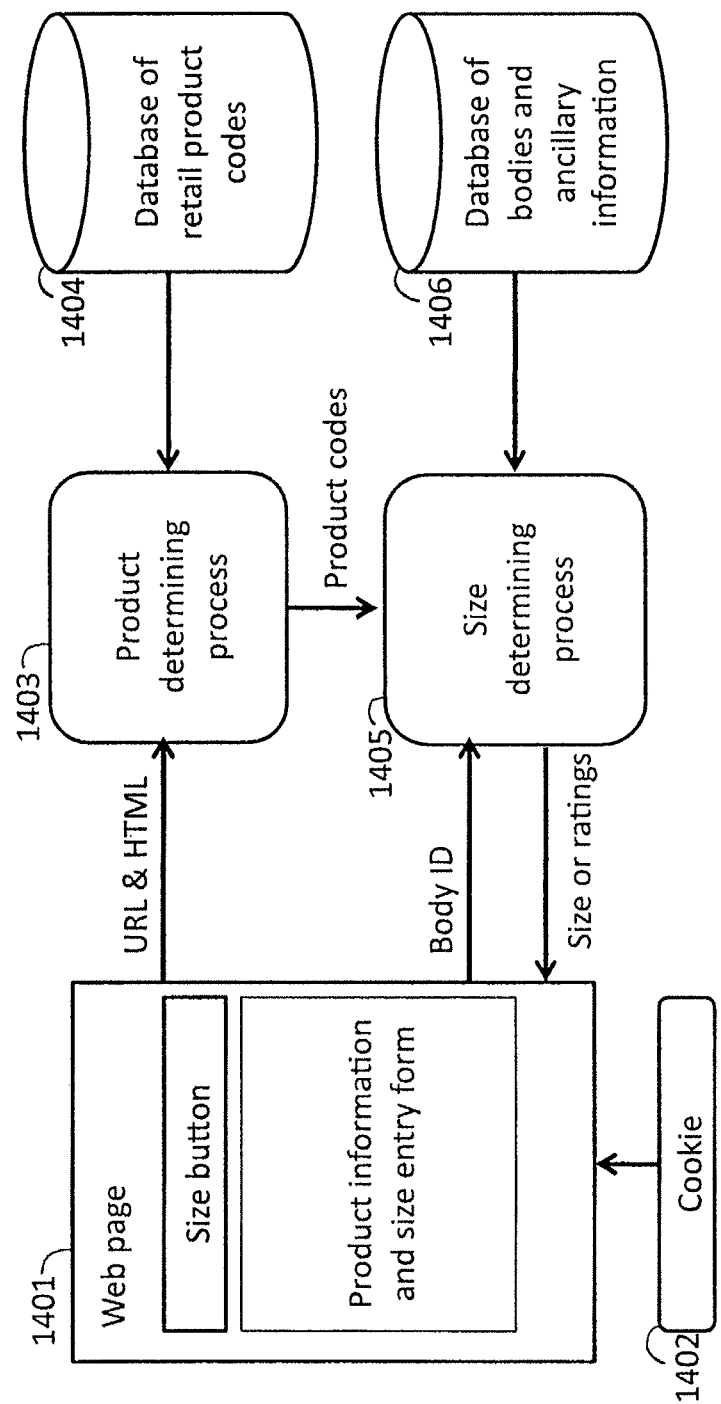
FIG. 14 is a block diagram depicting a system for determining the appropriate size for clothing displayed on a web page.

A method is described for automatically determining the fit of a garment presented on a retail website. This method uses the techniques above for matching a user's body to a database of other bodies that have tried on similar garments. These methods are augmented with a means for determining relevant clothing brand, style and size information from a website. Referring to FIG. 14, the user's web browser 1401 is augmented to run software implementing the size determining process. This software may be installed on the user's computer and activated by a button installed, for example in the browser toolbar. When activated, the product determining process 1403 extracts the URL of the web page and the HTML source of the page. It parses these to extract the brand and identifying product codes; note that product ID codes are often explicitly part of the URL making their extraction straightforward. A database of known product codes 1404 for different brands may be used to interpret the HTML and URL data.

When the user clicks a button to obtain their size for a given garment, the size determining process 1405 obtains their unique body identifier. The unique identifier for the user's body model may be stored on their computer hard disk or memory, for example, in the form of a "cookie" 1402. Alternatively, if no cookie is present, the user is asked to provide authenticating information such as a username and password. Once identified, the body shape of the user is known.

The size determining process 1405 searches a database 1406 for people with similar bodies who have purchased or rated the clothing item as determined by the product determining process 1403. The match score (Section 9) is computed and the N best matches are identified. The number of matches can vary but the default setting in one embodiment is 10. Ratings and comments stored with the N matches may be displayed. Alternatively the size preferences of these N bodies may be combined (Section 10d) to recommend a particular size for the determined product.

Optionally, this size can be inserted automatically into a web form using a size entry process. The size entry process determines the size fields in the HTML source and sets the appropriate values based on the determined size.

Custom Clothing

Measurements extracted from the body (Section 10) can be used as input to standard pattern generation software for custom clothing or to on-line forms for ordering custom (or semi-custom) clothing.

Shape-Aware Advertising

A shape-sensitive advertising component uses the body model in conjunction with on-line (or cell phone) web browsing and shopping. Based on a person's body shape, advertising (e.g. banner ads in a web browser) may vary. The system uses body shape matching (Section 9) (or extracted properties such as measurements (Section 10)) to associate particular advertisements with particular body shapes.

For example, advertisers can select a range of body shapes that fit their product demographics (e.g. heavy men or short women). The body-shape matching component matches advertiser specifications with body shapes and presents shape-targeted advertisements (e.g. for weight loss or plus-sized clothing). For example, an advertiser may specify a gender, height and weight range, a bust size, etc. Advertisers may also specify body shapes based on example 3D body models selected from an electronic presentation of different body shapes or by providing a fit model scan. These exemplar bodies are then used to produce a match score (Section 9) that determines how similar a user is to the exemplar specification.

Figure 15:
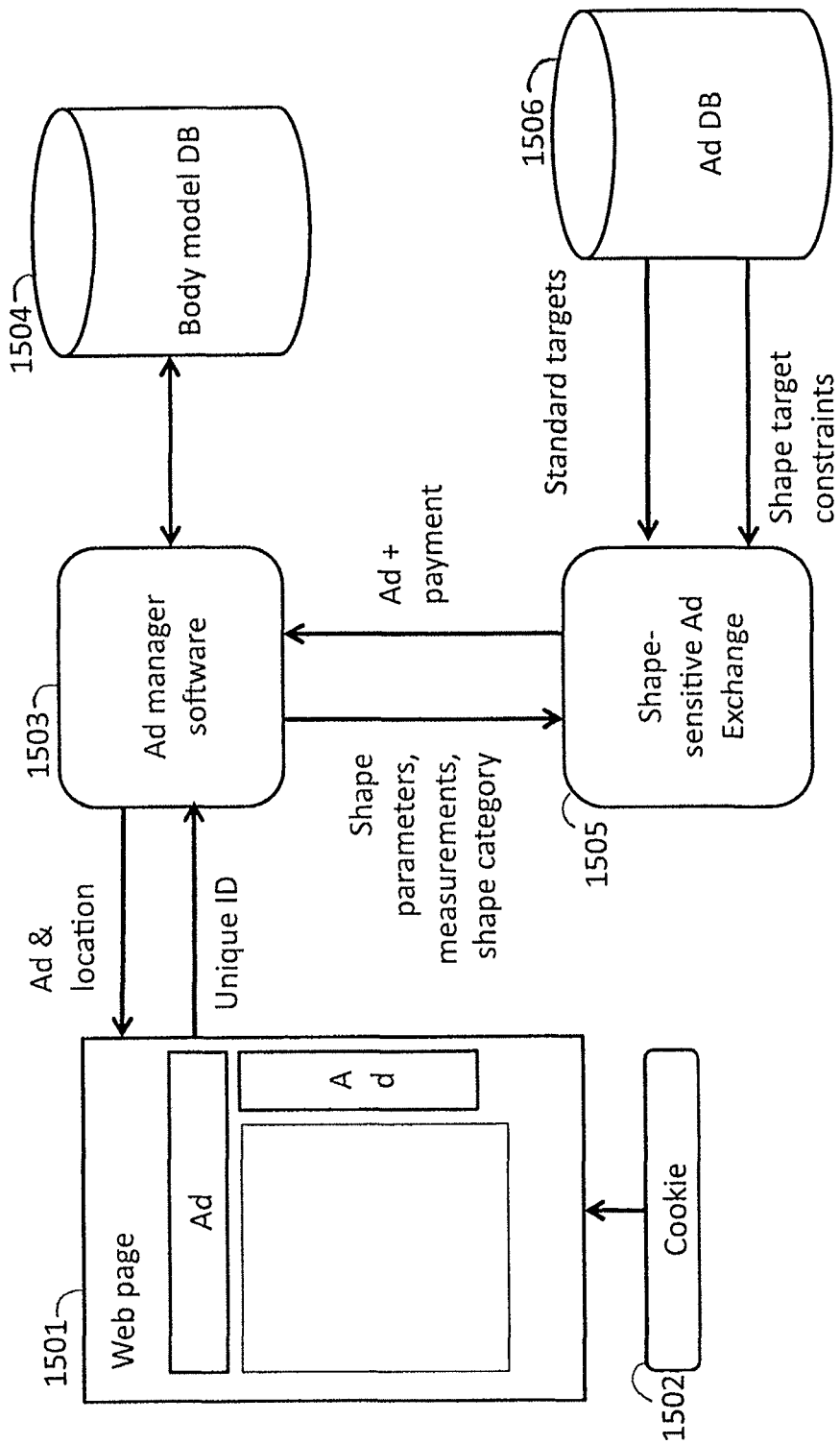
FIG. 15 is a block diagram depicting a system for presenting information to a user's web page based on matches between their body shape and constraints specified by advertisers.

Referring to FIG. 15, body shape information about a user may be stored on the user's computer; for example in the form of a "cookie" 1502. When browsing a website depicted at 1501, this cookie provides a unique identifier to an ad manager software component 1503. The ad manager software component 1503 retrieves information about the body from a body model database 1504 using the unique identifier. The ad manager software component can keep the identity of the user private and communicate general information about their body shape to a shape-sensitive ad exchange software component 1505. This information may include body shape coefficients, the ID of a similar exemplar body, measurements such as height or weight, demographic information such as age and gender, and shape category information such as athletic or heavy build. It should be understood that standard ad targeting information can also be supplied such as IP address, geographic location and historical click/purchase information.

The shape-sensitive ad exchange component 1505 matches the shape information about a user to a database of advertiser requests 1506. If there are multiple matching advertisements, one or more of the matching advertisements is selected for display. The mechanism for selection can be randomized or can take into account how much an advertiser is willing to pay. The rate for each advertisement may vary depending on the overall quality of the match score (i.e. how close the user's measurements are to the target shape specified by the advertiser). A standard bartering or auction mechanism may be used for advertisers to compete for presentation to matched users.

Statistics of purchases and advertising-related click histories for people of particular body shapes are collected and stored in a database 1504. Matches to the body shapes of other shoppers or website users can also be used to target advertising based on the purchases of other people of similar shape. This is achieved by finding similar body shapes using the body shape matching component and accessing the stored shopping and clicking statistics for people of similar shape. If a person of a particular shape has clicked on an advertisement, an advertiser may pay more for presentation to a similarly shaped person. Any website can be enabled with this shape-sensitive advertising feature using cookies. Users can disable this feature by changing their browser preferences. This shape feature can be combined with other commonly acquired information about shopping and clicking behavior used for the presentation of personalized or targeted advertising.

Virtual Try On

The estimated body shape model can also be used to try on virtual clothing. There are several computer graphics methods, including commercial products, for simulating clothing draped on 3D bodies and these are not discussed here. The body model can be saved in any one of the common graphics model formats and imported into a standard clothing simulation software system.

An alternative embodiment for virtual clothing try-on uses the body-shape matching component (Sections 9 and 10d) to match a user's body shape to body shapes stored in a database. Virtual try on is enabled by collecting a database of models of different shapes and sizes wearing a plurality of clothing items. When the user wants to see how they will look in a particular clothing item, the database of stored models is searched for the closest matching body shape for which an image (or graphic representation) of the model in that item exists. This image is then displayed to the user. In this way, each person visiting a retail clothing website may see the same merchandise but on different models (models that look most like them). This provides the equivalent of a personalized clothing catalog for the person's shape. This is a form of "example-based virtual clothing". Rather than rendering clothing using graphics, many images of models are stored and recalled as needed. The key concept is that this recall is based on similarity of body shape.

Other Applications

There many applications for body shape extraction from images. Several are described below.

Forensic Analysis.

The parametric shape model can be recovered for people wearing clothing and used to extract biometric measurements such as subject height and weight (Section 10). For crime scene video containing clothed subjects, this provides important evidence beyond standard methods. Body shape can also be used for persistent surveillance. By identifying the shape of people in images, they can be tracked over time and when they leave and re-enter the scene, their body shape can be used to reestablish tracking and determine identity among a group of people using the shape distance score.

Health Care.

Certain body shapes are associated with the risk of cardiovascular disease, metabolic syndrome, diabetes, cancer, etc. Current measurement methods for predicting risk from body shape are limited (e.g. measurements of waist size). More detailed shape descriptors (e.g. combinations of measurements) could be used to predict risk of various diseases. Given a training database of health measurements and fitted shape parameters (or derived measures), the methods in Section 10 are used to learn a mathematical model predicting the health measurements from the shape measurements. The simplest embodiment uses linear regression as described in Section 10 though more complex non-linear (or multi-linear) models may be used. Non-parametric matching may also be used (Section 10d).

Also automatic tracking of the elderly and the ill in natural environments is widely recognized to be valuable. No current methods provide detailed 3D body pose and shape measurements for clothed people. Unlike a laboratory or clinical setting, in-home tracking involves the computation of body pose of people in clothing. Multiple calibrated cameras in a home (or other residential setting) provide image features (e.g. foreground silhouettes) for fitting the shape model using the clothing-robust method. A stereo map of the home environment can be built from the multiple cameras and used to predict regions of the world in which the body is occluded (e.g. by furniture). The activity of the person can be assessed by the amount of motion over time. For example, the range of motion of each joint throughout the day can be computed. Tremor (e.g. in people with Parkinson's disease) can be assessed over time by an analysis of the high frequency motion of the person. Changes in posture or weight can be detected by comparing body model parameters estimated over long time spans.

SECTION 13. REFERENCES

The following references, including the disclosures thereof, are incorporated herein by reference in their entirely.

A. Agarwal and B. Triggs. Monocular human motion capture with a mixture of Regressors. IEEE Workshop on Vision for Human-Computer Interaction, 2005.

A. Agarwal and B. Triggs. Recovering 3D human pose from monocular images. IEEE Transactions on Pattern Analysis and Machine Intelligence, 28(1):44-58, 2006.

B. Allen, B. Curless, and Z. Popović. Articulated body deformation from range scan data. ACM Transactions on Graphics, 21(3):612-619, 2002.

B. Allen, B. Curless, and Z. Popović. The space of all body shapes: reconstruction and parameterization from range scans. ACM Transactions on Graphics, 22(3):587-594, 2003.

B. Allen, B. Curless, and Z. Popović. Exploring the space of human body shapes: Data-driven synthesis under anthropometric control. In Proceedings Digital Human Modeling for Design and Engineering Conference, Rochester, Mich., June 15-17. SAE International, 2004.

A. Andoni and P. Indyk, Near-optimal hashing algorithms for approximate nearest neighbor in high dimensions. Communications of the ACM, 51(1):117-122, 2008.

D. Anguelov, P. Srinivasan, D. Koller, S. Thrun, H. Pang, and J. Davis. The correlated correspondence algorithm for unsupervised registration of nonrigid surfaces. In Advances in Neural Information Processing Systems 17, pages 33-40, 2004.

D. Anguelov, P. Srinivasan, D. Koller, S. Thrun, J. Rodgers, and J. Davis. SCAPE: Shape completion and animation of people. ACM Transactions on Graphics 24(3):408-416, 2005.

D. Anguelov. Learning Models of Shape from 3D Range Data. Ph.D. thesis, Stanford University, 2005. (2005t).

D. Anguelov, P. Srinivasan, D. Koller, and S. Thrun, Shape completion, animation and marker-less motion capture of people, animals or characters. U.S. Patent Application no. 20080180448, July, 2008.

A. O. Balan, L. Sigal, and M. J. Black. A quantitative evaluation of video-based 3D person tracking.☐ The Second Joint IEEE International Workshop on Visual Surveillance and Performance Evaluation of Tracking and Surveillance, VS-PETS, Beijing, China, pp. 349-356, Oct. 15-16, 2005.

A. O. Balan, L. Sigal, M. J. Black, J. E. Davis, and H. W. Haussecker. Detailed human shape and pose from images.

In IEEE International Conference on Computer Vision and Pattern Recognition, 2007. (2007a)

A. O. Balan, M. J. Black, H. Haussecker and L. Sigal. Shining a light on human pose: On shadows, shading and the estimation of pose and shape. In International Conference on Computer Vision, 2007. (2007b)

A. O. Balan and M. J. Black. The naked truth: Estimating body shape under clothing. In European Conference on Computer Vision, volume 5303, pages 15-29, 2008.

E. P. Batterman, D. G. Chandler, and R. H. Dunphy. Method and apparatus for determining degrees of freedom of a camera. U.S. Pat. No. 5,832,139. 1998

S. Belongie, J. Malik and J. Puzicha. Matching shapes. In International Conference on Computer Vision, pages 454-461, 2001.

M. Black, A. Rangarajan. On the unification of line processes, outlier rejection, and robust statistics with applications in early vision. International Journal of Computer Vision 19(1):57-92, 1996.

L. Bo, C. Sminchisescu, A. Kanaujia, and D. Metaxas. Fast Algorithms for Large Scale Conditional 3D Prediction. In IEEE International Conference on Computer Vision and Pattern Recognition, 2008.

E. Boyer. On using silhouettes for camera calibration. In Asian Conference on Computer Vision, 2006.

G. R. Bradski and A. Kaehler. Learning OpenCV. O'Reilly Publications, 2008.

M. E. Brand. Incremental Singular Value Decomposition of Uncertain Data with Missing Values. In European Conference on Computer Vision, pages 707-720, 2002.

J. Canny. A computational approach to edge detection. IEEE Transactions on Pattern Analysis and Machine Intelligence, PAMI-8(6): 679-698, November 1986

S. Chen and L. A Ray. Method for blond-hair-pixel removal in image skin-color detection. U.S. Pat. No. 6,711,286, 2004.

K. M. Cheung, S. Baker, and T. Kanade. Shape-From-Silhouette of Articulated Objects and its Use for Human Body Kinematics Estimation and Motion Capture. In IEEE International Conference on Computer Vision and Pattern Recognition, pages 77-84, 2003.

S. Corazza, L. Muendermann, A. Chaudhari, T. Demattio, C. Cobelli, and T. Andriacchi. A markerless motion capture system to study musculoskeletal biomechanics: Visual hull and simulated annealing approach. Annals of Biomedical Engineering, 34(6):1019-29, 2006.

A. Criminisi, I.D. Reid, and A. Zisserman. Single view metrology. International Journal of Computer Vision, 40(2):123-148, 2000.

N. Cristianini and J. Shawe-Taylor. An Introduction to Support Vector Machines and other kernel-based learning methods. Cambridge University Press, 2000.

N. Dalal and B. Triggs. Histograms of oriented gradients for human detection. IEEE Computer Society Conference on Computer Vision and Pattern, 2005.

J. Deutscher and I. Reid. Articulated body motion capture by stochastic search. International Journal of Computer Vision, 61(2):185-205, 2005.

V. Ferrari, M. Marin, and A. Zisserman. Progressive search space reduction for human pose estimation. IEEE International Conference on Computer Vision and Pattern Recognition, 2008.

A. Fitzgibbon, D. Robertson, S. Ramalingam, A. Blake, and A. Criminisi. Learning priors for calibrating families of stereo cameras. In International Conference on Computer Vision, 2007.

T. Funkhouser, M. Kazhdan, P. Min, and P. Shilane. Shape-based retrieval and analysis of 3D models. Communications of the ACM, 48(6):58-64, June 2005.

S. Geman and D. McClure. Statistical methods for tomographic image reconstruction. Bulletin of the International Statistical Institute LII-4:5-21, 1987.

A. T. Graham. Derivation of studio camera position and motion from the camera image. U.S. Pat. No. 5,502,482, 1996.

K. Grauman, G. Shakhnarovich, and T. Darrell. Inferring 3D structure with a statistical image-based shape model. IEEE International Conference on Computer Vision, pages 641-648, 2003.

D. Grest and R. Koch. Human model fitting from monocular posture images. In Proceedings of the Vision, Modeling, and Visualization Conference, 2005.

R. I. Hartley and A. Zisserman. Multiple View Geometry in Computer Vision. Cambridge University Press, 2000.

N. Hasler, B. Rosenhahn, T. Thormählen, M. Wand, J. Gall and H.-P. Seidel. Markerless motion capture with unsynchronized moving cameras. In IEEE Conference on Computer Vision and Pattern Recognition, 2009. (2009a).

N. Hasler, C. Stoll, M. Sunkel, B. Rosenhahn and H.-P. Seidel. A statistical model of human pose and body shape. Eurographics, Computer Graphics Forum, 2(28), 337-346, 2009. (2009b)

N. Hasler, C. Stoll, B. Rosenhahn, T. Thormahlen, and H.-P. Seidel. Estimating body shape of dressed humans. In Shape Modeling International, Beijing, China, 2009. (2009c)

C. Hernandez, F. Schmitt, and R. Cipolla. Silhouette coherence for camera calibration under circular motion. IEEE Transactions on Pattern Analysis and Machine Intelligence, 29(2):343-349, 2007.

A. Hilton, D. Beresford, T. Gentils, R. Smith, W. Sun, and J. Illingworth, Whole-body modeling of people from multi-view images to populate virtual worlds. *The Visual Computer,* 16(7):411-436, 2000.

D. Hoiem, A. A. Efros, and M. Hebert. Putting objects in perspective. IEEE International Conference on Computer Vision and Pattern Recognition, 2006.

D. Hoiem, A. A. Efros, and M. Hebert. Closing the loop on scene interpretation. IEEE International Conference on Computer Vision and Pattern Recognition, 2008.

Z. Hu, H. Yan, and X. Lin. Clothing segmentation using foreground and background estimation based on the constrained Delaunay triangulation. Pattern Recognition, 41(5):1581-1592, 2008.

A. Ihler, E. Sudderth, W. Freeman, and A. Willsky. Efficient multiscale sampling from products of Gaussian mixtures. In Neural Information Processing Systems, 2003.

A. Johnson. Spin-Images: A Representation for 3-D Surface Matching. PhD thesis, Robotics Institute, Carnegie Mellon University, Pittsburgh, Pa., August 1997.

M. Jones and J. Rehg. Statistical color models with application to skin detection. International Journal of Computer Vision, 46(1):81-96, 2002.

I. Kakadiaris and D. Metaxas. Three-dimensional human body model acquisition from multiple views. International Journal of Computer Vision, 30(3):191-218, 1998.

A. Kanaujia, C. Sminchisescu, and D. Metaxas. Semi-supervised hierarchical models for 3D human pose reconstruction. IEEE Conference on Computer Vision and Pattern Recognition, 2007.

J. C. Lagarias, J. A. Reeds, M. H. Wright, and P. E. Wright. Convergence properties of the Nelder-Mead simplex method in low dimensions. Society for Industrial and Applied Mathematics Journal on Optimization, 9(1):112-147, 1998.

A. Laurentini. The visual hull concept for silhouette-based image understanding. IEEE Transactions on Pattern Analysis and Machine Intelligence 16:150-162, 1994.

H. Lee and Z. Chen. Determination of 3D human body postures from a single view. Computer Vision, Graphics, and Image Processing, 30(2):148-168, 1985.

K.-C. Lee, D. Anguelov, B. Sumengen, and S. B. Gokturk. Markov random field models for hair and face segmentation. IEEE Conference On Automatic Face and Gesture Recognition, Sep. 17-19, 2008

W. Lee, J. Gu, and N. Magnenat-Thalmann. Generating animatable 3D virtual humans from photographs. *Eurographics,* 19(3):1-10, 2000.

X. Li, S. Maybank, S. Yan, D. Tao, and D. Xu. Gait components and their application to gender recognition. IEEE Transactions on Systems, Man, and Cybernetics, Part C: Applications and Reviews, 38(2):145-155, 2008.

D. G. Lowe. Distinctive image features from scale-invariant keypoints. International Journal of Computer Vision, 60(2):91-110, 2004.

MATLAB version R2008b. Natick, Mass.: The MathWorks Inc., 2008.

B. Moghaddam and M. Yang. Learning gender with support faces. IEEE Transactions on Pattern Analysis and Machine Intelligence, 24(5):707-711, 2002.

L. Muendermann, S. Corazza, and T. Andriacchi. Accurately measuring human movement using articulated ICP with soft-joint constraints and a repository of articulated models. In IEEE International Conference on Computer Vision and Pattern Recognition, 2007.

R. Plankers and P. Fua. Articulated soft objects for multiview shape and motion capture. IEEE Transactions on Pattern Analysis and Machine Intelligence, 25(10):63-83, 2003.

R. W. Poppe and M. Poel. Comparison of silhouette shape descriptors for example-based human pose recovery. IEEE Conference on Automatic Face and Gesture Recognition, pages 541-546, 2006.

M. Riesenhuber and T. Poggio. Hierarchical models of object recognition in cortex. Nature Neuroscience 2:1019-1025, 1999.

R. Rosales and S. Sclaroff. Learning body pose via specialized maps. In Advances in Neural Information Processing Systems, 2002.

A. Rose. System and method for fashion shopping. U.S. Pat. No. 593,076, 1999.

C. Rother, V. Kolmogorov, and A. Blake. "GrabCut": Interactive foreground extraction using iterated graph cuts. ACM Transactions on Graphics, 23(3):309-314, 2004.

M. Rufli, D. Scaramuzza, R. Siegwart. Automatic detection of checkerboards on blurred and distorted images. IEEE/RSJ International Conference on Intelligent Robots and Systems, pages 3121-3126, 2008.

H. Seo and N. Magnenat-Thalmann. An automatic modeling of human bodies from sizing parameters. In Proceedings of the 2003 Symposium on interactive 3D Graphics (Monterey, Calif., Apr. 27-30, 2003). ACM, New York, N.Y., pages 19-26, 2003.

H. Seo, Y. I. Yeo, and K. Wohn. 3D Body reconstruction from photos based on range scan. *Tech. for E-Learning and Digital Entertainment*, volume 3942, pages 849-860, 2006.

L. Sigal, S. Bhatia, S. Roth, M. J. Black, and M. Isard. Tracking Loose-limbed People. IEEE Conference on Computer Vision and Pattern Recognition, pages 421-428, 2004.

L. Sigal, A. Balan, and M. J. Black. Combined discriminative and generative articulated pose and non-rigid shape estimation. NIPS Conference Presentation, 3 Dec. 2007.

L. Sigal, A. Balan, and M. J. Black. Combined discriminative and generative articulated pose and non-rigid shape estimation. Advances in Neural Information Processing Systems 20, MIT Press, pp. 1337-1344, 2008.

C. Sminchisescu, A. Kanaujia, Z. Li, and D. Metaxas. Discriminative density propagation for 3D human motion estimation. IEEE International Conference on Computer Vision and Pattern Recognition, pages 390-397, 2005.

C. Sminchisescu and A. Telea. Human pose estimation from silhouettes, a consistent approach using distance level sets. WSCG International Conference on Computer Graphics, Visualization and Computer Vision, pages 413-420, 2002.

C. Sminchisescu and B. Triggs. Estimating articulated human motion with covariance scaled sampling. International Journal of Robotics Research, 22(6):371-393, 2003.

C. Sminchisescu, A. Kanajujia, and D. Metaxas. Learning joint top-down and bottom-up processes for 3D visual inference. IEEE International Conference on Computer Vision and Pattern Recognition, Vol. 2, pages 1743-1752, 2006.

A. R. Smith and J. F. Blinn. Blue screen matting. SIGGRAPH Proceedings, pages 259-268, 1996.

N. Snavely, S. M. Seitz, and R. Szeliski. Modeling the world from Internet photo collections. International Journal of Computer Vision, 80(2):189-210, 2008.

J. Starck and A. Hilton. Surface capture for performance-based animation. IEEE Computer Graphics and Applications, 27(3):21-31, 2007.

C. Stauffer and E. Grimson, Adaptive background mixture models for real-time tracking. IEEE Conference on Computer Vision and Pattern Recognition, pages 246-252, 1999.

C. J. Taylor. Reconstruction of articulated objects from point correspondences in a single uncalibrated image. Computer Vision and Image Understanding, 80(10):349-363, 2000.

P. Vlahos. Comprehensive electronic compositing system. U.S. Pat. No. 4,100,569, Jul. 11, 1978.

K. Wang. Method and apparatus for identifying virtual body profiles. U.S. Pat. No. 7,242,999, 2005.

L. Wannier and J. Lambert. Matching the fit of individual garments to individual consumers. US Patent Application 20060287877, 2006

Y. Yacoob and L. Davis. Detection and analysis of hair. IEEE Transactions on Pattern Analysis and Machine Intelligence, 28(7):1164-1169, 2007.

S. Yamazaki, S. Narasimhan, S. Baker, and T. Kanade. Coplanar shadowgrams for acquiring visual hulls of intricate objects. In International Conference on Computer Vision, 2007.

Z. Zhang. A flexible new technique for camera calibration. IEEE Transactions on Pattern Analysis and Machine Intelligence, 22:1330-1334, 2000.

The functions described herein may be embodied as computer implemented inventions in which software stored in a memory is executed by a processor to implement the respective functions. Furthermore, the functions described herein may be implemented by one or more processors executing one or more software programs out of a memory, via a digital signal processor or a combination of both a processor and a digital signal processor. Additionally, it should be recognized that selected functions may be performed by the processor while other selected forms are executed via a digital signal processor. Additionally, one or more selected functions described herein may alternatively be embodied in hardware components or embedded in firmware.

It will be appreciated by those of ordinary skill in the art that modifications to and variations of the above described system and method may be made without departing from the inventive concepts disclosed herein. Accordingly, the invention should not be viewed as limited except by the scope and spirit of the appended claims.

What is claimed is:

1. A method comprising:
obtaining data representing a body of an individual in a plurality of poses, wherein the data comprises one of image data of the body captured via a camera and partial depth information of the body captured via a range sensor; and
estimating the body of the individual by fitting a parametric body model of the body to the data to generate a set of pose parameters and a set of shape parameters, the set of shape parameters being consistent with the plurality of poses, and the parametric body model comprising a statistical polygonal mesh 3D model of triangles.

2. The method of claim 1, wherein the fitting of the parametric body model to the data comprises processing an objective function defined at least in part by the set of pose parameters and the set of shape parameters.

3. The method of claim 1, wherein the individual has at least one of an associated gender and an associated ethnicity, and wherein the fitting of the parametric body model to the data comprises processing an objective function defined at least in part by the set of pose parameters, the set of shape parameters, and a specified parameter corresponding to at least one of the gender and the ethnicity of the individual.

4. The method of claim 1, wherein the obtaining of the data comprises obtaining at least part of the data from an infrared sensor.

5. The method of claim 1, wherein the data represents a partially clothed body of the individual, wherein the estimating further comprising estimating a body shape of a portion of the partially clothed body that is covered by at least one piece of clothing of the partially clothed body based on the parametric body model and the data representing the partially clothed body.

6. The method of claim 5, wherein estimating the body shape further comprises detecting, via image classifiers, regions corresponding to at least one of skin, hair, and clothing.

7. The method of claim 6, wherein the fitting of the parametric body model of the at least partially clothed body utilizes an objective function that permits the estimation to be substantially within the second data.

8. The method of claim 1, wherein the parametric body model is a statistical parametric body model.

9. A system comprising:
a processor; and
a computer-readable storage medium storing instructions which, when executed by the processor, cause the processor to perform operations comprising:
obtaining data representing a body in a plurality of poses, wherein the data comprises one of image data of the body captured via a camera and partial depth information of the body captured via a range sensor; and
estimating the body of the individual by fitting a parametric body model of the body to data to generate a set of pose parameters and a set of shape parameters, the set of shape parameters being consistent with the plurality of poses, and the parametric body model comprising a statistical polygonal mesh 3D model of triangles.

10. The system of claim 9, wherein the fitting of the parametric body model to the data comprises processing an objective function defined at least in part by the set of pose parameters and the set of shape parameters.

11. The system of claim 9, wherein the individual has at least one of an associated gender and an associated ethnicity, and wherein the fitting of the parametric body model to the data comprises processing an objective function defined at least in part by the set of pose parameters, the set of shape parameters, and a specified parameter corresponding to at least one of the gender and the ethnicity of the individual.

12. The system of claim 9, wherein the obtaining of the data comprises obtaining at least part of the data from an infrared sensor.

13. The system of claim 9, wherein the data represents a partially clothed body of the individual, the method further comprising estimating a body shape of a portion of the partially clothed body that is covered by at least one piece of clothing of the partially clothed body based on the parametric body model and the data representing the partially clothed body.

14. The system of claim 13, wherein estimating the body shape further comprises detecting, via image classifiers, regions corresponding to at least one of skin, hair, and clothing.

15. The system of claim 14, wherein the fitting of the parametric body model of the at least partially clothed body utilizes an objective function that permits the estimation to be substantially within the second data.

16. The system of claim 9, wherein said parametric body model is a statistical parametric body model.

17. A computer-readable storage device storing information which, when executed by a processor, cause the processor to perform operations comprising:
obtaining data representing a body of an individual in a plurality of poses, wherein the data comprises one of image data of the body captured via a camera and partial depth information of the body captured via a range sensor; and
estimating the body of the individual by fitting a parametric body model of the body to the data to generate a set of pose parameters and a set of shape parameters, the set of shape parameters being consistent with the plurality of poses, and the parametric body model comprising a statistical polygonal mesh 3D model of triangles.

18. The computer-readable storage device of claim 17, wherein the fitting of the parametric body model to the data comprises processing an objective function defined at least in part by the set of pose parameters and the set of shape parameters.

19. The computer-readable storage device of claim 17, wherein the individual has at least one of an associated gender and an associated ethnicity, and wherein the fitting of the parametric body model to the data comprises processing an objective function defined at least in part by the set of pose parameters, the set of shape parameters, and a specified parameter corresponding to at least one of the gender and the ethnicity of the individual.

20. The computer-readable storage device of claim 17, wherein the obtaining of the data comprises obtaining at least part of the data from an infrared sensor.

21. The computer-readable storage device of claim 17, wherein the data represents a partially clothed body of the individual, the method further comprising estimating a body shape of a portion of the partially clothed body that is covered by at least one piece of clothing of the partially clothed body based on the parametric body model and the data representing the partially clothed body.

22. The computer-readable storage device of claim 21, wherein estimating the body shape further comprises detecting, via image classifiers, regions corresponding to at least one of skin, hair, and clothing.

23. The computer-readable storage device of claim 22, wherein the fitting of the parametric body model of the at least partially clothed body utilizes an objective function that permits the estimation to be substantially within the second data.

24. The computer-readable storage device of claim 17, wherein the parametric body model is a statistical parametric body model.

\* \* \* \* \*